United States Patent
Honda

(10) Patent No.: US 8,984,901 B2
(45) Date of Patent: Mar. 24, 2015

(54) HEAT PUMP SYSTEM

(75) Inventor: Masahiro Honda, Ostend (BE)

(73) Assignees: Daikin Industries, Ltd., Osaka (JP); Daikin Europe N.V., Ostend (BE)

( * ) Notice: Subject to any disclaimer, the term of this patent is extended or adjusted under 35 U.S.C. 154(b) by 703 days.

(21) Appl. No.: 13/202,614

(22) PCT Filed: Feb. 23, 2010

(86) PCT No.: PCT/JP2010/001187
§ 371 (c)(1),
(2), (4) Date: Aug. 22, 2011

(87) PCT Pub. No.: WO2010/098073
PCT Pub. Date: Sep. 2, 2010

(65) Prior Publication Data
US 2011/0296860 A1    Dec. 8, 2011

(30) Foreign Application Priority Data
Feb. 24, 2009 (JP) .................. 2009-041320

(51) Int. Cl.
*F25B 7/00* (2006.01)
*F25B 17/00* (2006.01)
(Continued)

(52) U.S. Cl.
CPC .......... *F25B 49/022* (2013.01); *F24D 11/0214* (2013.01); *F25B 13/00* (2013.01); *F25B 7/00* (2013.01); *F25B 2313/02741* (2013.01); *F25B 2339/047* (2013.01); *Y02B 30/126* (2013.01)
USPC ................... 62/160; 62/175; 62/185; 62/201; 62/228.1

(58) Field of Classification Search
CPC ............ F25B 7/00; F25B 13/00; F25B 30/02; F25B 49/022; F25B 2313/003; F25B 2600/02; F25B 2600/0271; F25B 2700/21152
USPC .............. 62/160, 175, 185, 201, 228.1, 228.3
See application file for complete search history.

(56) References Cited

U.S. PATENT DOCUMENTS 5,353,604 A * 10/1994 Oguni et al. ................... 62/207
2010/0050675 A1 3/2010 Kameyama et al.
(Continued)

FOREIGN PATENT DOCUMENTS

| EP | 1 972 871 A2 | 9/2008 |
|---|---|---|
| JP | 60-164157 A | 8/1985 |

(Continued)

OTHER PUBLICATIONS

International Preliminary Report of corresponding PCT Application No. PCT/JP2010/001187.

(Continued)

*Primary Examiner* — Marc Norman
(74) *Attorney, Agent, or Firm* — Global IP Counselors

(57) ABSTRACT

A heat pump system includes: a heat-source-side refrigerant circuit having a heat-source-side compressor, a first usage-side heat exchanger operable as a radiator of heat-source-side refrigerant, and a heat-source-side heat exchanger operable as a radiator of heat-source-side refrigerant; and a usage-side refrigerant circuit having a usage-side compressor, a refrigerant/water heat exchanger operable as a radiator of usage-side refrigerant to heat an aqueous medium, and the first usage-side heat exchanger operable as an evaporator of usage-side refrigerant by radiation of heat-source-side refrigerant. The capacity of the heat-source-side compressor is controlled so that a saturation temperature corresponding to the pressure of the heat-source-side refrigerant in the discharge of the heat-source-side compressor becomes a target temperature; and the capacity of the usage-side compressor is controlled so that a saturation temperature corresponding to the pressure of the usage-side refrigerant in the discharge of the usage-side compressor becomes a target temperature.

21 Claims, 19 Drawing Sheets

(51) Int. Cl.
*F25B 29/00* (2006.01)
*F25B 49/00* (2006.01)
*F25B 49/02* (2006.01)
*F24D 11/02* (2006.01)
*F25B 13/00* (2006.01)

(56) References Cited

U.S. PATENT DOCUMENTS

2012/0285188 A1* 11/2012 Honda ............................ 62/160
2013/0042640 A1* 2/2013 Higashiiue et al. .......... 62/196.1

FOREIGN PATENT DOCUMENTS

| JP | 61-101771 A | 5/1986 |
| JP | 62-49150 A | 3/1987 |
| JP | 1-144770 U | 10/1989 |
| JP | 6-69664 U | 9/1994 |
| JP | 9-287856 A | 11/1997 |
| JP | 10-246525 A | 9/1998 |
| JP | 11-173711 A | 7/1999 |
| JP | 2000-105029 A | 4/2000 |
| JP | 2003-42574 A | 2/2003 |
| JP | 2005-16754 A | 1/2005 |
| JP | 2005-147544 A | 6/2005 |
| JP | 2008-2759 A | 1/2008 |
| JP | 2008-232508 A | 10/2008 |
| JP | 2008-275291 A | 11/2008 |
| WO | WO 2008/117408 A1 | 10/2008 |

OTHER PUBLICATIONS

International Search Report of corresponding PCT Application No. PCT/JP2010/001187.

* cited by examiner ated to a Japanese Patent Application No. 2009-041320, filed in Japan on Feb. 24, 2009, the entire contents of which are hereby incorporated herein by reference.

HEAT PUMP SYSTEM

CROSS-REFERENCE TO RELATED APPLICATIONS

This U.S. National stage application claims priority under 35 U.S.C. §119(a) to Japanese Patent Application No. 2009-041320, filed in Japan on Feb. 24, 2009, the entire contents of which are hereby incorporated herein by reference.

TECHNICAL FIELD

The present invention relates to a heat pump system, and particularly relates to a heat pump system capable of heating an aqueous medium by utilizing a heat pump cycle.

BACKGROUND ART

Heat pump water heaters, such as the one described in Japanese Laid-open Patent Publication No. 60-164157, are known which are capable of utilizing a heat pump cycle to heat water. Such a heat pump water heater has primarily a compressor, a refrigerant/water heat exchanger, and a heat-source-side heat exchanger, and is configured so that water is heated by the radiation of refrigerant in the refrigerant/water heat exchanger, and the hot water thereby obtained is fed to a storage tank.

SUMMARY

With the conventional heat pump water heater described above, an auxiliary heater as well as a refrigerant/water heat exchanger must be used in combination to heat water, to increase the discharge pressure of the compressor, and to otherwise operate under conditions of poor operating efficiency in order to supply high-temperature hot water to a hot-water storage tank, and such a situation is not preferred.

An object of the present invention is to provide a high-temperature aqueous medium in a heat pump system capable of heating an aqueous medium using a heat pump cycle.

A heat pump system according to a first aspect of the present invention comprises a heat-source-side refrigerant circuit and a usage-side refrigerant circuit. The heat-source-side refrigerant circuit has a variable-capacity heat-source-side compressor for compressing a heat-source-side refrigerant, a first usage-side heat exchanger capable of functioning as a radiator of the heat-source-side refrigerant, and a heat-source-side heat exchanger capable of functioning as an evaporator of the heat-source-side refrigerant. The usage-side refrigerant circuit has a variable-capacity usage-side compressor for compressing usage-side refrigerant, refrigerant/water heat exchanger capable of functioning as a radiator of the usage-side refrigerant to heat an aqueous medium, and the first usage-side heat exchanger capable of functioning as an evaporator of the usage-side refrigerant by radiation of the heat-source-side refrigerant. The heat pump system controls the capacity of the heat-source-side compressor so that a heat-source-side discharge saturation temperature, which is the saturation temperature corresponding to the pressure of the heat-source-side refrigerant in the discharge of the heat-source-side compressor, becomes a predetermined target heat-source-side discharge saturation temperature; and controls the capacity of the usage-side compressor so that a usage-side discharge saturation temperature, which is the saturation temperature corresponding to the pressure of the usage-side refrigerant in the discharge of the usage-side compressor, becomes a predetermined target usage-side discharge saturation temperature.

In this heat pump system, the usage-side refrigerant circulating through the usage-side refrigerant circuit is heated in the first usage-side heat exchanger by radiation of the heat-source-side refrigerant circulating through the heat-source-side refrigerant circuit, and it is possible to obtain in the usage-side refrigerant circuit a refrigeration cycle which has a higher temperature than the refrigeration cycle in the heat-source-side refrigerant circuit by using the heat obtained from the heat-source-side refrigerant. Therefore, a high-temperature aqueous medium can be obtained by radiation of the usage-side refrigerant in the refrigerant/water heat exchanger. At this time, it is preferred that a control be performed so that the refrigeration cycle in the heat-source-side refrigerant circuit and the refrigeration cycle in the usage-side refrigerant circuit both become stable in order to stably obtain a high-temperature aqueous medium. However, in this heat pump system, the compressors of the two refrigerant circuits are both variable capacity-type compressors, and the capacity of the compressors is controlled so that the discharge saturation temperatures become predetermined target discharge saturation temperatures, using saturation temperatures that correspond to the pressure of the refrigerant in the discharge of the compressors (i.e., the heat-source-side discharge saturation temperature and the usage-side discharge saturation temperature) as representative values of the pressure of the refrigerant of the refrigeration cycles. Therefore, the state of the refrigeration cycles in the two refrigerant circuits can be stabilized and a high-temperature aqueous medium can thereby be obtained in a stable fashion.

A heat pump system according to a second aspect of the present invention is the heat pump system according to the first aspect, wherein the target usage-side discharge saturation temperature is varied according to a predetermined target aqueous medium outlet temperature, which is the target value of the temperature of the aqueous medium in the outlet of the refrigerant/water heat exchanger.

In this heat pump system, the target usage-side discharge saturation temperatures are suitably set in accordance with the target aqueous medium outlet temperature in the outlet of the refrigerant/water heat exchanger. Therefore, a desired target aqueous medium outlet temperature is readily obtained and a control can be performed with good responsiveness even when the target aqueous medium outlet temperature has been modified.

The heat pump system according to a third aspect of the present invention is the heat pump system according to the first or second aspect, wherein the target heat-source-side discharge saturation temperature is varied according to the target usage-side discharge saturation temperature or the target aqueous medium outlet temperature.

In this heat pump system, the target heat-source-side discharge saturation temperature is suitably set in accordance with the target usage-side discharge saturation temperature or the target aqueous medium outlet temperature. Therefore, the refrigeration cycle in the heat-source-side refrigerant circuit can be controlled so as to achieve a suitable state corresponding to the state of the refrigeration cycle in the usage-side refrigerant circuit.

The heat pump system according to a fourth aspect of the present invention is the heat pump system according to any of the first to third aspects, wherein the heat-source-side refrigerant circuit further comprises a first usage-side flow rate adjustment valve capable of varying the flow rate of heat-source-side refrigerant that flows through the first usage-side heat exchanger; and the opening degree of the first usage-side flow rate adjustment valve is controlled to be reduced in the case that the usage-side outlet/inlet pressure difference, which is the pressure difference between the pressure of the usage-side refrigerant in the discharge of the usage-side compressor and the pressure of the usage-side refrigerant in the intake of the usage-side compressor, is equal to or less than a predetermined usage-side low-load control-pressure difference.

The heat pump system according to any of the first to third aspects controls the capacity of the compressors so that the saturation temperature corresponding to the pressure of the refrigerant in the discharge of the compressors of the two refrigerant circuits (i.e., the heat-source-side discharge saturation temperature and the usage-side discharge saturation temperature) becomes a target temperature. In such a configuration, when a supply of aqueous medium with a wide range of temperatures is requested, the usage-side outlet/inlet pressure difference, which is the pressure difference between the pressure of the usage-side refrigerant in the discharge of the usage-side compressor and the pressure of the usage-side refrigerant in the intake of the usage-side compressor, becomes very small and the refrigeration cycle of the usage-side refrigerant circuit cannot be sufficiently controlled using only control of the capacity of the usage-side compressor.

In view of the above, in this heat pump system, a control is performed that reduces the opening degree of the first usage-side flow rate adjustment valve capable of varying the flow rate of the heat-source-side refrigerant flowing through first usage-side heat exchanger in the case that the usage-side outlet/inlet pressure difference, which is the pressure difference between the pressure of the usage-side refrigerant in the discharge of the usage-side compressor and the pressure of the usage-side refrigerant in the intake of the usage-side compressor, is equal to or less than the usage-side low differential pressure protection pressure difference, making it possible to respond to a request for a supply of an aqueous medium having a wide range of temperatures by inhibiting the heat exchange capability in the first usage-side heat exchanger and increasing the usage-side outlet/inlet pressure difference, even in the case that the usage-side outlet/inlet pressure difference is very low.

The heat pump system according to a fifth aspect of the present invention is the heat pump system according to the fourth aspect, wherein the opening degree of the first usage-side flow rate adjustment valve is controlled so that a heat-source-side refrigerant degree-of-subcooling, which is the degree of subcooling of the heat-source-side refrigerant in the outlet of the first usage-side heat exchanger, becomes a predetermined target heat-source-side refrigerant degree-of-subcooling, in the case that the usage-side outlet/inlet pressure difference is greater than the usage-side low-load control-pressure difference.

In this heat pump system, the degree of opening of the first usage-side flow rate adjustment value is controlled so that the heat-source-side refrigerant degree-of-subcooling becomes a target heat-source-side refrigerant degree-of-subcooling in the case that the usage-side outlet/inlet pressure difference is greater than the usage-side low-load control-pressure difference and no request has been made to inhibit the heat exchange capability in the first usage-side heat exchanger. Therefore, operation can be performed under conditions suitable to the heat exchange capability of the first usage-side heat exchanger.

The heat pump system according to a sixth aspect of the present invention is the heat pump system according to the fifth aspect, wherein the target heat-source-side refrigerant degree-of-subcooling is increased in the case that the usage-side outlet/inlet pressure difference is equal to or less than the usage-side low-load control-pressure difference.

In this heat pump system, the heat exchange capability in the first usage-side heat exchanger is inhibited by increasing the target heat-source-side refrigerant degree-of-subcooling in the control of the opening degree of the first usage-side flow rate adjustment valve for bringing the heat-source-side refrigerant degree-of-subcooling to the target heat-source-side refrigerant degree-of-subcooling. It is therefore possible to use control of the opening degree of the first usage-side flow rate adjustment valve for bringing the heat-source-side refrigerant degree-of-subcooling to the target heat-source-side refrigerant degree-of-subcooling regardless of whether the usage-side outlet/inlet pressure difference is equal to or less than the usage-side low-load control-pressure difference.

The heat pump system according to a seventh aspect of the present invention is the heat pump system according to any of the first to sixth aspects, wherein the heat-source-side refrigerant circuit furthermore has a heat-source-side switching mechanism capable of switching between a heat-source-side radiating operation state for causing the heat-source-side heat exchanger to function as a radiator of the heat-source-side refrigerant and a heat-source-side evaporating operation state for causing the heat-source-side heat exchanger to function as an evaporator of the heat-source-side refrigerant; and the usage-side refrigerant circuit furthermore has a usage-side switching mechanism capable of switching between a usage-side radiating operation state for causing the refrigerant/water heat exchanger to function as a radiator of the usage-side refrigerant and causing the first usage-side heat exchanger to function as an evaporator of the usage-side refrigerant, and a usage-side evaporating operation state for causing the refrigerant/water heat exchanger to function as an evaporator of the usage-side refrigerant and for causing the first usage-side heat exchanger to function as a radiator of the usage-side refrigerant.

The heat pump system according to an eighth aspect of the present invention is the heat pump system according to the seventh aspect, wherein in the case that defrosting of the heat-source-side heat exchanger is determined to be required, defrosting operation is performed in which the heat-source-side switching mechanism is set in the heat-source-side radiating operation state whereby the heat-source-side heat exchanger is made to function as a radiator of the heat-source-side refrigerant; and the usage-side switching mechanism is set to the usage-side evaporating operation state whereby the refrigerant/water heat exchanger is made to function as an evaporator of the usage-side refrigerant and the first usage-side heat exchanger is made to function as a radiator of the usage-side refrigerant.

In the heat pump system, when the heat-source-side heat exchanger is to be defrosted, not only is the heat-source-side heat exchanger made to function as a radiator of the heat-source-side refrigerant by setting the heat-source-side switching mechanism in the heat-source-side radiating operation state, but also the refrigerant/water heat exchanger is made to function as an evaporator of the usage-side refrigerant and the first usage-side heat exchanger is made to function as a radiator of the usage-side refrigerant by setting the usage-side switching mechanism in the usage-side evaporating operation state. Therefore, the heat-source-side refrigerant cooled by radiation in the heat-source-side heat exchanger is heated by the radiation of the usage-side refrigerant in the first usage-side heat exchanger, and the usage-side refrigerant cooled by radiation in the first usage-side heat exchanger can be heated by evaporation in the refrigerant/water heat exchanger, whereby the heat-source-side heat exchanger can be reliably defrosted.

The heat pump system according to a ninth aspect of the present invention is the heat pump system according to the eighth aspect, wherein in the case that the defrosting operation is to be performed, the first usage-side switching mechanism is set in the usage-side evaporating operation state after the heat-source-side switching mechanism has been set in the heat-source-side radiating operation state.

In the heat pump system according to the eighth aspect, the heat-source-side switching mechanism is set in a heat-source-side radiating operation state and the first usage-side switching mechanism is switched to a usage-side evaporating operation state in the case the defrosting operation is to be performed, whereby the refrigerant inside the refrigerant circuits undergoes pressure equalization. Although noise is generated during such pressure equalization of the refrigerant inside the refrigerant circuits (i.e., the noise of pressure equalization), it is preferred that such noise of pressure equalization does not become excessive.

In view of the above, in this heat pump system, the usage-side switching mechanism is set in the usage-side evaporating operation state after the heat-source-side switching mechanism has been set in the heat-source-side radiating operation state in the case that the defrosting operation is to be performed, and since the refrigerant inside the two refrigerant circuits do not simultaneously undergo pressure equalization, it is possible to prevent the noise of pressure equalization from becoming excessive in the case that the defrosting operation is performed.

The heat pump system according to a tenth aspect of the present invention is the heat pump system according to the ninth aspect, wherein in the case that the defrosting operation is to be performed, the usage-side compressor is set in a stopped state and the usage-side switching mechanism is set in the usage-side evaporating operation state.

In this heat pump system, the usage-side compressor is set in a stopped state and the usage-side switching mechanism is set in the usage-side evaporating operation state in the case that the defrosting operation is performed. Therefore, the noise of pressure equalization in the usage-side refrigerant circuit can be prevented from becoming greater.

The heat pump system according to an eleventh aspect of the present invention is the heat pump system according to the tenth aspect, wherein the usage-side refrigerant circuit further comprises a refrigerant/water heat-exchange-side flow rate adjustment valve capable of varying the flow rate of the usage-side refrigerant flowing through the refrigerant/water heat exchanger; and the usage-side compressor is stopped with the refrigerant/water heat-exchange-side flow rate adjustment valve in an open state in the case that the defrosting operation is performed.

In this heat pump system, pressure equalization in the usage-side refrigerant circuit can be rapidly performed because the usage-side compressor is stopped with the refrigerant/water heat-exchange-side flow rate adjustment valve in an open state in the case that defrosting operation is to be performed.

The heat pump system according to a twelfth aspect of the present invention is the heat pump system according to the any of the first to eleventh aspects, wherein the usage-side compressor is started up after the heat-source-side compressor has been started up in the case that the heat-source-side compressor and the usage-side compressor are started up from a stopped state.

In this heat pump system, the usage-side compressor is started up after the heat-source-side compressor has been started up in the case that the heat-source-side compressor and the usage-side compressor are to be started up from a stopped state. Therefore, heat exchange between the heat-source-side refrigerant and the usage-side refrigerant in the first usage-side heat exchanger is less likely to be more actively performed, whereby the pressure of the heat-source-side refrigerant in the discharge of the heat-source-side compressor rapidly increases; the heat-source-side outlet/inlet pressure difference, which is the pressure difference between the pressure of the heat-source-side refrigerant in the discharge of the heat-source-side compressor and the pressure of the heat-source-side refrigerant in the intake of the heat-source-side compressor, is more readily ensured; and the heat-source-side refrigerant circuit can be more stably and rapidly started up.

The heat pump system according to a thirteenth aspect is the heat pump system according to the twelfth aspect, wherein the usage-side compressor is started up after the pressure of the heat-source-side refrigerant in the discharge of the heat-source-side compressor has become equal to or greater than a predetermined heat-source-side startup discharge pressure.

In this heat pump system, the usage-side compressor is not started up until the pressure of the heat-source-side refrigerant in the discharge of the heat-source-side compressor has become equal to or greater than a predetermined heat-source-side startup discharge pressure. Therefore, the usage-side compressor can be reliably prevented from starting up in a state in which the pressure of the heat-source-side refrigerant in the discharge of the heat-source-side compressor does not increase.

The heat pump system according to a fourteenth aspect of the present invention is the heat pump system according to the twelfth aspect, wherein the usage-side compressor is started up after the heat-source-side outlet/inlet pressure difference, which is the pressure difference between the pressure of the heat-source-side refrigerant in the discharge of the heat-source-side compressor and the pressure of the heat-source-side refrigerant in the intake of the heat-source-side compressor, has become equal to or greater than a predetermined heat-source-side startup pressure difference.

In this heat pump system, the usage-side compressor is not started up until the heat-source-side outlet/inlet pressure difference, which is the pressure difference between the pressure of the heat-source-side refrigerant in the discharge of the heat-source-side compressor and the pressure of the heat-source-side refrigerant in the intake of the heat-source-side compressor, has become equal to or greater than a predetermined heat-source-side startup pressure difference. Therefore, it is possible to reliably prevent the usage-side compressor from starting up in a state in which the heat-source-side outlet/inlet pressure difference is not ensured.

The heat pump system according to a fifteenth aspect of the present invention is the heat pump system according to any of the first to fourteenth aspects, and further comprises an aqueous medium circuit through which an aqueous medium circulates to perform heat exchange with the usage-side refrigerant in the refrigerant/water heat exchanger, the aqueous medium circuit having a variable capacity circulation pump. This heat pump system starts up the usage-side compressor while the circulation pump is in a stopped state or a state of operation at a low flow rate.

In this heat pump system, in the case that the usage-side compressor is to be started, the usage-side compressor is started up in a state in which the circulation pump is stopped or operated in a state of operation at a low flow rate. Therefore, heat exchange between the aqueous medium and the usage-side refrigerant in the refrigerant/water heat exchanger is less likely to be actively performed, whereby the pressure of the usage-side refrigerant in the discharge of the usage-side compressor increases rapidly; the usage-side outlet/inlet pressure difference, which is the pressure difference between the pressure of the usage-side refrigerant in the discharge of the usage-side compressor and the pressure of the usage-side refrigerant in the intake of the usage-side compressor, is more readily ensured; and the usage-side refrigerant circuit can be rapidly and stably started up.

The heat pump system according to a sixteenth aspect of the present invention is the heat pump system according to the fifteenth aspect, wherein the capacity of the circulation pump is controlled so that the flow rate of the aqueous medium circulating through the aqueous medium circuit is increased after the pressure of the usage-side refrigerant in the discharge of the usage-side compressor has become equal to or greater than a predetermined usage-side startup discharge pressure.

In this heat pump system, the flow rate of the aqueous medium circulating through the aqueous medium circuit is prevented from increasing until the pressure of the usage-side refrigerant in the discharge of the usage-side compressor becomes equal to or greater than the usage-side startup discharge pressure. Therefore, it is possible to reliably prevent the capacity of the circulation pump from being controlled so that the flow rate of the aqueous medium circulating through the aqueous medium circuit is increased in a state in which the pressure of the usage-side refrigerant in the discharge of the usage-side compressor does not increase.

The heat pump system according to a seventeenth aspect of the present invention is the heat pump system according to the fifteenth aspect, wherein the capacity of the circulation pump is controlled so that the flow rate of the aqueous medium circulating through the aqueous medium circuit is increased after the usage-side outlet/inlet pressure difference, which is the pressure difference between the pressure of the usage-side refrigerant in the discharge of the usage-side compressor and the pressure of the usage-side refrigerant in the intake of the usage-side compressor, has become equal to or greater than a predetermined usage-side startup pressure difference.

In the heat pump system, the flow rate of the aqueous medium circulating through the aqueous medium circuit is prevented from increasing until the usage-side outlet/inlet pressure difference, which is the pressure difference between the pressure of the usage-side refrigerant in the discharge of the usage-side compressor and the pressure of the usage-side refrigerant in the intake of the usage-side compressor, becomes equal to or greater than the usage-side startup pressure difference. Therefore, it is possible to reliably prevent the capacity of the circulation pump from being controlled so that the flow rate of the aqueous medium circulating through the aqueous medium circuit is increased in a state in which the usage-side outlet/inlet pressure difference is not ensured.

The heat pump system according to an eighteenth aspect of the present invention is the heat pump system according to any of the first to seventeenth aspects, wherein the heat-source-side refrigerant circuit further comprises a second usage-side heat exchanger capable of heating an air medium by functioning as a radiator of the heat-source-side refrigerant.

In this heat pump system, the second usage-side heat exchanger is capable of heating an air medium by functioning as a radiator of the heat-source-side refrigerant. Therefore, the aqueous medium heated in the first usage-side heat exchanger and the usage-side refrigerant circuit is used not only for hot-water supply, but the air medium heated in the second usage-side heat exchanger can also be used for indoor air warming.

The heat pump system according to a nineteenth aspect of the present invention is the heat pump system according to the eighteenth aspect, wherein in the case that operation is performed for causing the second usage-side heat exchanger to function as a radiator of the heat-source-side refrigerant, the target heat-source-side discharge saturation temperature is made greater than the case in which operation is not performed for causing the second usage-side heat exchanger to function as a radiator of the heat-source-side refrigerant.

In this heat pump system, in the case that operation is performed for causing the second usage-side heat exchanger to function as a radiator of the heat-source-side refrigerant, the target heat-source-side discharge saturation temperature is made greater than the case in which operation is not performed for causing the second usage-side heat exchanger to function as a radiator of the heat-source-side refrigerant. Therefore, in the case that the operation for causing the second usage-side heat exchanger to function as a radiator of the heat-source-side refrigerant is not performed, operation is performed so that the refrigeration cycle in the heat-source-side refrigerant circuit is performed at the lowest pressure possible to increase operating efficiency in the heat-source-side refrigerant circuit and to cause the second usage-side refrigerant heat exchanger to function as a radiator of the heat-source-side refrigerant. In such a case, it is possible to feed heat-source-side refrigerant at a saturation temperature suitable for heating the air medium in the second usage-side heat exchanger.

The heat pump system according to a twentieth aspect of the present invention is the heat pump system according to any of the first to seventeenth aspects, wherein the heat-source-side refrigerant circuit further comprises a second usage-side heat exchanger capable of cooling an air medium by functioning as an evaporator of the heat-source-side refrigerant, the heat-source-side refrigerant circuit being capable of performing operation for causing the first usage-side heat exchanger to function as a radiator of the heat-source-side refrigerant and performing operation for causing the second usage-side heat exchanger to function as an evaporator of the heat-source-side refrigerant.

In this heat pump system, not only can operation be performed for heating the aqueous medium by the first usage-side heat exchanger and the usage-side refrigerant circuit, but also operation is performed for heating the aqueous medium by the first usage-side heat exchanger and the usage-side refrigerant circuit, and the heat of cooling obtained by the heat-source-side refrigerant by heating the aqueous medium can be used in the operation for cooling the air medium by evaporation of the heat-source-side refrigerant in the second usage-side heat exchanger. Therefore, for example, the aqueous medium heated by the first usage-side heat exchanger and the usage-side refrigerant circuit is used for hot-water supply, the air medium cooled in the second usage-side heat exchanger is used for indoor air cooling, and the heat of cooling obtained by the heat-source-side refrigerant by heating the aqueous medium can be used in an effective manner, whereby energy saving can be ensured.

The heat pump system according to a twenty-first aspect of the present invention is the heat pump system according to any of the first to twentieth aspects, wherein a plurality of the first usage-side heat exchangers is provided; and a plurality of the usage-side refrigerant circuits is provided so as to correspond to the first usage-side heat exchangers.

DESCRIPTION OF EMBODIMENTS

Embodiments of the heat pump system according to the present invention will be described based on the drawings.

First Embodiment

Configuration

—Overall Configuration—

Figure 1:
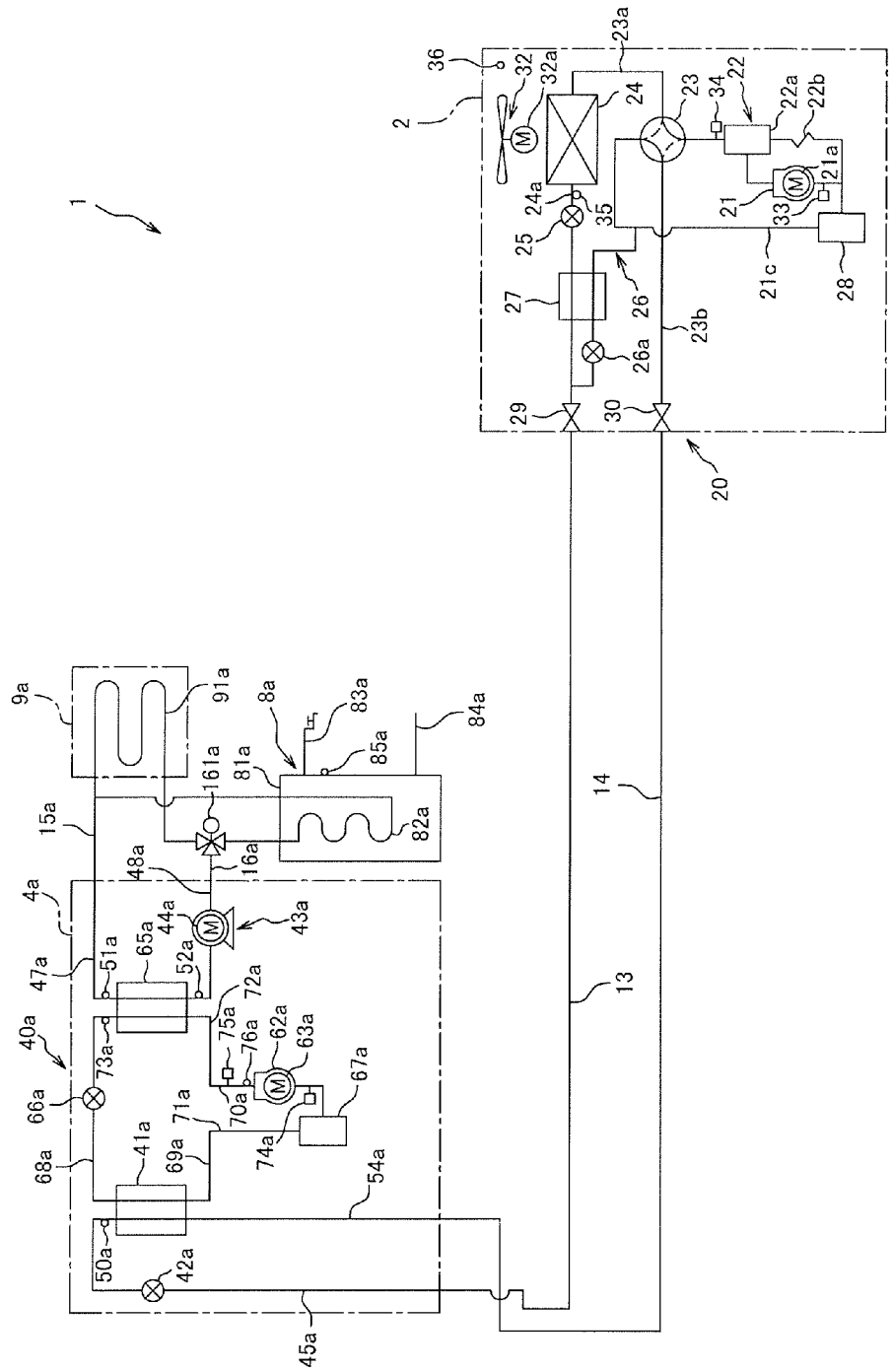
FIG. 1 is a view showing the general configuration of the heat pump system according to a first embodiment and Modification 1 of the first embodiment.

FIG. 1 is a view showing the general configuration of a heat pump system 1 according to a first embodiment of the present invention. The heat pump system 1 is an apparatus capable of operation for heating an aqueous medium, and other operation by utilizing a vapor compression heat pump cycle.

The heat pump system 1 mainly has a heat source unit 2, a first usage unit 4a, a liquid refrigerant communication tube 13, a gas refrigerant communication tube 14, a hot-water storage unit 8a, a hot-water air-warming unit 9a, an aqueous medium communication tube 15a, and an aqueous medium communication tube 16a. The heat source unit 2 and the first usage unit 4a constitute a heat-source-side refrigerant circuit 20 by being connected via the refrigerant communication tubes 13, 14. The first usage unit 4a constitutes a usage-side refrigerant circuit 40a. The first usage unit 4a, the hot-water storage unit 8a, and the hot-water air-warming unit 9a constitute an aqueous medium circuit 80a by being connected via the aqueous medium communication tubes 15a, 16a. HFC-410A, which is a type of HFC-based refrigerant, is enclosed inside the heat-source-side refrigerant circuit 20 as a heat-source-side refrigerant, and an ester-based or ether-based refrigeration machine oil having compatibility with respect to the HFC-based refrigerant is enclosed for lubrication of a heat-source-side compressor 21 (described later). Also, HFC-134a, which is a type of HFC-based refrigerant, is enclosed inside the usage-side refrigerant circuit 40a as a usage-side refrigerant, and an ester-based or ether-based refrigeration machine oil having compatibility with respect to the HFC-based refrigerant is enclosed for lubrication of a usage-side compressor 62a. The usage-side refrigerant is preferably one in which the pressure that corresponds to a saturated gas temperature of 65° C. is a maximum gauge pressure of 2.8 MPa or less, and is more preferably a refrigerant of 2.0 MPa or less from the viewpoint of using a refrigerant that is advantageous for a high-temperature refrigeration cycle. HFC-134a is a type of refrigerant having such saturation pressure characteristics. Water is used as the aqueous medium in the aqueous medium circuit 80a.

—Heat Source Unit—

The heat source unit 2 is disposed outdoors, and is connected to the first usage unit 4a via the refrigerant communication tubes 13, 14 and constitutes a portion of the heat-source-side refrigerant circuit 20.

The heat source unit 2 mainly has a heat-source-side compressor 21, an oil separation mechanism 22, a heat-source-side switching mechanism 23, a heat-source-side heat exchanger 24, a heat-source-side expansion valve 25, an intake return tube 26, a subcooler 27, a heat-source-side accumulator 28, a liquid-side shutoff valve 29, and a gas-side shutoff valve 30.

The heat-source-side compressor 21 is a mechanism for compressing the heat-source-side refrigerant. The heat-source-side compressor 21 used herein is an airtight compressor in which a rotary-type, scroll-type, or other positive-displacement compression element (not shown) housed in a casing (not shown) is driven by a heat-source-side compressor motor 21a which is also housed in the casing. A high-pressure space (not shown) filled by the heat-source-side refrigerant after compression in the compression element is formed inside the casing of the heat-source-side compressor 21, and refrigeration machine oil is stored in the high-pressure space. The rotation speed (i.e., the operating frequency) of the heat-source-side compressor motor 21a can be varied by an inverter apparatus (not shown), and the capacity of the heat-source-side compressor 21 can thereby be controlled.

The oil separation mechanism 22 is a mechanism for separating refrigeration machine oil included in the heat-source-side refrigerant that is discharged from the heat-source-side compressor 21 and returning the refrigeration machine oil to the intake of the heat-source-side compressor. The oil separation mechanism 22 has primarily an oil separator 22a provided to a heat-source-side discharge tube 21b of the heat-source-side compressor 21; and an oil return tube 22b for connecting the oil separator 22a and a heat-source-side intake tube 21c of the heat-source-side compressor 21. The oil separator 22a is a device for separating refrigeration machine oil included in the heat-source-side refrigerant that is discharged from the heat-source-side compressor 21. The oil return tube 22b has a capillary tube, and is a refrigerant tube for returning the refrigeration machine oil separated from the heat-source-side refrigerant in the oil separator 22a to the heat-source-side intake tube 21c of the heat-source-side compressor 21.

The heat-source-side switching mechanism 23 is a four-way switching valve capable of switching between a heat-source-side radiating operation state in which the heat-source-side heat exchanger 24 functions as a radiator of the heat-source-side refrigerant, and a heat-source-side evaporating operation state in which the heat-source-side heat exchanger 24 functions as a evaporator of the heat-source-side refrigerant. The heat-source-side switching mechanism 23 is connected to the heat-source-side discharge tube 21b, the heat-source-side intake tube 21c, a first heat-source-side gas refrigerant tube 23a connected to the gas side of the heat-source-side heat exchanger 24, and a second heat-source-side gas refrigerant tube 23b connected to the gas-side shutoff valve 30. The heat-source-side switching mechanism 23 is capable of switching for communicating the heat-source-side discharge tube 21b with the first heat-source-side gas refrigerant tube 23a, and communicating the second heat-source-side gas refrigerant tube 23b with the heat-source-side intake tube 21c (this switching corresponding to the heat-source-side radiating operation state, indicated by solid lines in the heat-source-side switching mechanism 23 in FIG. 1). The heat-source-side switching mechanism 23 is also capable of switching for communicating the heat-source-side discharge tube 21b with the second heat-source-side gas refrigerant tube 23b, and communicating the first heat-source-side gas refrigerant tube 23a with the heat-source-side intake tube 21c (this switching corresponding to the heat-source-side evaporating operation state, indicated by dashed lines in the heat-source-side switching mechanism 23 in FIG. 1). The heat-source-side switching mechanism 23 is not limited to a four-way switching valve, and may configured so as to have a function for switching the same directions of heat-source-side refrigerant flow as those described above, through the use of a combination of a plurality of solenoid valves or the like, for example.

The heat-source-side heat exchanger 24 is a heat exchanger for functioning as a radiator or evaporator of the heat-source-side refrigerant by exchanging heat between the heat-source-side refrigerant and outdoor air. A heat-source-side liquid refrigerant tube 24a is connected to the liquid side of the heat-source-side heat exchanger 24, and the first heat-source-side gas refrigerant tube 23a is connected to the gas side thereof. The outdoor air for heat exchange with the heat-source-side refrigerant in the heat-source-side heat exchanger 24 is fed by a heat-source-side fan 32 which is driven by a heat-source-side fan motor 32a.

The heat-source-side expansion valve 25 is an electrical expansion valve for performing such functions as depressurizing the heat-source-side refrigerant flowing through the heat-source-side heat exchanger 24, and is provided to the heat-source-side liquid refrigerant tube 24a.

The intake return tube 26 is a refrigerant tube for diverting a portion of the heat-source-side refrigerant flowing through the heat-source-side liquid refrigerant tube 24a and returning the diverted refrigerant to the intake of the heat-source-side compressor 21, and in the present embodiment, one end of the intake return tube 26 is connected to the heat-source-side liquid refrigerant tube 24a, and the other end is connected to the heat-source-side intake tube 21c. An intake return expansion valve 26a, the opening degree of which can be controlled, is provided to the intake return tube 26. The intake return expansion valve 26a is composed of an electrical expansion valve.

The subcooler 27 is a heat exchanger for exchanging heat between the heat-source-side refrigerant flowing through the heat-source-side liquid refrigerant tube 24a and the heat-source-side refrigerant flowing through the intake return tube 26 (more specifically, the heat-source-side refrigerant that has been depressurized by the intake return expansion valve 26a).

The heat-source-side accumulator 28 is provided to the heat-source-side intake tube 21c, and is a container for temporarily storing the heat-source-side refrigerant circulated through the heat-source-side refrigerant circuit 20 before the heat-source-side refrigerant is drawn into the heat-source-side compressor 21 from the heat-source-side intake tube 21c.

The liquid-side shutoff valve 29 is a valve provided at the connection between the heat-source-side liquid refrigerant tube 24a and the liquid refrigerant communication tube 13. The gas-side shutoff valve 30 is a valve provided at the connection between the second heat-source-side gas refrigerant tube 23b and the gas refrigerant communication tube 14.

Various types of sensors are provided to the heat source unit 2. Specifically, the heat source unit 2 is provided with a heat-source-side intake pressure sensor 33 for detecting a heat-source-side intake pressure Ps1, which is the pressure of the heat-source-side refrigerant in the intake of the heat-source-side compressor 21; a heat-source-side discharge pressure sensor 34 for detecting a heat-source-side discharge pressure Pd1, which is the pressure of the heat-source-side refrigerant in the discharge of the heat-source-side compressor 21; a heat-source-side heat exchange temperature sensor 35 for detecting a heat-source-side heat exchanger temperature Thx, which is the temperature of the heat-source-side refrigerant in the liquid side of the heat-source-side heat exchanger 24; and an outside-air temperature sensor 36 for detecting the outside air temperature To.

—Liquid Refrigerant Communication Tube—

The liquid refrigerant communication tube 13 is connected to the heat-source-side liquid refrigerant tube 24a via the liquid-side shutoff valve 29, and the liquid refrigerant communication tube 13 is a refrigerant tube capable of directing the heat-source-side refrigerant to the outside of the heat source unit 2 from the outlet of the heat-source-side heat exchanger 24 which functions as a radiator of the heat-source-side refrigerant when the heat-source-side switching mechanism 23 is in the heat-source-side radiating operation state. The liquid refrigerant communication tube 13 is also a refrigerant tube capable of introducing the heat-source-side refrigerant from outside the heat source unit 2 into the inlet of the heat-source-side heat exchanger 24 which functions as an evaporator of the heat-source-side refrigerant when the heat-source-side switching mechanism 23 is in the heat-source-side evaporating operation state.

—Gas Refrigerant Communication Tube—

The gas refrigerant communication tube 14 is connected to the second heat-source-side gas refrigerant tube 23b via the gas-side shutoff valve 30. The gas refrigerant communication tube 14 is a refrigerant tube capable of introducing the heat-source-side refrigerant into the intake of the heat-source-side compressor 21 from outside the heat source unit 2 when the heat-source-side switching mechanism 23 is in the heat-source-side radiating operation state. The gas refrigerant communication tube 14 is also a refrigerant tube capable of directing the heat-source-side refrigerant to the outside of the heat source unit 2 from the discharge of the heat-source-side compressor 21 when the heat-source-side switching mechanism 23 is in the heat-source-side evaporating operation state.

—First Usage Unit—

The first usage unit 4a is disposed indoors, and is connected to the heat source unit 2 via the refrigerant communication tubes 13, 14. The first usage unit 4a constitutes a portion of the heat-source-side refrigerant circuit 20. The first usage unit 4a constitutes the usage-side refrigerant circuit 40a. The first usage unit 4a is furthermore connected to the hot-water storage unit 8a and the hot-water air-warming unit 9a via the aqueous medium communication tubes 15a, 16a, and constitutes a portion of the aqueous medium circuit 80a.

The first usage unit 4a mainly has a first usage-side heat exchanger 41a, the first usage-side flow rate adjustment valve 42a, the usage-side compressor 62a, the refrigerant/water heat exchanger 65a, a refrigerant/water heat exchange-side flow rate adjustment valve 66a, a usage-side accumulator 67a, and a circulation pump 43a.

The first usage-side heat exchanger 41a is a heat exchanger that functions as a radiator of the heat-source-side refrigerant by performing heat exchange between the heat-source-side refrigerant and the usage-side refrigerant. The first usage-side liquid refrigerant tube 45a is connected to the liquid side of the channel through which the heat-source-side refrigerant flows. The first usage-side gas refrigerant tube 54a is connected to the gas side of the channel through which the heat-source-side refrigerant flows. The cascade-side liquid-refrigerant tube 68a is connected to the liquid side of the channel through which the usage-side refrigerant flows. The second cascade-side gas-refrigerant tube 69a is connected to the gas side of the channel through which the usage-side refrigerant flows. The liquid refrigerant communication tube 13 is connected to the first usage-side liquid refrigerant tube 45a. The gas-refrigerant communication tube 14 is connected to the first usage-side gas refrigerant tube 54a. The refrigerant/water heat exchanger 65a is connected to the cascade-side liquid-refrigerant tube 68a. The usage-side compressor 62a is connected to the second cascade-side gas-refrigerant tube 69a.

The first usage-side flow rate adjustment valve 42a is an electrical expansion valve that can vary the flow rate of the heat-source-side refrigerant that flows through the first usage-side heat exchanger 41a by controlling the opening degree, and is provided to the first usage-side liquid refrigerant tube 45a.

The usage-side compressor 62a is a mechanism for compressing the usage-side refrigerant, and in this case, is a sealed compressor having rotary elements, scroll elements, or other type of positive displacement compression elements (not shown) accommodated in a casing (not shown), and is driven by a usage-side compression motor 63a accommodated in the same casing. A high-pressure space (not shown) which is filled with the usage-side refrigerant that has been compressed in the compression element is formed inside the casing of the usage-side compressor 62a, and refrigeration machine oil is accumulated in this high-pressure space. The rotational speed (i.e., operational frequency) of the usage-side compression motor 63a can be varied by using an inverter device (not shown), whereby the capacity of the usage-side compressor 62a can be controlled. A cascade-side discharge tube 70a is connected to the discharge of the usage-side compressor 62a, and a cascade-side intake tube 71a is connected to the intake of the usage-side compressor 62a. The cascade-side gas-refrigerant tube 71a is connected to the second cascade-side gas-refrigerant tube 69a.

The refrigerant/water heat exchanger 65a is a heat exchanger that functions as a radiator of the usage-side refrigerant by heat exchange between the usage-side refrigerant and the aqueous medium. A cascade-side liquid-refrigerant tube 68a is connected to the liquid side of the channel through which the usage-side refrigerant flows. A first cascade-side gas-refrigerant tube 72a is connected to the gas side of the channel through which the usage-side refrigerant flows. A first usage-side water inlet tube 47a is connected to the inlet side of the channel through which the aqueous medium flows. A first usage-side water outlet tube 48a is connected to the outlet side of the channel through which the aqueous medium flows. The first cascade-side gas-refrigerant tube 72a is connected to the cascade-side discharge tube 70a. An aqueous medium communication tube 15a is connected to the first usage-side water inlet tube 47a and an aqueous medium communication tube 16a is connected to the first usage-side water outlet tube 48a.

The refrigerant/water heat exchange-side flow rate adjustment valve 66a is an electrical expansion valve that can vary the flow rate of the usage-side refrigerant that flows through the refrigerant/water heat exchanger 65a by controlling the opening degree, and is provided to the cascade-side liquid-refrigerant tube 68a.

The usage-side accumulator 67a is a container provided to the cascade-side intake tube 71a and is used for temporarily accumulating the usage-side refrigerant circulating through the usage-side refrigerant circuit 40a before the usage-side refrigerant is taken from the cascade-side intake tube 71a into the usage-side compressor 62a.

In this manner, the usage-side compressor 62a, the refrigerant/water heat exchanger 65a, the refrigerant/water heat exchange-side flow rate adjustment valve 66a, and the first usage-side heat exchanger 41a are connected via the refrigerant tubes 71a, 70a, 72a, 68a, 69a to thereby constitute the usage-side refrigerant circuit 40a.

The circulation pump 43a is a mechanism for increasing the pressure of the aqueous medium, and in this configuration, is a pump in which a centrifugal and/or positive-displacement pump element (not shown) is driven by a circulation pump motor 44a. The circulation pump 43a is provided to the first usage-side water outlet tube 48a. The rotational speed (i.e., operational frequency) of the circulation pump motor 44a can be varied by using an inverter device (not shown), whereby the capacity of the circulation pump 43a can be controlled.

The first usage unit 4a thereby causes the first usage-side heat exchanger 41a to function as a radiator of the heat-source-side refrigerant introduced from the gas-refrigerant communication tube 14, whereby hot-water supply operation is made possible in which the heat-source-side refrigerant having released heat in the first usage-side heat exchanger 41a is directed out to the liquid refrigerant communication tube 13, the usage-side refrigerant circulating through the usage-side refrigerant circuit 40a is heated by the heat released by the heat-source-side refrigerant in the first usage-side heat exchanger 41a, the usage-side refrigerant thus heated is compressed in the usage-side compressor 62a, and the aqueous medium is thereafter heated by the heat released in the refrigerant/water heat exchanger 65a.

Various types of sensors are provided to the first usage unit 4a. Specifically provided to the first usage unit 4a are a first usage-side heat exchange temperature sensor 50a for detecting a first usage-side refrigerant temperature Tsc1, which is the temperature of the heat-source-side refrigerant in the liquid side of the first usage-side heat exchanger 41a; a first refrigerant/water heat exchange temperature sensor 73a for detecting a cascade-side refrigerant temperature Tsc2, which is the temperature of the usage-side refrigerant in the liquid side of the refrigerant/water heat exchanger 65a; an aqueous medium inlet temperature sensor 51a for detecting an aqueous medium inlet temperature Twr, which is the temperature of the aqueous medium in the inlet of the refrigerant/water heat exchanger 65a; an aqueous medium outlet temperature sensor 52a for detecting an aqueous medium outlet temperature Twl, which is the temperature of the aqueous medium in the outlet of the refrigerant/water heat exchanger 65a; a usage-side intake pressure sensor 74a for detecting a usage-side intake pressure Ps2, which is the pressure of the usage-side refrigerant in the intake of the usage-side compressor 62a; a usage-side discharge pressure sensor 75a for detecting the usage-side discharge pressure Pd2, which is the pressure of the usage-side refrigerant in the discharge of the usage-side compressor 62a; and a usage-side discharge temperature sensor 76a for detecting the usage-side discharge temperature Td2, which is the temperature of the usage-side refrigerant in the discharge of the usage-side compressor 62a.

—Hot-Water Storage Unit—

The hot-water storage unit 8a is installed indoors, is connected to the first usage unit 4a via the aqueous medium communication tubes 15a, 16a, and constitutes a portion of the aqueous medium circuit 80a.

The hot-water storage unit 8a has primarily a hot-water storage tank 81a and a heat exchange coil 82a.

The hot-water storage tank 81a is a container for storing water as the aqueous medium for the hot water supply, a hot-water supply tube 83a for sending the aqueous medium as hot water to a faucet, shower, or the like is connected to the top of the hot-water storage tank 81a, and a water supply tube 84a for replenishing the aqueous medium expended by the hot-water supply tube 83a is connected to the bottom of the hot-water storage tank 81a.

The heat exchange coil 82a is provided inside the hot-water storage tank 81a, and is a heat exchanger for functioning as a heater of the aqueous medium in the hot-water storage tank 81a by exchanging heat between the aqueous medium circulating through the aqueous medium circuit 80a and the aqueous medium inside the hot-water storage tank 81a. The aqueous medium communication tube 16a is connected to the inlet of the heat exchange coil 82a, and the aqueous medium communication tube 15a is connected to the outlet thereof.

The hot-water storage unit 8a is thereby capable of heating the aqueous medium inside the hot-water storage tank 81a through the use of the aqueous medium circulating through the aqueous medium circuit 80a, which has been heated in the first usage unit 4a, and storing the heated aqueous medium as hot water. The type of hot-water storage unit 8a used herein is a hot-water storage unit for storing, in a hot-water storage tank, the aqueous medium heated by heat exchange with the aqueous medium heated in the first usage unit 4a, but a type of hot-water storage unit for storing an aqueous medium heated in the first usage unit 4a in a hot-water storage tank may also be used.

Various sensors are also provided to the hot-water storage unit 8a. Specifically, the hot-water storage unit 8a is provided with a hot-water storage temperature sensor 85a for detecting a hot-water storage temperature Twh, which is the temperature of the aqueous medium stored in the hot-water storage tank 81a.

—Hot-Water Air-Warming Unit—

The hot-water air-warming unit 9a is installed indoors, is connected to the first usage unit 4a via the aqueous medium communication tubes 15a, 16a, and constitutes a portion of the aqueous medium circuit 80a.

The hot-water air-warming unit 9a has primarily a heat exchange panel 91a, and is composed of a radiator and/or a floor heating panel and other components.

The heat exchange panel 91a is provided alongside a wall or elsewhere indoors when configured as a radiator, and is provided under the floor or elsewhere indoors when configured as a floor heating panel. The heat exchange panel 91a is a heat exchanger for functioning as a radiator or heater of the aqueous medium circulated through the aqueous medium circuit 80a, and the aqueous medium communication tube 16a is connected to the inlet of the heat exchange panel 91a, and the aqueous medium communication tube 15a is connected to the outlet of the heat exchange panel 91a.

—Aqueous Medium Communication Tubes—

The aqueous medium communication tube 15a is connected to the outlet of the heat exchange coil 82a of the hot-water storage unit 8a, and the outlet of the heat exchange panel 91a of the hot-water air-warming unit 9a. The aqueous medium communication tube 16a is connected to the inlet of the heat exchange coil 82a of the hot-water storage unit 8a, and the inlet of the heat exchange panel 91a of the hot-water air-warming unit 9a. The aqueous medium communication tube 16a is provided with an aqueous-medium-side switching mechanism 161a capable of switching between feeding the aqueous medium circulated through the aqueous medium circuit 80a to both the hot-water storage unit 8a and the hot-water air-warming unit 9a, or to any one of the hot-water storage unit 8a and the hot-water air-warming unit 9a. The aqueous-medium-side switching mechanism 161a is composed of a three-way valve.

A controller (not shown) for performing the following operations and/or various controls is provided to the heat pump system 1.

<Operation>

The operation of the heat pump system 1 will be described next.

An operating mode of the heat pump system 1 is a hot-water supply operation mode for performing a hot-water supply operation (i.e., operation of the hot-water storage unit 8a and the hot-water air-warming unit 9a) of the first usage unit 4a.

Operation in the hot-water supply operation mode of the heat pump system 1 is described below.

—Hot-Water Supply Operation Mode—

In the case that hot-water supply operation of the first usage unit 4a is to be performed, the heat-source-side switching mechanism 23 is switched to a heat-source-side evaporating operation state (the state indicated by the broken line of the heat-source-side switching mechanism 23 of FIG. 1) and the intake-return expansion valve 26a is set in a closed state in the heat-source-side refrigerant circuit 20. Also, in the aqueous medium circuit 80a, the aqueous-medium-side switching mechanism 161a is switched to a state in which the aqueous medium is fed to the hot-water storage unit 8a and/or hot-water air-warming unit 9a.

In the heat-source-side refrigerant circuit 20 in such a state, the low-pressure, heat-source-side refrigerant in the refrigeration cycle is taken into the heat-source-side compressor 21 via the heat-source-side intake tube 21c, and is discharged to a heat-source-side discharge tube 21b after having been compressed to a high pressure in the refrigeration cycle. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c via the oil return tube 22b. The high-pressure, heat-source-side refrigerant from which the refrigeration machine oil has been separated out is sent from the heat source unit 2 to the gas-refrigerant communication tube 14 via the heat-source-side switching mechanism 23, the second heat-source-side gas refrigerant tube 23b, and the gas-side shutoff valve 30.

The high-pressure, heat-source-side refrigerant sent to the gas-refrigerant communication tube 14 is sent to the first usage unit 4a. The high-pressure, heat-source-side refrigerant sent to the first usage unit 4a is sent to the first usage-side heat exchanger 41a via the first usage-side gas refrigerant tube 54a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 via the first usage-side flow rate adjustment valve 42a and the first usage-side liquid refrigerant tube 45a.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a via the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a via the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48a and pressurized, and is then sent from the first usage unit 4a to the aqueous medium communication tube 16a. The aqueous medium sent to the aqueous medium communication tube 16a is sent to the hot-water storage unit 8a and/or the hot-water air-warming unit 9a by way of the aqueous-medium-side switching mechanism 161a. The aqueous medium sent to the hot-water storage unit 8a undergoes heat exchange with the aqueous medium inside the hot-water storage tank 81a and releases heat in the heat exchange coil 82a, whereby the aqueous medium inside the hot-water storage tank 81a is heated. The aqueous medium sent to the hot-water air-warming unit 9a releases heat in the heat exchange panel 91a, whereby indoor walls or the like are heated and indoor floors are heated.

Operation in the hot-water supply operation mode for performing only hot-water supply operation of the first usage unit 4a is performed in this manner.

—Discharge Saturation Temperature Control of Each Refrigerant Circuit and Degree-of-Subcooling Control of Each Heat Exchanger Outlet—

Described next is the discharge saturation temperature control of the refrigerant circuits 20, 40a and the degree-of-subcooling control of the outlet of the heat exchangers 41a, 65a in the hot-water supply operation described above.

In the heat pump system 1, the usage-side refrigerant circulating through the usage-side refrigerant circuit 40a is heated by heat released by the heat-source-side refrigerant circulating through the heat-source-side refrigerant circuit 20 in the first usage-side heat exchanger 41a, as described above, and the usage-side refrigerant circuit 40a can achieve a higher temperature refrigeration cycle than the refrigeration cycle in the heat-source-side refrigerant circuit 20 by using the heat obtained from the heat-source-side refrigerant. Therefore, a high-temperature aqueous medium can be obtained by heat released from the usage-side refrigerant in the refrigerant/water heat exchanger 65a. At this time, it is preferred that control be performed so that the refrigeration cycle in the heat-source-side refrigerant circuit 20 and the refrigeration cycle in the usage-side refrigerant circuit 40a both become stable in order to stably obtain a high-temperature aqueous medium.

In view of the above, in the heat pump system 1, the compressors 21, 62a of the two refrigerant circuits 20, 40a are both variable capacity compressors, and discharge saturation temperatures Tc1, Tc2 become predetermined target discharge saturation temperatures Tc1s, Tc2s using saturation temperatures that correspond to the pressure of the refrigerant in the discharge of the compressors 21, 62a (i.e., the heat-source-side discharge saturation temperature Tc1 and the usage-side discharge saturation temperature Tc2) as representative values of the pressure of the refrigerant of the refrigeration cycles.

Here, the heat-source-side discharge saturation temperature Tc1 is a value obtained by converting the heat-source-side discharge pressure Pd1, which is the pressure of the heat-source-side refrigerant in the discharge of the heat-source-side compressor 21, to a saturation temperature corresponding to this pressure value, and the usage-side discharge saturation temperature Tc2 is a value obtained by converting the usage-side discharge pressure Pd2, which is the pressure of the usage-side refrigerant in the discharge of the usage-side compressor 62a, to a saturation temperature that corresponds to this pressure value.

Control is performed in the heat-source-side refrigerant circuit 20 so that the rotational speed (i.e., the operational frequency) of the heat-source-side compressor 21 is increased to increase the operating capacity of the heat-source-side compressor 21 in the case that the heat-source-side discharge saturation temperature Tc1 is less than the target heat-source-side discharge saturation temperature Tc1s; and the rotational speed (i.e., the operational frequency) of the heat-source-side compressor 21 is reduced to thereby decrease the operating capacity of the heat-source-side compressor 21 in the case that the heat-source-side discharge saturation temperature Tc1 is greater than the target heat-source-side discharge saturation temperature Tc1s. Control is performed in the usage-side refrigerant circuit 40a so that the rotational speed (i.e., the operational frequency) of the usage-side compressor 62a is increased to increase the operating capacity of the usage-side compressor 62a in the case that the usage-side discharge saturation temperature Tc2 is less than the target usage-side discharge saturation temperature Tc2s; and the rotational speed (i.e., the operational frequency) of the usage-side compressor 62a is reduced to thereby decrease the operating capacity of the usage-side compressor 62a in the case that the usage-side discharge saturation temperature Tc2 is greater than the target usage-side discharge saturation temperature Tc2s.

The pressure of the heat-source-side refrigerant flowing through the first usage-side heat exchanger 41a in the heat-source-side refrigerant circuit 20 is thereby made stable and the pressure of the usage-side refrigerant flowing through the refrigerant/water heat exchanger 65a in the usage-side refrigerant circuit 40a is made stable. Therefore, the state of the refrigeration cycle in the two refrigerant circuits 20, 40a can be made stable and a high-temperature aqueous medium can be stably obtained.

At this point, it is preferred that the target discharge saturation temperatures Tc1s, Tc2s be suitably set in order to obtain an aqueous medium with a desired temperature.

In view of the above, in this heat pump system 1, a predetermined target aqueous medium outlet temperature Twls, which is the target value of the temperature of the aqueous medium in the outlet of the refrigerant/water heat exchanger 65a, is first set for the first usage-side heat exchanger 41a, and the target usage-side discharge saturation temperature Tc2s is set as a value varied by the target aqueous medium outlet temperature Twls. In this situation, these temperatures are set by conversion into a function in a range of 30° C. to 85° C. so that the target aqueous medium outlet temperature Twls is set to a high temperature, and in accompaniment therewith, the target usage-side discharge saturation temperature Tc2s also becomes a high temperature and becomes a slightly higher temperature than the target aqueous medium outlet temperature Twls, for example, so that the target usage-side discharge saturation temperature Tc2s is set to 85° C. in the case that the target aqueous medium outlet temperature Twls is set to 80° C., and the target usage-side discharge saturation temperature Tc2s is set to 30° C. in the case that the target aqueous medium outlet temperature Twls is set to 25° C. and the like. The target usage-side discharge saturation temperature Tc2s is thereby suitably set in accordance with the target aqueous medium outlet temperature Twls. A desired target aqueous medium outlet temperature Tws is therefore readily obtained and control can be performed with good responsiveness even when the target aqueous medium outlet temperature Tws has been modified.

In relation to the heat-source-side refrigerant circuit 20, the target heat-source-side discharge saturation temperature Tc1s is set as a value that can vary according to the target usage-side discharge saturation temperature Tc2s or the target aqueous medium outlet temperature Tws. Here, these temperatures are set by conversion into a function in a range of 10° C. to 40° C. so that the target usage-side discharge saturation temperature Tc2s or the target aqueous medium outlet temperature Tws is set to a high temperature, and in accompaniment therewith, the target heat-source-side discharge saturation temperature Tc1s also reaches a high temperature range and also reaches a lower temperature range than the target usage-side discharge saturation temperature Tc2s or the target aqueous medium outlet temperature Tws, for example, so that the target heat-source-side discharge saturation temperature Tc1s is set to a temperature range of 35° C. to 40° C. in the case that, e.g., the target usage-side discharge saturation temperature Tc2s or the target aqueous medium outlet temperature Tws is set to 75° C. or 80° C.; and the target heat-source-side discharge saturation temperature Tc1s is set to a temperature range of 10° C. to 15° C. in the case that the target usage-side discharge saturation temperature Tc2s or the target aqueous medium outlet temperature Tws is set to 30° C. or 25° C. The target usage-side discharge saturation temperature Tc2s is preferably set to a single temperature as described above for the purpose of accurately obtaining the target aqueous medium outlet temperature Tws. However, the target heat-source-side discharge saturation temperature Tc1s is not required to have an exact setting as does the target usage-side discharge saturation temperature Tc2, and is preferably provided with a certain temperature width allowance. The target heat-source-side discharge saturation temperature Tc1s is therefore preferably set in the temperature range as described above. Since the target heat-source-side discharge saturation temperature Tc1s is thereby suitably set in accordance with the target usage-side discharge saturation temperature Tc2s or the target aqueous medium outlet temperature Tws, the refrigeration cycle can be suitably controlled in the heat-source-side refrigerant circuit 20 in accordance with the state of the refrigeration cycle in the usage-side refrigerant circuit 40a.

In this heat pump system 1, the first usage-side flow rate adjustment valve 42a is provided as a mechanism for main depressurization of the heat-source-side refrigerant flowing through the heat-source-side refrigerant circuit 20, and the refrigerant/water heat-exchange-side flow rate adjustment valve 66a is provided as a mechanism for main depressurization of the usage-side refrigerant flowing through the usage-side refrigerant circuit 40a; and the opening degree of the first usage-side flow rate adjustment valve 42a is performed in the heat-source-side refrigerant circuit 20 so that the heat-source-side refrigerant degree-of-subcooling SC1, which is the heat-source-side refrigerant degree-of-subcooling in the outlet of the first usage-side heat exchanger 41a, becomes a target heat-source-side refrigerant degree-of-subcooling SC1s, and the opening degree of the refrigerant/water heat-exchange-side flow rate adjustment valve 66a is performed in the usage-side refrigerant circuit 40a so that the usage-side refrigerant degree-of-subcooling SC2, which is the usage-side refrigerant degree-of-subcooling in the outlet of the refrigerant/water heat exchanger 65a, becomes a target usage-side refrigerant degree-of-subcooling SC2s.

Here, the heat-source-side refrigerant degree-of-subcooling SC1 is a value obtained by subtracting the first usage-side refrigerant temperature Tsc1 from the heat-source-side discharge saturation temperature Tc1, and the usage-side refrigerant degree-of-subcooling SC2 is a value obtained by subtracting the cascade-side refrigerant temperature Tsc2 from the usage-side discharge saturation temperature Tc2.

In the heat-source-side refrigerant circuit 20, the flow rate of the heat-source-side refrigerant flowing through the first usage-side heat exchanger 41a is reduced by reducing the opening degree of the first usage-side flow rate adjustment valve 42a in the case that the heat-source-side refrigerant degree-of-subcooling SC1 is less than the target heat-source-side refrigerant degree-of-subcooling SC1s, and the flow rate of the heat-source-side refrigerant flowing through the first usage-side heat exchanger 41a is increased by increasing the opening degree of the first usage-side flow rate adjustment valve 42a in the case that the heat-source-side refrigerant degree-of-subcooling SC1 is greater than the target heat-source-side refrigerant degree-of-subcooling SC1s. In the usage-side refrigerant circuit 40a, the flow rate of the usage-side refrigerant flowing through the refrigerant/water heat exchanger 65a is reduced by reducing the opening degree of the refrigerant/water heat-exchange-side flow rate adjustment valve 66a in the case that the usage-side refrigerant degree-of-subcooling SC2 is less than the target usage-side refrigerant degree-of-subcooling SC2s; and the flow rate of the usage-side refrigerant flowing through the refrigerant/water heat exchanger 65a is increased by increasing the opening degree of the refrigerant/water heat-exchange-side flow rate adjustment valve 66a in the case that the usage-side refrigerant degree-of-subcooling SC2 is greater than the target usage-side refrigerant degree-of-subcooling SC2s. The target refrigerant degrees-of-subcooling SC1s, SC2s are set with consideration given, inter alia, to the design conditions of the heat exchange capacity of the first usage-side heat exchanger 41a and the refrigerant/water heat exchanger 65a.

The flow rate of the heat-source-side refrigerant flowing through the first usage-side heat exchanger 41a in the heat-source-side refrigerant circuit 20 is stabilized thereby, and the flow rate of the usage-side refrigerant flowing through the refrigerant/water heat exchanger 65a in the usage-side refrigerant circuit 40a is stabilized thereby. Therefore, operation can be performed in conditions suitable to the heat exchange capacity of the first usage-side heat exchanger 41a and the refrigerant/water heat exchanger 65a, thereby contributing to the stabilization of the state of the refrigeration cycle in the two refrigerant circuits 20, 40a.

In this manner, in the heat pump system 1, the pressure and flow rate of the refrigerant in the refrigerant circuits 20, 40a is stabilized by controlling the discharge saturation temperature of the refrigerant circuits 20, 40a and by controlling the degree of subcooling in the outlet of the heat exchangers 41a, 65a, whereby the state of the refrigeration cycle in the two refrigerant circuits 20, 40a can be stabilized and a high-temperature aqueous medium can be stably obtained.

—Controlling of the Flow Rate of the Aqueous Medium Circulating Through the Aqueous Medium Circuit—

Described next is control of the flow rate of the aqueous medium circulating through the aqueous medium circuit 80a in the hot-water supply operation described above.

In this heat pump system 1, the capacity of the circulation pump 43a is controlled so that the aqueous medium outlet/inlet temperature difference $\Delta Tw$ becomes a predetermined target aqueous medium outlet/inlet temperature difference $\Delta Tws$, the aqueous medium outlet/inlet temperature difference $\Delta Tw$ being the difference (i.e., Twl−Twr) between the temperature of the aqueous medium in the outlet of the refrigerant/water heat exchanger 65a (i.e., the aqueous medium outlet temperature Twl) and the temperature of the aqueous medium in the inlet of the refrigerant/water heat exchanger 65a (i.e., the aqueous medium inlet temperature Twr). More specifically, in the case that the aqueous medium outlet/inlet temperature difference $\Delta Tw$ is greater than the target aqueous medium outlet/inlet temperature difference $\Delta Tws$, it is determined that the flow rate of the aqueous medium circulating through the aqueous medium circuit 80a is low, and the operating capacity of the circulation pump 43a is increased by increasing the rotational speed (i.e., operational frequency) of the circulation pump motor 44a; and in the case that the aqueous medium outlet/inlet temperature difference $\Delta Tw$ is less than the target aqueous medium outlet/inlet temperature difference $\Delta Tws$, it is determined that the flow rate of the aqueous medium circulating in the aqueous medium circuit 80a is high, and the operating capacity of the circulation pump 43a is reduced by reducing the rotational speed (i.e., operational frequency) of the circulation pump motor 44a. The flow rate of the aqueous medium circulating through the aqueous medium circuit 80a is thereby designed to be suitably controlled. The target aqueous medium outlet/inlet temperature difference $\Delta Tws$ is set with consideration given to the design conditions or the like of the heat-exchange capacity of the refrigerant/water heat exchanger 65a.

—Controlling of the Startup of Each Circuit—

Figure 2:
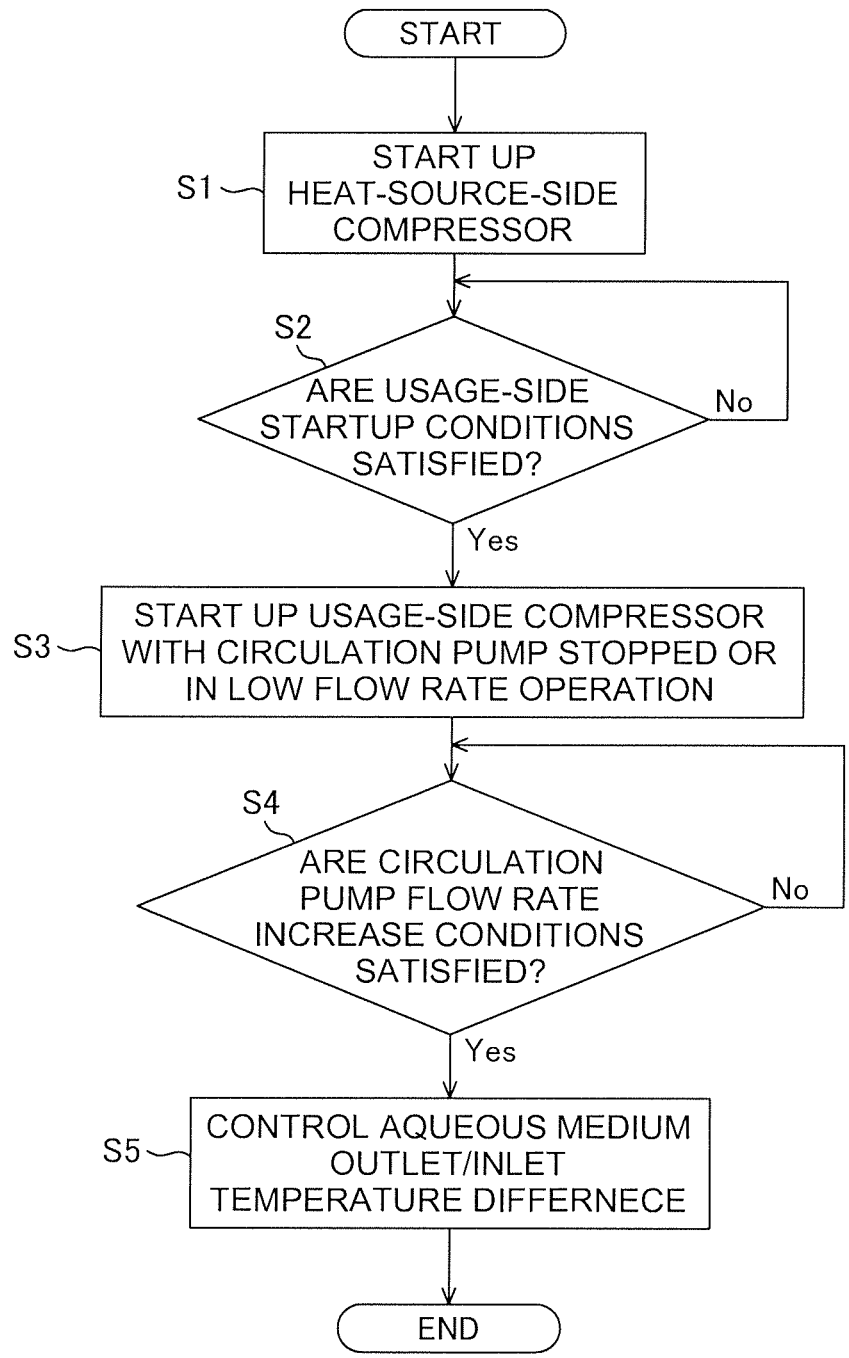
FIG. 2 is a flowchart showing the control of the startup of each circuit in the first, second, and third embodiments.

Described next with reference to FIG. 2 is control of starting up the circuits 20, 40a, 80a when the above-described hot-water supply operation is started.

In this heat pump system 1, the heat-source-side compressor 21 is first started up and the usage-side compressor 62a is subsequently started up in the case that the heat-source-side compressor 21 and the usage-side compressor 62a are to be started up from a stopped state to start the hot-water supply operation. More specifically, the heat-source-side compressor 21 is started up (step S1), and after it has been determined that predetermined usage-side compressor startup conditions have been met (step S2), the usage-side compressor 62a is started up (step S3).

Heat exchange between the heat-source-side refrigerant and the usage-side refrigerant in the first usage-side heat exchanger 41a is thereby less likely to be actively performed, whereby the heat-source-side discharge pressure Pd1, which is the pressure of the heat-source-side refrigerant in the discharge of the heat-source-side compressor 21, rapidly increases; the heat-source-side outlet/inlet pressure difference $\Delta P1$, which is the pressure difference between the heat-source-side discharge pressure Pd1 and the heat-source-side intake pressure Ps1, is more readily ensured, the heat-sourceside intake pressure Ps1 being the pressure of the heat-source-side refrigerant in the intake of the heat-source-side compressor 21; and the heat-source-side refrigerant circuit 20 can be rapidly and stably started up.

The usage-side compressor startup conditions are set in order to reliably prevent the usage-side compressor 62a from starting up in a state in which the heat-source-side discharge pressure Pd1 does not increase and/or the heat-source-side outlet/inlet pressure difference ΔP1 is not ensured, i.e., when the state of the refrigeration cycle in the heat-source-side refrigerant circuit 20 is not stable. Here, the compressor-side startup conditions are that the heat-source-side discharge pressure Pd1 be equal to or greater than a predetermined heat-source-side startup discharge pressure Pdi1, or that the heat-source-side outlet/inlet pressure difference ΔPd1 be equal to or greater than a predetermined heat-source-side startup pressure difference ΔPdi1.

Next, the usage-side compressor 62a is started up, but at this time, the aqueous medium flowing through the refrigerant/water heat exchanger 65a is less likely to increase in temperature when the flow rate of the aqueous medium circulating through the aqueous medium circuit 80a is high, heat exchange between the usage-side refrigerant and the aqueous medium in the refrigerant/water heat exchanger 65a is actively performed immediately after the usage-side compressor 62a is started up, whereby the usage-side discharge pressure Pd2, which is the pressure of the usage-side refrigerant in the discharge of the usage-side compressor 62a, is less likely to increase rapidly; the usage-side outlet/inlet pressure difference ΔP2, which is the pressure difference between the usage-side discharge pressure Pd2 and the usage-side intake pressure Ps2, is less liable to be ensured, the usage-side intake pressure Ps2 being the pressure of the usage-side refrigerant in the intake of the usage-side compressor 62a; and the usage-side refrigerant circuit 40a is liable to be unable to start up in a rapid and stable fashion.

In view of the above, in the heat pump system 1, the usage-side compressor 62a is started up (step S3) with the circulation pump 43a in a stopped state or in an operation state at a low flow rate. More specifically, the usage-side compressor 62a is started up with the circulation pump 43a in a stopped state or in a state in which the circulation pump 43a is operating at a low flow rate with the rotational speed (i.e., the operational frequency) of the circulation pump motor 44a set to a minimum value.

The usage-side refrigerant circuit 40a can be rapidly and stably started up because heat exchange between the aqueous medium and the usage-side refrigerant in the refrigerant/water heat exchanger 65a is less actively performed, the usage-side discharge pressure Pd2 more readily increases in rapid fashion, and the usage-side outlet/inlet pressure difference ΔP2 is more readily ensured.

Next, the capacity of the circulation pump 43a is controlled so that the flow rate of the aqueous medium flowing through the aqueous medium circuit 80a is increased (step S5), but at this time, the capacity of the circulation pump 43a is not controlled so that the flow rate of the aqueous medium circulating through the aqueous medium circuit 80a is increased, until it has been determined that the predetermined circulation pump flow rate increase conditions have been satisfied (step S4).

Here, circulation pump flow rate-increase conditions are set in order to reliably prevent the capacity of the circulation pump 43a from being controlled so that the flow rate of the aqueous medium flowing through the aqueous medium circuit 80a is increased (here, aqueous medium outlet/inlet temperature difference control is performed so as to control the operating capacity of the circulation pump 43a so that the aqueous medium outlet/inlet temperature difference ΔTw becomes the target aqueous medium outlet/inlet temperature difference ΔTws; step S5) in a state in which usage-side discharge pressure Pd2 does not increase or the usage-side outlet/inlet pressure difference ΔP2 is not ensured, i.e., when the state of the refrigeration cycle in the usage-side refrigerant circuit 40a is not stable. Here, the circulation pump flow rate-increase conditions are that the usage-side discharge pressure Pd2 be equal to or greater than a predetermined usage-side startup discharge pressure Pdi2, or that the usage-side outlet/inlet pressure difference ΔP2 be equal to or greater than a predetermined usage-side startup pressure difference ΔPi2.

<Characteristics>

The heat pump system 1 has the following characteristics.

—A—

In this heat pump system 1, the usage-side refrigerant circulating through the usage-side refrigerant circuit 40a is heated in the first usage-side heat exchanger 41a by the heat released by the heat-source-side refrigerant circulating through the heat-source-side refrigerant circuit 20; and the usage-side refrigerant circuit 40a can achieve a higher temperature refrigeration cycle than the refrigeration cycle in the heat-source-side refrigerant circuit 20 using the heat obtained from the heat-source-side refrigerant, and can therefore obtain a high-temperature aqueous medium with the aid of the heat released by the usage-side refrigerant in the refrigerant/water heat exchanger 65a. At this point, it is preferred that the refrigeration cycle in the heat-source-side refrigerant circuit 20 and the refrigeration cycle in the usage-side refrigerant circuit 40a be controlled so as to achieve stability in order to stably obtain a high-temperature aqueous medium. However, in this heat pump system 1, the compressors 21, 62a of the two refrigerant circuits 20, 40a are both variable capacity compressors, and the capacity of the compressors 21, 62a is controlled so that the discharge saturation temperatures Tc1, Tc2 become the target discharge saturation temperatures Tc1s, Tc2s using the saturation temperatures corresponding to the pressure of the refrigerant in the discharge of the compressors 21, 62a (i.e., the heat-source-side discharge saturation temperature Tc1 and the usage-side discharge saturation temperature Tc2) as representative values of the pressure of the refrigerant of the refrigeration cycles. Therefore, the state of the refrigeration cycle in the two refrigerant circuits 20, 40a can be made stable and a high-temperature aqueous medium can thereby be obtained in a stable fashion. Also, in this heat pump system 1, the first usage-side heat exchanger 41a is a heat exchanger for directly receiving heat by heat exchange between the heat-source-side refrigerant and the usage-side refrigerant, and little heat is lost when heat is received by the usage-side refrigerant circuit 40a from the heat-source-side refrigerant circuit 20, thereby contributing to obtaining a high-temperature aqueous medium. Also, in this heat pump system 1, the target usage-side discharge saturation temperature Tc2s is suitably set in accordance with the target aqueous medium outlet temperature Tws in the outlet of the refrigerant/water heat exchanger 65a. A desired target aqueous medium outlet temperature Tws is therefore readily obtained and control can be performed with good responsiveness even when the target aqueous medium outlet temperature Tws has been modified. Furthermore, in this heat pump system 1, the target heat-source-side discharge saturation temperature Tc1s is suitably set in accordance with target usage-side discharge saturation temperature Tc2s or the target aqueous medium outlet temperature Tws. Therefore, the refrigeration cycle in the heat-source-side refrigerant circuit 20 can be controlled so as to achieve a suitable state in accordance with the state of the refrigeration cycle in the usage-side refrigerant circuit 40a.

—B—

In the heat pump system 1, the usage-side compressor 62a is started up after the heat-source-side compressor 21 has started up in the case that the heat-source-side compressor 21 and the usage-side compressor 62a are to be started up from a stopped state. Therefore, heat exchange between the usage-side refrigerant and the heat-source-side refrigerant in the first usage-side heat exchanger 41a is less likely to be actively performed, whereby the pressure of the heat-source-side refrigerant in the discharge of the heat-source-side compressor 21 increases rapidly; the heat-source-side outlet/inlet pressure difference $\Delta P1$, which is the pressure difference between the heat-source-side discharge pressure Pd1 and pressure of the heat-source-side refrigerant in the intake of the heat-source-side compressor 21, is more readily ensured, the heat-source-side discharge pressure Pd1 being the pressure of the heat-source-side refrigerant in the discharge of the usage-side compressor 62a; and the heat-source-side refrigerant circuit 20 can be rapidly and stably started up. Also, in this heat pump system 1, the usage-side compressor 62a is not started up until the heat-source-side discharge pressure Pd1 reaches a predetermined heat-source-side startup discharge pressure difference $\Delta Pdi1$ or higher, or the heat-source-side outlet/inlet pressure difference $\Delta P1$ reaches the heat-source-side startup discharge pressure Pdi1 or higher. Therefore, it is possible to reliably prevent the usage-side compressor 62a from starting up in a state in which the heat-source-side discharge pressure Pd1 does not increase or in a state in which the heat-source-side outlet/inlet pressure difference $\Delta Pdi$ is not ensured.

—C—

In this heat pump system 1, the usage-side compressor 62a is started up with the circulation pump 43a in a stopped state or in an operation state at a low flow rate in the case that the usage-side compressor 62a is to be started up. Therefore, heat exchange between the aqueous medium and the usage-side refrigerant in the refrigerant/water heat exchanger 65a is less likely to be actively performed, whereby the pressure of the usage-side discharge pressure Pd2, which is the pressure of the usage-side refrigerant in the discharge of the usage-side compressor 62a, increases rapidly; the usage-side outlet/inlet pressure difference $\Delta P2$, which is the pressure difference between the usage-side discharge pressure Pd2 and the usage-side intake pressure Ps2, is liable to be ensured, the usage-side intake pressure Ps2 being the pressure of the usage-side refrigerant in the intake of the usage-side compressor 62a; and the usage-side refrigerant circuit 40a is liable to start up in a rapid and stable fashion. Also, in this heat pump system 1, the flow rate of the aqueous medium circulating through the aqueous medium circuit 80a is not increased until the usage-side discharge pressure Pd2 is equal to or greater than the usage-side startup discharge pressure Pdi2, or until the usage-side outlet/inlet pressure difference $\Delta P2$ is equal to or greater than the usage-side startup pressure difference $\Delta Pi2$. Therefore, the capacity control of the circulation pump 43a can be reliably prevented so that the flow rate of the aqueous medium circulating through the aqueous medium circuit 80a is increased, in a state in which the usage-side discharge pressure Pd2 does not increase or in a state in which the usage-side outlet/inlet pressure difference $\Delta Pd2$ is not ensured.

(1) Modification 1

In the above-described heat pump system 1 (see FIG. 1), the capacity of the compressors 21, 62a is controlled so that the saturation temperatures corresponding to the pressure of the refrigerant in the discharge of the compressors 21, 62a of the two refrigerant circuits 20, 40a (i.e., the heat-source-side discharge saturation temperature Tc1 and the usage-side discharge saturation temperature Tc2) become target temperatures Tc1s, Tc2s. In such a configuration, when a supply of aqueous medium with a wide range of temperatures is requested (e.g., the case in which a supply of aqueous medium having a low temperature such as 25° C. is requested as the target aqueous medium outlet temperature Twls, regardless of conditions in which the outdoor air temperature To is a relatively high temperature), the usage-side outlet/inlet pressure difference $\Delta P2$ becomes very small (the usage-side outlet/inlet pressure difference $\Delta P2$ being the pressure difference between the usage-side discharge pressure Pd2 and the usage-side intake pressure Ps2, the usage-side discharge pressure Pd2 being the pressure of the usage-side refrigerant in the discharge of the usage-side compressor 62a, and the usage-side intake pressure Ps2 being the pressure of the usage-side refrigerant in the intake of the usage-side compressor 62a) and low-load operation is requested of the usage-side refrigerant circuit 40a. Therefore, it is possible that the refrigeration cycle of the usage-side refrigerant circuit 40a cannot be sufficiently controlled using only control of the capacity of the usage-side compressor 62a. Also, a reduced usage-side outlet/inlet pressure difference $\Delta P2$ may worsen the circulation of refrigeration machine oil in the usage-side compressor 62a and become the cause insufficient lubrication.

Figure 3:
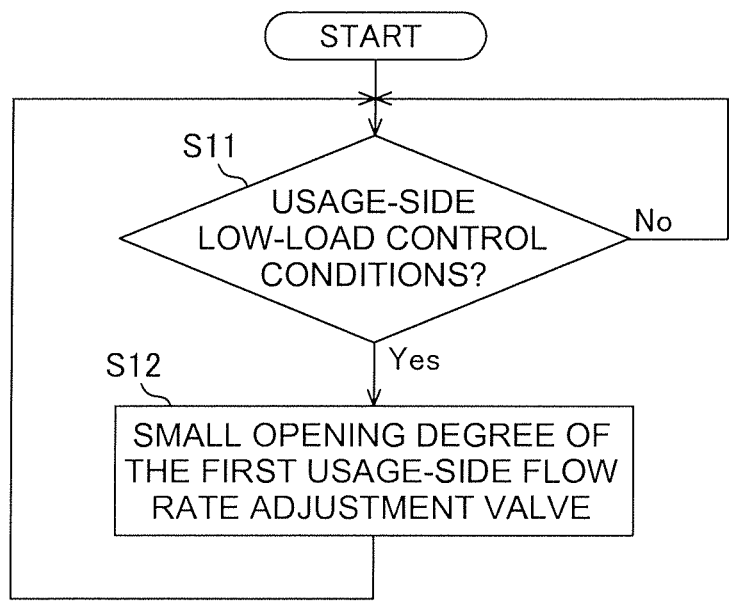
FIG. 3 is a flowchart showing the control of the usage-side low-load operation in the Modification 1 of the first embodiment, Modification 1 of the second embodiment, and Modification 1 of the third embodiment.

In view of the above, in this heat pump system 1, the usage-side low-load operation control is performed for reducing the opening degree of the first usage-side flow rate adjustment valve 42a, which is capable of varying the flow rate of the heat-source-side refrigerant flowing through the first usage-side heat exchanger 41a (step S11), in the case that the usage-side outlet/inlet pressure difference $\Delta P2$ has reached a predetermined usage-side low-load protection pressure difference $\Delta P2s$ or less (step S11) while the discharge saturation temperatures of the two refrigerant circuits 20, 40a are controlled, as shown in FIG. 3, in the same manner as the above-described heat pump system 1 (see FIG. 1). The usage-side low-load protection pressure difference $\Delta P2s$ is set with consideration given to the design conditions of the heat exchange capability of the first usage-side heat exchanger 41a, the design conditions of the lubrication structure of the usage-side compressor 62a, and other conditions.

It is thereby possible to respond to a request for a supply of an aqueous medium having a wide range of temperatures even in the case that the usage-side outlet/inlet pressure difference $\Delta P2$ is very low, because the usage-side refrigerant circuit 40a can be readily operated even in low-load conditions by reducing the flow rate of the heat-source-side refrigerant that flows into the first usage-side heat exchanger 41a, inhibiting the heat exchange capability in the first usage-side heat exchanger 41a, and increasing the usage-side outlet/inlet pressure difference $\Delta P2$.

Here, in the case that control of the degree of subcooling in the outlet of the first usage-side heat exchanger 41a is used as control of the first usage-side flow rate adjustment valve 42a in the same manner as the heat pump system 1 described above (see FIG. 1), the value of the target heat-source-side refrigerant degree-of-subcooling SC1s in the degree-of-subcooling control in the outlet of the first usage-side heat exchanger 41a is maintained in the case that the usage-side outlet/inlet pressure difference $\Delta P2$ is greater than the usage-side low-load protection pressure difference $\Delta P2s$ (step S11), whereby operation can be carried out under conditions suitable to the heat exchange capability of the first usage-side heat exchanger 41a by not performing control that reduces the opening degree of the first usage-side flow rate adjustment valve 42a. In the case that the usage-side outlet/inlet pressure difference ΔP2 has become equal to or less than the usage-side low-load protection pressure difference ΔP2s (step S11), the value of the target heat-source-side refrigerant degree-of-subcooling SC1s in the degree-of-subcooling control of the outlet of the first usage-side heat exchanger 41a is set to a value that is greater than the value of the case that the usage-side outlet/inlet pressure difference ΔP2 is greater than the usage-side low-load protection pressure difference ΔP2s, whereby control is performed for reducing the opening degree of the first usage-side flow rate adjustment valve 42a, the heat exchange capability in the first usage-side heat exchanger 41a is inhibited, the usage-side refrigerant circuit 40a can be operated under low-load conditions, and control of the opening degree of the first usage-side flow rate adjustment valve 42a can be used for bringing the heat-source-side refrigerant degree-of-subcooling SC1 to the target heat-source-side refrigerant degree-of-subcooling SC1s, regardless of whether the usage-side outlet/inlet pressure difference ΔP2 is equal to or less than the usage-side low-load protection pressure difference ΔP2s.

(2) Modification 2

Figure 4:
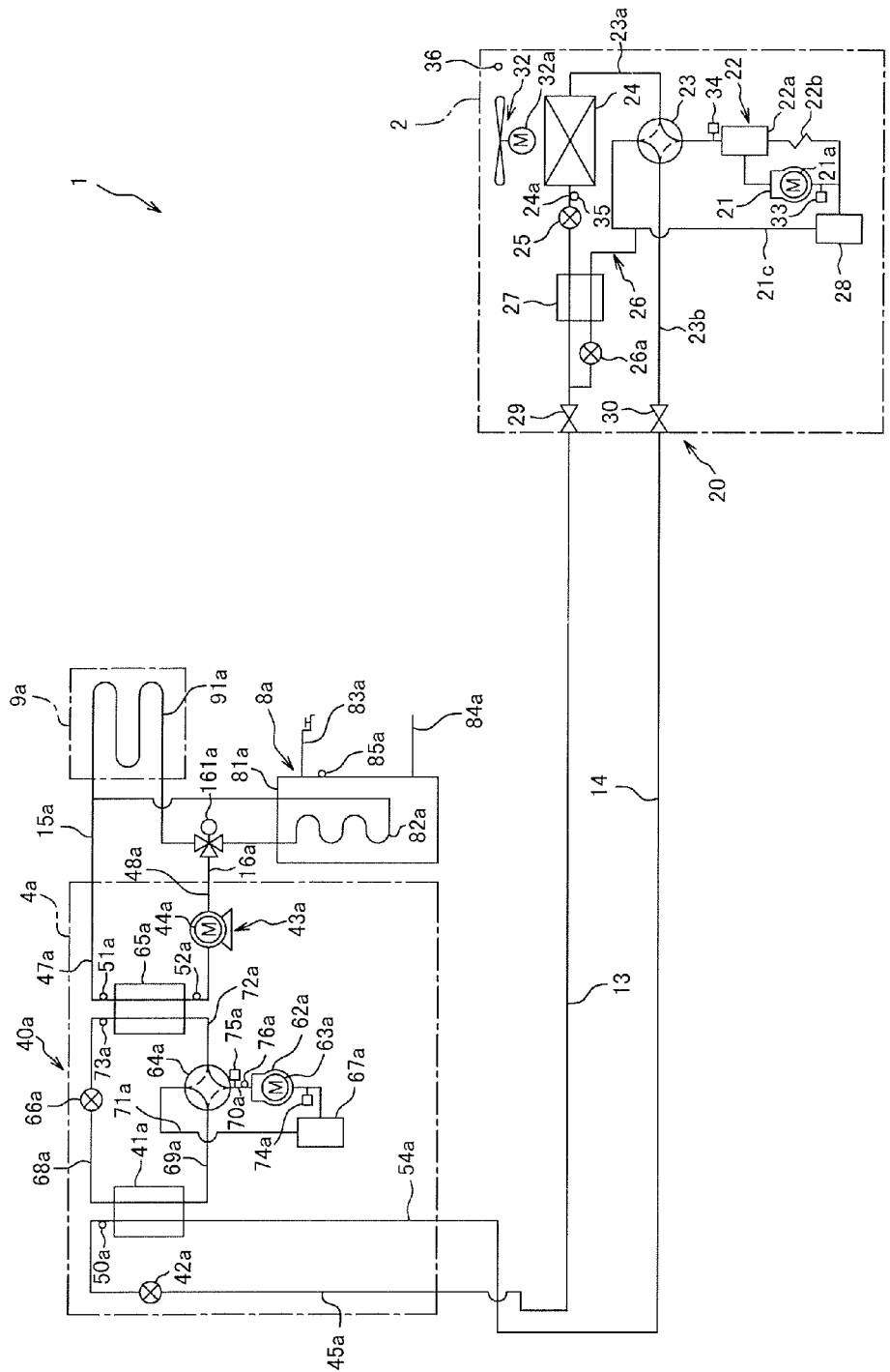
FIG. 4 is a view showing the general configuration of the heat pump system according to Modification 2 of the first embodiment.

In the heat pump system 1 described above (see FIG. 1), the usage-side refrigerant circuit 40a may be further provided with a first usage-side switching mechanism 64a for switching between a usage-side radiating operation state in which the refrigerant/water heat exchanger 65a is made to function as a radiator of the usage-side refrigerant and the first usage-side heat exchanger 41a is made to function as an evaporator of the usage-side refrigerant, and a usage-side evaporating operation state in which the refrigerant/water heat exchanger 65a is made to function as an evaporator of the usage-side refrigerant and the first usage-side heat exchanger 41a is made to function as a radiator of the usage-side refrigerant, as shown in FIG. 4.

Here, the first usage-side switching mechanism 64a is a four-way switching valve, and is connected to the cascade-side discharge tube 70a, the cascade-side intake tube 71a, the first cascade-side gas-refrigerant tube 72a, and the second cascade-side gas-refrigerant tube 69a. The first usage-side switching mechanism 64a is capable of switching between placing the cascade-side discharge tube 70a and the first cascade-side gas-refrigerant tube 72a in communication and the second cascade-side gas-refrigerant tube 69a and the cascade-side intake tube 71a in communication (corresponding to the usage-side radiating operation state; see the solid line of the first usage-side switching mechanism 64a in FIG. 4), and placing the cascade-side discharge tube 70a and the second cascade-side gas-refrigerant tube 69a in communication and the first cascade-side gas-refrigerant tube 72a and the cascade-side intake tube 71a in communication (corresponding to the usage-side evaporating operation state; see the broken line of first usage-side switching mechanism 64a in FIG. 4). The first usage-side switching mechanism 64a is not limited to being a four-way switching valve, but may also be, e.g., a configuration in which a plurality of solenoid valves are used in combination to achieve a function similar to that described above for switching the direction of flow of the usage-side refrigerant.

With the heat pump system 1 having such a configuration, in the case that defrosting of the heat-source-side heat exchanger 24 has been determined to be required by operation of the hot-water supply operation mode, defrosting operation can be performed such that the heat-source-side switching mechanism 23 is set in the heat-source-side radiating operation state, whereby the heat-source-side heat exchanger 24 is made to function as a radiator of the heat-source-side refrigerant; and the first usage-side switching mechanism 64a is set in the usage-side evaporating operation state, whereby the refrigerant/water heat exchanger 65a is made to function as an evaporator of the usage-side refrigerant and the first usage-side heat exchanger 41a is made to function as a radiator of the usage-side refrigerant.

Figure 5:
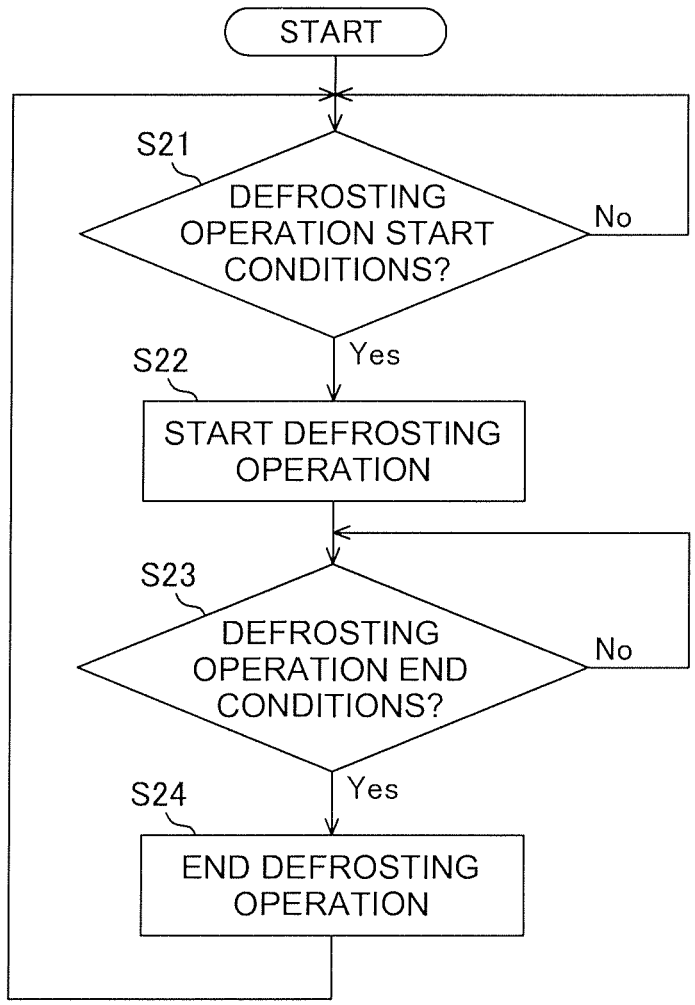
FIG. 5 is a flowchart showing the defrosting operation in the Modification 2 of the first embodiment, Modification 2 of the second embodiment, and Modification 2 of the third embodiment.

Operation in the defrosting operation is described below with reference to FIG. 5.

It is first determined whether predetermined defrosting operation start conditions have been satisfied (i.e., whether defrosting of the heat-source-side heat exchanger 24 is required; step S21). Here, it is determined whether defrosting operation start conditions have been satisfied based on whether a defrosting time interval Δtdf (i.e., the cumulative operation time from the end of the previous defrosting operation) has reached a predetermined defrosting time interval setting value Δtdfs.

In the case that it has been determined that the defrosting operation start conditions have been satisfied, the following defrosting operation is started (step S22).

When the defrosting operation is started, the heat-source-side switching mechanism 23 is switched to the heat-source-side radiating operation state (the state indicated by the solid line of the heat-source-side switching mechanism 23 of FIG. 4) in the heat-source-side refrigerant circuit 20, and the first usage-side switching mechanism 64a is switched to the usage-side evaporating operation state (the state indicated by the broken line of the first usage-side switching mechanism 64a of FIG. 4) in the usage-side refrigerant circuit 40a, and the intake return expansion valve 26a is set in a closed state.

Here, when a procedure is performed to set the heat-source-side switching mechanism 23 in the heat-source-side radiating operation state and to switch the first usage-side switching mechanism 64a to the usage-side evaporating operation state, the refrigerant inside the refrigerant circuits 20, 40a undergoes pressure equalization, and noise is generated during pressure equalization (i.e., pressure equalization noise) inside the refrigerant circuits 20, 40a, but it is preferred that such pressure equalization noise does not become excessive.

In view of the above, in this heat pump system 1, when the defrosting operation is started, the first usage-side switching mechanism 64a is set in the usage-side evaporating operation state after the heat-source-side switching mechanism 23 has been set in the heat-source-side radiating operation state, and the refrigerant in the two refrigerant circuits 20, 40a do not undergo simultaneous pressure equalization. Excessive noise of pressure equalization in the case that the defrosting operation is performed can thereby be avoided.

In the heat pump system 1, when the first usage-side switching mechanism 64a is to be set in the usage-side evaporating operation state, the usage-side compressor 62a is set in a stopped state and the first usage-side switching mechanism 64a is set in the usage-side evaporating operation state. Therefore, the pressure equalization noise in the usage-side refrigerant circuit 40a can be prevented from increasing.

Furthermore, in this heat pump system 1, when the usage-side compressor 62a is to be set in a stopped state, the usage-side compressor 62a is stopped with the refrigerant/water heat-exchange-side flow rate adjustment valve 66a left in an open state (more specifically, a fully open state), and pressure equalization in the usage-side refrigerant circuit 40a can therefore be rapidly performed.

In the heat-source-side refrigerant circuit 20 in such a state, the low-pressure heat-source-side refrigerant in the refrigeration cycle is taken into the heat-source-side compressor 21 by way of the heat-source-side intake tube 21c, compressed to high pressure in the refrigeration cycle, and thereafter discharged to the heat-source-side discharge tube 21b. The high-pressure heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent to the heat-source-side heat exchanger 24 by way of the heat-source-side switching mechanism 23 and the first heat-source-side gas-refrigerant tube 23a. The high-pressure, heat-source-side refrigerant sent to the heat-source-side heat exchanger 24 undergoes heat exchange with ice deposited in the heat-source-side heat exchanger 24 and heat is released in the heat-source-side heat exchanger 24. The high-pressure, heat-source-side refrigerant having released heat in the heat-source-side heat exchanger is sent to the subcooler 27 by way of the heat-source-side expansion valve 25. The heat-source-side refrigerant sent to the subcooler 27 is sent from the heat source unit 2 to the liquid refrigerant communication tube 13 by way of the heat-source-side liquid-refrigerant tube 24a and the liquid-side shutoff valve 29 without undergoing heat exchange because the heat-source-side refrigerant does not flow in the intake return tube 26.

The heat-source-side refrigerant sent to the liquid refrigerant communication tube 13 is sent to the first usage unit 4a.

The heat-source-side refrigerant sent to the first usage unit 4a is sent to the first usage-side flow rate adjustment valve 42a. The heat-source-side refrigerant sent to the first usage-side flow rate adjustment valve 42a is depressurized in the first usage-side flow rate adjustment valve 42a to a low-pressure gas-liquid two-phase state, and sent to the first usage-side heat exchanger 41a through the first usage-side liquid refrigerant tube 45a. The low-pressure heat-source-side refrigerant sent to the first usage-side heat exchanger 41a is heat-exchanged with the high-pressure usage-side refrigerant in the refrigeration cycle that circulates through the usage-side refrigerant circuit 40a and evaporated in the first usage-side heat exchanger 41a. The low-pressure heat-source-side refrigerant evaporated in the first usage-side heat exchanger 41a is sent from the first usage unit 4a to the gas refrigerant communication tube 14 through the first usage-side gas refrigerant tube 54a.

The heat-source-side refrigerant sent from the first usage unit 4a to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

The high-pressure, usage-side refrigerant in the refrigeration cycle that circulates through the usage-side refrigerant circuit 40a releases heat in the usage-side refrigerant circuit 40a by the evaporation of the heat-source-side refrigerant in the first usage-side heat exchanger 41a. The high-pressure, usage-side refrigerant having released heat in the first usage-side heat exchanger 41a is sent to the refrigerant/water heat exchange-side flow rate adjustment valve 66a. The high-pressure, usage-side refrigerant sent to the refrigerant/water heat exchange-side flow rate adjustment valve 66a is depressurized in the refrigerant/water heat exchange-side flow rate adjustment valve 66a to become a low-pressure gas-liquid two-phase state, and is then sent to the refrigerant/water heat exchanger 65a by way of the cascade-side liquid-refrigerant tube 68a. The low-pressure, usage-side refrigerant sent to the refrigerant/water heat exchanger 65a undergoes heat exchange with the aqueous medium circulated through the aqueous medium circuit 80a by the circulation pump 43a and evaporates in the refrigerant/water heat exchanger 65a. The low-pressure, usage-side refrigerant thus evaporated in the refrigerant/water heat exchanger 65a is sent to the usage-side accumulator 67a by way of the first cascade-side gas-refrigerant tube 72a and the second usage-side switching mechanism 64a. The low-pressure, usage-side refrigerant sent to the usage-side accumulator 67a is taken into the usage-side compressor 62a by way of the cascade-side intake tube 71a, compressed to high pressure in the refrigeration cycle, and thereafter discharged to the cascade-side discharge tube 70a. The high-pressure, usage-side refrigerant discharged to the cascade-side discharge tube 70a is again sent to the first usage-side heat exchanger 41a by way of the second usage-side switching mechanism 64a and the second cascade-side gas-refrigerant tube 69a.

In this manner, the defrosting operation is started in which the heat-source-side switching mechanism 23 is set in the heat-source-side radiating operation state to thereby cause the heat-source-side heat exchanger 24 to function as a radiator of the heat-source-side refrigerant; and the first usage-side switching mechanism 64a is set in the usage-side evaporating operation state to thereby cause the refrigerant/water heat exchanger 65a to function as an evaporator of the usage-side refrigerant and cause the first usage-side heat exchanger 41a to function as a radiator of the usage-side refrigerant (i.e., as an evaporator of the heat-source-side refrigerant).

It is determined whether predetermined defrosting operation end conditions have been satisfied (i.e., whether defrosting of the heat-source-side heat exchanger 24 has ended; step S23). Here, it is determined whether the defrosting operation end conditions have been satisfied depending on whether the heat-source-side heat exchanger temperature Thx has reached a predetermined defrosting completion temperature Thxs, or whether the defrosting operation time tdf, which is the time elapsed from the start of the defrosting operation, has reached a predetermined defrosting operation setting time tdfs.

In the case that it has been determined that the defrosting operation end conditions have been satisfied, the defrosting operation is ended and the process returns to the hot-water supply operation mode (step S24).

With the heat pump system 1, when the heat-source-side heat exchanger 24 is to be defrosted, not only is the heat-source-side switching mechanism 23 set in the heat-source-side radiating operation state to thereby cause the heat-source-side heat exchanger 24 to function as a radiator of the heat-source-side refrigerant, but also the first usage-side switching mechanism 64a is set in the usage-side evaporating operation state to thereby cause the refrigerant/water heat exchanger 65a to function as an evaporator of the usage-side refrigerant and cause the first usage-side heat exchanger 41a to function as a radiator of the usage-side refrigerant. Therefore, the heat-source-side refrigerant cooled by releasing heat in the heat-source-side heat exchanger 24 is heated by the heat released by the usage-side refrigerant in the first usage-side heat exchanger 41a, and the usage-side refrigerant cooled by releasing heat in the first usage-side heat exchanger 41a can be heated by evaporation in the refrigerant/water heat exchanger 65a, whereby the defrosting of the heat-sourceside heat exchanger 24 can be reliably performed. Also, it is possible to avoid excessive noise of pressure equalization of the usage-side refrigerant circuit 40a in the case that defrosting operation is performed, and pressure equalization in the usage-side refrigerant circuit 40a can be rapidly performed.

(3) Modification 3

Figure 6:
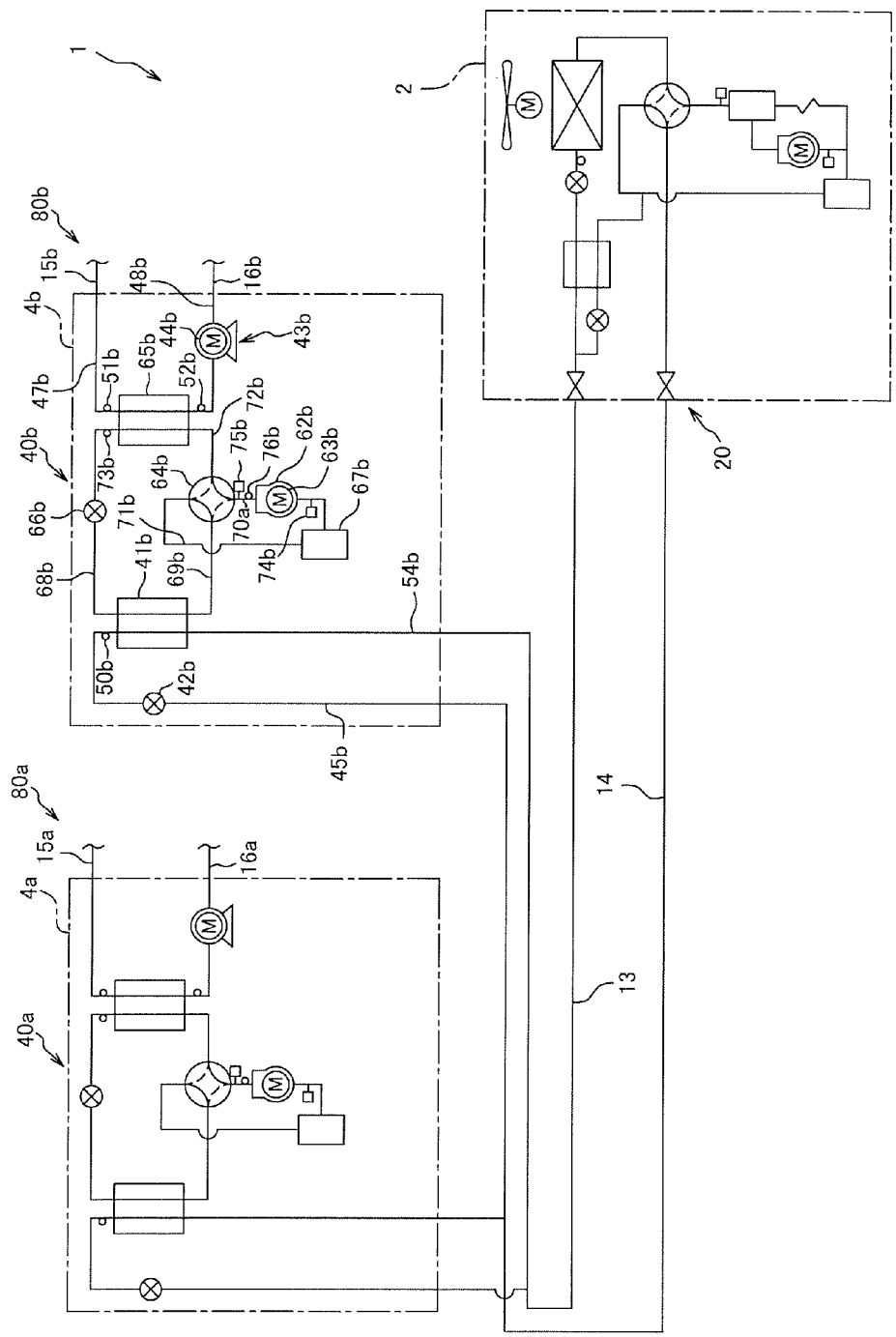
FIG. 6 is a view showing the general configuration of the heat pump system according to Modification 3 of the first embodiment.

With the heat pump system 1 described above (see FIGS. 1 and 4), a single first usage unit 4a is connected to the heat source unit 2 via the refrigerant communication tubes 13, 14, but a plurality of first usage units 4a, 4b (two, in this case) may be connected in parallel to each other via the refrigerant communication tubes 13, 14, as shown in FIG. 6 (in this case, the hot-water/air-warming unit, the hot-water storage unit, the aqueous medium circuits 80a, 80b, and the like are not shown). The configuration of the first usage unit 4b is the same as the configuration of the first usage unit 4a with the subscript "b" used in place of the subscript "a" of the reference numerals indicating each part of the first usage unit 4a, and a description of each part of the first usage unit 4b is therefore omitted.

With this heat pump system 1, it is possible to accommodate a plurality of locations and/or applications that require heating of the aqueous medium.

Second Embodiment

In the heat pump system 1 in the first embodiment and modifications thereof described above (see FIGS. 1, 4, and 6), it is preferred that hot-water supply operation as well as indoor air warming can be performed.

Figure 7:
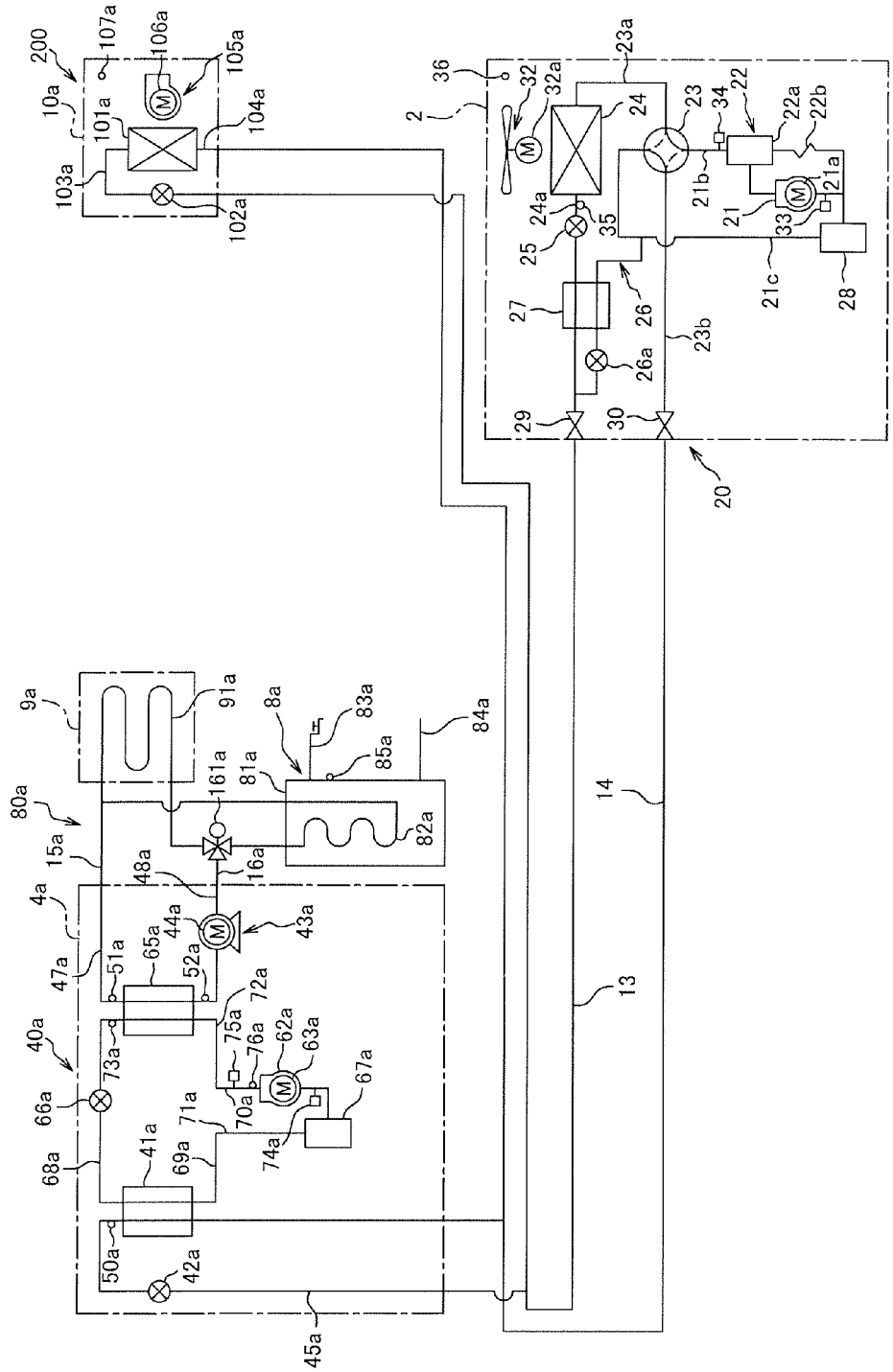
FIG. 7 is a view showing the general configuration of the heat pump system according to a second embodiment and Modification 2 of the second embodiment.

In view of the above, with a heat pump system 200, a second usage-side heat exchanger 101a, which is capable of heating an air medium by functioning as a radiator of the heat-source-side refrigerant in the configuration of the heat pump system 1 (see FIG. 1) according to the first embodiment described above, is further provided to the heat-source-side refrigerant circuit 20, as shown in FIG. 7. The configuration of the heat pump system 200 is described below.

<Configuration>

—Overall Configuration—

FIG. 7 is a view showing the general configuration of the heat pump system 200 according to a second embodiment of the present invention. The heat pump system 200 is an apparatus capable of performing operation for heating an aqueous medium and performing other operations using a vapor compression heat pump cycle.

The heat pump system 200 mainly has a heat source unit 2, a first usage unit 4a, a second usage unit 10a, a liquid-refrigerant communication tube 13, a gas-refrigerant communication tube 14, a hot-water storage unit 8a, a hot-water air-warming unit 9a, an aqueous medium communication tube 15a, and an aqueous medium communication tube 16a. The heat source unit 2, the first usage unit 4a, and the second usage unit 10a are connected via the refrigerant communication tubes 13, 14 to thereby constitute a heat-source-side refrigerant circuit 20. The first usage unit 4a constitutes a usage-side refrigerant circuit 40a. The first usage unit 4a, the hot-water storage unit 8a, and the hot-water air-warming unit 9a are connected via the aqueous medium communication tubes 15a, 16a to thereby constitute an aqueous medium circuit 80a. HFC-410A, which is a type of HFC-based refrigerant, is enclosed inside the heat-source-side refrigerant circuit 20 as a heat-source-side refrigerant, and an ester-based or ether-based refrigeration machine oil having compatibility in relation to the HFC-based refrigerant is enclosed for lubrication of the heat-source-side compressor 21. HFC-134a, which is a type of HFC-based refrigerant, is enclosed inside the usage-side refrigerant circuit 40a as a usage-side refrigerant, and an ester-based or ether-based refrigeration machine oil having compatibility in relation to the HFC-based refrigerant is enclosed for lubrication of the usage-side compressor 62a. The usage-side refrigerant is preferably one in which the pressure that corresponds to a saturated gas temperature of 65° C. is a maximum gauge pressure of 2.8 MPa or less, and more preferably 2.0 MPa or less from the viewpoint of using a refrigerant that is advantageous for a high-temperature refrigeration cycle. HFC-134a is a type of refrigerant having such saturation pressure characteristics. Water constituting the aqueous medium circulates in the aqueous medium circuit 80a.

In the description related to the configurations below, the same reference numerals will be used and a description omitted for the configuration of the heat source unit 2, the first usage unit 4a, the hot-water storage unit 8a, the hot-water air-warming unit 9a, the liquid refrigerant communication tube 13, the gas-refrigerant communication tube 14, and the aqueous medium communication tubes 15a, 16a, all of which have the same configuration as those of heat pump system 1 in the first embodiment (see FIG. 1). Only the configuration of the second usage unit 10a will be described.

—Second Usage Unit—

The second usage unit 10a is installed indoors, is connected to the heat source unit 2 via the refrigerant communication tubes 13, 14, and constitutes a portion of the heat-source-side refrigerant circuit 20.

The second usage unit 10a has primarily a second usage-side heat exchanger 101a and a second usage-side flow rate adjustment valve 102a.

The second usage-side heat exchanger 101a is a heat exchanger for functioning as a radiator or evaporator of the heat-source-side refrigerant by exchanging heat between the heat-source-side refrigerant and indoor air as the air medium, a second usage-side liquid refrigerant tube 103a is connected to the liquid side of the second usage-side heat exchanger 101a, and a second usage-side gas refrigerant tube 104a is connected to the gas side of the second usage-side heat exchanger 101a. The liquid refrigerant communication tube 13 is connected to the second usage-side liquid refrigerant tube 103a, and the gas refrigerant communication tube 14 is connected to the second usage-side gas refrigerant tube 104a. The air medium for exchanging heat with the heat-source-side refrigerant in the second usage-side heat exchanger 101a is fed by a usage-side fan 105a driven by a usage-side fan motor 106a.

The second usage-side flow rate adjustment valve 102a is an electrical expansion valve whereby the flow rate of heat-source-side refrigerant flowing through the second usage-side heat exchanger 101a can be varied by controlling the opening degree of the second usage-side flow rate adjustment valve 102a, and the second usage-side flow rate adjustment valve 102a is provided to the second usage-side liquid refrigerant tube 103a.

The second usage unit 10a is thereby configured so that an air-cooling operation can be performed in which the second usage-side heat exchanger 101a is caused to function as an evaporator of the heat-source-side refrigerant introduced from the liquid refrigerant communication tube 13 in the heat-source-side radiating operation state of the heat-source-side switching mechanism 23, whereby the heat-source-side refrigerant evaporated in the second usage-side heat exchanger 101a is directed to the gas refrigerant communication tube 14, and the air medium is cooled by evaporation of the heat-source-side refrigerant in the second usage-side heat exchanger 101a. The second usage unit 10a is also configured so that an air-warming operation can be performed in which the second usage-side heat exchanger 101a is caused to function as a radiator of the heat-source-side refrigerant introduced from the gas refrigerant communication tube 14 in the heat-source-side evaporating operation state of the heat-source-side switching mechanism 23, whereby the heat-source-side refrigerant radiated in the second usage-side heat exchanger 101a is directed to the liquid refrigerant communication tube 13, and the air medium is heated by radiation of the heat-source-side refrigerant in the second usage-side heat exchanger 101a.

Various sensors are provided to the second usage unit 10a. Specifically, the second usage unit 10a is provided with an outdoor temperature sensor 107a for detecting an outdoor temperature Tr.

A control unit (not shown) for performing the following operations and/or various controls is provided to the heat pump system 200.

<Operation>

Next, the operation of the heat pump system 200 will be described.

The operation modes of the heat pump system 200 include a hot-water supply operation mode in which only the hot-water supply operation of the first usage unit 4a is performed (i.e., operation of the hot-water storage unit 8a and/or the hot-water air-warming unit 9a), an air-cooling operation mode in which only air-cooling operation of the second usage unit 10a is performed, an air-warming operation mode in which only air-warming operation of the second usage unit 10a is performed, and a hot-water supply/air-warming operation mode in which hot-water supply operation of the first usage unit 4a is performed together with the air-warming operation of the second usage unit 10a.

Operation in the four operation modes of the heat pump system 200 is described below.

—Hot-Water Supply Operation Mode—

In the case that only hot-water supply operation of the first usage unit 4a is to be performed, the heat-source-side switching mechanism 23 is switched to the heat-source-side evaporating operation state (the state of the heat-source-side switching mechanism 23 indicated by the broken line in FIG. 7) in the heat-source-side refrigerant circuit 20, and an intake-return expansion valve 26a and the second usage-side flow rate adjustment valve 102a are set in a closed state. Also, in the aqueous medium circuit 80a, the aqueous-medium-side switching mechanism 161a is switched to a state in which the aqueous medium is fed to the hot-water storage unit 8a and/or hot-water air-warming unit 9a.

In the heat-source-side refrigerant circuit 20 in such a state, the low-pressure, heat-source-side refrigerant in the refrigeration cycle is taken into the heat-source-side compressor 21 via the heat-source-side intake tube 21c, and is discharged to a heat-source-side discharge tube 21b after having been compressed to a high pressure in the refrigeration cycle. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c via the oil return tube 22b. The high-pressure, heat-source-side refrigerant from which the refrigeration machine oil has been separated out is sent from the heat source unit 2 to the gas-refrigerant communication tube 14 via the heat-source-side switching mechanism 23, the second heat-source-side gas refrigerant tube 23b, and the gas-side shutoff valve 30.

The high-pressure, heat-source-side refrigerant sent to the gas-refrigerant communication tube 14 is sent to the first usage unit 4a. The high-pressure, heat-source-side refrigerant sent to the first usage unit 4a is sent to the first usage-side heat exchanger 41a via the first usage-side gas refrigerant tube 54a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 via the first usage-side flow rate adjustment valve 42a and the first usage-side liquid refrigerant tube 45a.

The heat-source-side refrigerant sent to the liquid refrigerant communication tube 13 is sent to the heat source unit 2. The heat-source-side refrigerant sent to the heat source unit 2 is sent to the subcooler 27 via a liquid-side shutoff valve 29. The heat-source-side refrigerant sent to the subcooler 27 does not undergo heat exchange and is sent to the heat-source-side expansion valve 25 because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 via a heat-source-side liquid-refrigerant tube 24a. The low-pressure refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 via the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 via the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a via the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a via the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat-exchange-side flow rate adjustment valve 66a to become a low-pressure gas-liquid two-phase state, and is then sent again to the first usage-side heat exchanger 41*a* via the cascade-side liquid-refrigerant tube 68*a*.

In the aqueous medium circuit 80*a*, the aqueous medium circulating through the aqueous medium circuit 80*a* is heated by the radiation of the usage-side refrigerant in the refrigerant/water heat exchanger 65*a*. The aqueous medium heated in the refrigerant/water heat exchanger 65*a* is taken into the circulation pump 43*a* via the first usage-side water outlet tube 48*a* and pressurized, and is then sent from the first usage unit 4*a* to the aqueous medium communication tube 16*a*. The aqueous medium sent to the aqueous medium communication tube 16*a* is sent to the hot-water storage unit 8*a* and/or the hot-water air-warming unit 9*a* via the aqueous-medium-side switching mechanism 161*a*. The aqueous medium sent to the hot-water storage unit 8*a* undergoes heat exchange with the aqueous medium inside a hot-water storage tank 81*a* and releases heat in the heat exchange coil 82*a*, whereby the aqueous medium inside the hot-water storage tank 81*a* is heated. The aqueous medium sent to the hot-water air-warming unit 9*a* releases heat in the heat exchange panel 91*a*, whereby indoor walls or the like are heated and indoor floors are heated.

Operation in the hot-water supply operation mode for performing only hot-water supply operation of the first usage unit 4*a* is performed in this manner.

—Air-Cooling Operation Mode—

In the case that only air-cooling operation of the second usage unit 10*a* is to be performed, the heat-source-side switching mechanism 23 is switched to the heat-source-side radiating operation state (the state of the heat-source-side switching mechanism 23 indicated by the solid line in FIG. 7) in the heat-source-side refrigerant circuit 20, and the first usage-side flow rate adjustment valve 42*a* is set in a shutoff state.

In the heat-source-side refrigerant circuit 20 in such a state, the heat-source-side refrigerant at the low pressure in the refrigeration cycle is drawn into the heat-source-side compressor 21 through the heat-source-side intake tube 21*c* and compressed to the high pressure in the refrigeration cycle, and subsequently discharged to the heat-source-side discharge tube 21*b*. In the oil separator 22*a*, the refrigeration machine oil is separated from the high-pressure heat-source-side refrigerant discharged to the heat-source-side discharge tube 21*b*. The refrigeration machine oil separated from the heat-source-side refrigerant in the oil separator 22*a* is returned to the heat-source-side intake tube 21*c* through the oil return tube 22*b*. The high-pressure heat-source-side refrigerant from which the refrigeration machine oil has been separated is sent to the heat-source-side heat exchanger 24 through the heat-source-side switching mechanism 23 and the first heat-source-side gas refrigerant tube 23*a*. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24*a*, and is cooled to a subcooled state. The heat-source-side refrigerant flowing through the intake return tube 26 is returned to the heat-source-side intake tube 21*c*. The heat-source-side refrigerant cooled in the subcooler 27 is sent from the heat source unit 2 to the liquid refrigerant communication tube 13 through the heat-source-side liquid refrigerant tube 24*a* and the liquid-side shutoff valve 29.

The high-pressure heat-source-side refrigerant sent to the liquid refrigerant communication tube 13 is sent to the second usage unit 10*a*. The high-pressure heat-source-side refrigerant sent to the second usage unit 10*a* is sent to the second usage-side flow rate adjustment valve 102*a*. The high-pressure heat-source-side refrigerant sent to the second usage-side flow rate adjustment valve 102*a* is depressurized in the second usage-side flow rate adjustment valve 102*a* to a low-pressure gas-liquid two-phase state, and sent to the second usage-side heat exchanger 101*a* through the second usage-side liquid refrigerant tube 103*a*. The low-pressure heat-source-side refrigerant sent to the second usage-side heat exchanger 101*a* is heat-exchanged with the air medium fed by the usage-side fan 105*a* and evaporated in the second usage-side heat exchanger 101*a*, and indoor air cooling is thereby performed. The low-pressure heat-source-side refrigerant evaporated in the second usage-side heat exchanger 101*a* is sent from the second usage unit 10*a* to the gas refrigerant communication tube 14 through the second usage-side gas refrigerant tube 104*a*.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23*b*, and the heat-source-side switching mechanism 23. The low-pressure heat-source-side refrigerant sent to the heat-source-side accumulator 28 is again drawn into the heat-source-side compressor 21 through the heat-source-side intake tube 21*c*.

The operations in the air-cooling operation mode for performing only the air-cooling operation of the second usage unit 10*a* are thus performed.

—Air-Warming Operation Mode—

In the case that only air-warming operation of the second usage unit 10*a* is to be performed, the heat-source-side switching mechanism 23 is switched to the heat-source-side evaporating operation state (the state of the heat-source-side switching mechanism 23 indicated by the broken line in FIG. 6) in the heat-source-side refrigerant circuit 20, and the intake-return expansion valve 26*a* and the first usage-side flow rate adjustment valve 42*a* are in a shutoff state.

In the heat-source-side refrigerant circuit 20 in such a state, the heat-source-side refrigerant at a low pressure in the refrigeration cycle is drawn into the heat-source-side compressor 21 through the heat-source-side intake tube 21*c* and compressed to a high pressure in the refrigeration cycle, and subsequently discharged to the heat-source-side discharge tube 21*b*. In the oil separator 22*a*, the refrigeration machine oil is separated from the high-pressure heat-source-side refrigerant discharged to the heat-source-side discharge tube 21*b*. The refrigeration machine oil separated from the heat-source-side refrigerant in the oil separator 22*a* is returned to the heat-source-side intake tube 21*c* through the oil return tube 22*b*. The high-pressure heat-source-side refrigerant from which the refrigeration machine oil has been separated is sent from the heat source unit 2 to the gas refrigerant communication tube 14 through the heat-source-side switching mechanism 23, the second heat-source-side gas refrigerant tube 23*b*, and the gas-side shutoff valve 30.

The high-pressure heat-source-side refrigerant sent to the gas refrigerant communication tube 14 is sent to the second usage unit 10*a*. The high-pressure heat-source-side refrigerant sent to the second usage unit 10*a* is sent to the second usage-side heat exchanger 101a through the second usage-side gas refrigerant tube 104a. The high-pressure heat-source-side refrigerant sent to the second usage-side heat exchanger 101a is heat-exchanged with the air medium fed by the usage-side fan 105a and radiated in the second usage-side heat exchanger 101a, and indoor air warming is thereby performed. The high-pressure heat-source-side refrigerant radiated in the second usage-side heat exchanger 101a is sent from the second usage unit 10a to the liquid refrigerant communication tube 13 through the second usage-side flow rate adjustment valve 102a and the second usage-side liquid refrigerant tube 103a.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

The operations in the air-warming operation mode for performing only the air-warming operation of the second usage unit 10a are thus performed.

—Hot-Water Supply/Air-Warming Operation Mode—

In the case that hot-water supply operation of the first usage unit 4a and the air-warming operation of the second usage unit 10a are to be performed together, the heat-source-side switching mechanism 23 is switched to the heat-source-side evaporating operation state (the state of the heat-source-side switching mechanism 23 indicated by the broken line in FIG. 7) in the heat-source-side refrigerant circuit 20, and the intake-return expansion valve 26a is in a shutoff state. Also, the aqueous-medium-side switching mechanism 161a is switched in the aqueous medium circuit 80a to a state in which the aqueous medium is fed to the hot-water storage unit 8a and/or the hot-water air-warming unit 9a.

In the heat-source-side refrigerant circuit 20 in such a state, the low-pressure, heat-source-side refrigerant in the refrigeration cycle is taken into the heat-source-side compressor 21 via the heat-source-side intake tube 21c, is compressed to high pressure in the refrigeration cycle, and is thereafter discharged to the heat-source-side discharge tube 21b. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c via the oil return tube 22b. The high-pressure, heat-source-side refrigerant from which the refrigeration machine oil has been separated out is sent from the heat source unit 2 to the gas-refrigerant communication tube 14 via the heat-source-side switching mechanism 23, the second heat-source-side gas refrigerant tube 23b, and the gas-side shutoff valve 30.

The high-pressure, heat-source-side refrigerant sent to the gas-refrigerant communication tube 14 is sent to the first usage unit 4a and the second usage unit 10a.

The high-pressure heat-source-side refrigerant sent to the second usage unit 10a is sent to the second usage-side heat exchanger 101a through the second usage-side gas refrigerant tube 104a. The high-pressure heat-source-side refrigerant sent to the second usage-side heat exchanger 101a undergoes heat exchange with the air medium fed by the usage-side fan 105a and releases heat in the second usage-side heat exchanger 101a, whereby indoor air warming is performed. The high-pressure heat-source-side refrigerant having released heat in the second usage-side heat exchanger 101a is sent from the second usage unit 10a to the liquid refrigerant communication tube 13 through the second usage-side flow rate adjustment valve 102a and the second usage-side liquid refrigerant tube 103a.

The high-pressure heat-source-side refrigerant sent to the first usage unit 4a is sent to the first usage-side heat exchanger 41a through the first usage-side gas refrigerant tube 54a. The high-pressure heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 via the first usage-side flow rate adjustment valve 42a and the first usage-side liquid refrigerant tube 45a.

The heat-source-side refrigerant sent from the first usage unit 4a and the second usage unit 10a to the liquid refrigerant communication tube 13 merges in the liquid refrigerant communication tube 13 and is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

In the usage-side refrigerant circuit 40a, the low-pressure usage-side refrigerant in the refrigeration cycle that is circulated through the usage-side refrigerant circuit 40a is heated and evaporated by the heat released by the heat-source-side refrigerant in the first usage-side heat exchanger 41a. The low-pressure usage-side refrigerant evaporated in the first usage-side heat exchanger 41a is sent to the usage-side accumulator 67a through the second cascade-side gas-refrigerant tube 69a. The low-pressure usage-side refrigerant sent to the usage-side accumulator 67a is drawn into the usage-side compressor 62a through the cascade-side intake tube 71a, compressed to high pressure in the refrigeration cycle, and thereafter discharged to the cascade-side discharge tube 70a. The high-pressure usage-side refrigerant discharged to the cascade-side discharge tube 70a is sent to the refrigerant/water heat exchanger 65a through the first cascade-side gas-refrigerant tube 72a. The high-pressure usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure usage-side refrigerant having released heat in the refrigerant/water heat exchanger 65a is depressurized in the refrigerant/water heat-exchange-side flow rate adjustment valve 66a to a low-pressure gas-liquid two-phase state, and is again sent to the first usage-side heat exchanger 41a through the cascade-side liquid-refrigerant tube 68a.

The aqueous medium circulating through the aqueous medium circuit 80a is heated in the aqueous medium circuit 80a by the heat released by the usage-side refrigerant in the refrigerant/water heat exchanger 65a. The aqueous medium heated in the refrigerant/water heat exchanger 65a is drawn into the circulation pump 43a through the first usage-side water outlet tube 48a, pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous medium-side switching mechanism 161a. The aqueous medium sent to the hot-water storage unit 8a undergoes heat exchange with the aqueous medium inside the hot-water storage tank 81a and releases heat in the heat exchange coil 82a, whereby the aqueous medium in the hot-water storage tank 81a is heated. The aqueous medium sent to the hot-water air-warming unit 9a is radiated in the heat exchange panel 91a, the walls and other indoor areas are thereby heated, and the indoor floor is heated.

The operations in the hot-water supply/air-warming operation mode for performing the hot-water supply operation of the first usage unit 4a as well as the air-warming operation of the second usage unit 10a are thus performed.

Here, the discharge saturation temperature control of the refrigerant circuits 20, 40a, the degree-of-subcooling control of the outlets of the heat exchangers 41a, 65a, the control of the flow rate of the aqueous medium circulating through the aqueous medium circuit 80a, and the startup control of the circuits 20, 40a, 80a are performed in the same manner as the heat pump system 1 (see FIG. 1) in the first embodiment, even in a configuration of the heat pump system 200 in which the first usage unit 4a for hot-water supply operation and the second usage unit 10a for air-warming operation are connected to the heat source unit 2.

However, in relation to the discharge saturation temperature control of the heat-source-side refrigerant circuit 20 among these controls, the second usage-side heat exchanger 101a is connected, and the air-warming operation and hot-water supply/air-warming operation are performed in which the second usage-side heat exchanger 101a is made to function as a radiator of the heat-source-side refrigerant. Therefore, a heat-source-side refrigerant having a heat-source-side discharge saturation temperature Tc1 suitable for heating the air medium must be fed to the second usage-side heat exchanger 101a.

In view of the above, with the discharge saturation temperature control of the heat-source-side refrigerant circuit 20 in the heat pump system 200, the target heat-source-side discharge saturation temperature Tc1s can be increased in the case that operation is performed for causing the second usage-side heat exchanger 101a to function as a radiator of the heat-source-side refrigerant (here, the air-warming operation mode and/or the hot-water supply/air-warming operation mode) in comparison with the case in which operation is not carried out for causing the second usage-side heat exchanger 101a to function as a radiator of the heat-source-side refrigerant (here, the hot-water supply operation mode and/or the air-cooling operation mode). More specifically, with the heat pump system 1 in the first embodiment (i.e., corresponding to the case in which operation is not performed to cause the second usage-side heat exchanger 101a to function as a radiator of the heat-source-side refrigerant in the heat pump system 200), the temperature range of the target heat-source-side discharge saturation temperature Tc1s is controlled to be in a temperature range of 10° C. to 40° C., but with the heat pump system 200, the temperature range of the target heat-source-side discharge saturation temperature Tc1s is controlled to be in a temperature range of 10° C. to 40° C. in the same manner as the heat pump system 1 in the first embodiment in the case that operation is not performed to cause the second usage-side heat exchanger 101a to function as a radiator of the heat-source-side refrigerant (here, the hot-water supply operation mode and/or the air-cooling operation mode), and in the case that operation is performed to cause the second usage-side heat exchanger 101a to function as a radiator of the heat-source-side refrigerant (here, the air-warming operation mode and/or the hot-water supply/air-warming operation mode), the temperature range of the target heat-source-side discharge saturation temperature Tc1s is controlled to be in a temperature range of 40° C. to 50° C., which is greater than the temperature range of 10° C. to 40° C.

Accordingly, in the case that operation is not performed in which the second usage-side heat exchanger 101a is made to function as a radiator of the heat-source-side refrigerant, the refrigeration cycle in the heat-source-side refrigerant circuit 20 is performed at the lowest pressure possible to improve the operating efficiency in the heat-source-side refrigerant circuit 20; and in the case that operation is performed in which the second usage-side heat exchanger 101a is made to function as a radiator of the heat-source-side refrigerant, it is possible to feed to the second usage-side heat exchanger 101a heat-source-side refrigerant having a saturation temperature suitable for heating the air medium.

<Characteristics>

The heat pump system 200 has the following characteristics.

—A—

In this heat pump system 200, it is possible to obtain the same effects as those of the heat pump system 1 in the first embodiment. The aqueous medium heated in the first usage-side heat exchanger 41a and the usage-side refrigerant circuit 40a is used not only for hot-water supply operation, but also the air medium heated in the second usage-side heat exchanger 101a can be used for indoor air warming because the second usage unit 10a having the second usage-side heat exchanger 101a is provided, operation can be performed for heating the air medium by radiation of the heat-source-side refrigerant in the second usage-side heat exchanger 101a (here, air-warming operation), and operation can be performed for cooling the air medium by evaporation of the heat-source-side refrigerant in the second usage-side heat exchanger 101a (here, air-cooling operation).

—B—

With this heat pump system 200, in the case that operation is performed in which the second usage-side heat exchanger 101a is made to function as a radiator of the heat-source-side refrigerant (here, the air-warming operation mode and/or hot-water supply/air-warming operation mode) in the discharge saturation temperature control of the heat-source-side refrigerant circuit 20, the target heat-source-side discharge saturation temperature Tc1s is increased more than in the case that operation is not performed in which the second usage-side heat exchanger 101a is made to function as a radiator of the heat-source-side refrigerant (here, the hot-water supply operation mode and/or the air-cooling operation mode). Therefore, in the case that operation is not performed in which the second usage-side heat exchanger 101a is made to function as a radiator of the heat-source-side refrigerant, operation is performed so that the refrigeration cycle in the heat-source-side refrigerant circuit 20 is performed at the lowest pressure possible to increase operating efficiency in the heat-source-side refrigerant circuit 20; and in the case that operation is performed in which the second usage-side heat exchanger 101a is made to function as a radiator of the heat-source-side refrigerant, it is possible to feed to the second usage-side heat exchanger 101a heat-source-side refrigerant having a saturation temperature suitable for heating the air medium.

(1) Modification 1

In the above-described heat pump system 200 (see FIG. 7), the first usage unit 4a for hot-water supply operation and the second usage unit 10a for air-warming and cooling operations are connected to the heat source unit 2. In this configuration as well, when a supply of aqueous medium with a wide range of temperatures is requested, the usage-side outlet/inlet pressure difference ΔP2 becomes very small (the usage-side outlet/inlet pressure difference ΔP2 being the pressure difference between the usage-side discharge pressure Pd2 and the usage-side intake pressure Ps2, the usage-side discharge pressure Pd2 being the pressure of the usage-side refrigerant in the discharge of the usage-side compressor 62a, and the usage-side intake pressure Ps2 being the pressure of the usage-side refrigerant in the intake of the usage-side compressor 62a) and low-load operation is requested of the usage-side refrigerant circuit 40a in the same manner as the heat pump system 1 (see FIG. 1) in Modification 1 of the first embodiment. Therefore, it is possible that the refrigeration cycle of the usage-side refrigerant circuit 40a cannot be sufficiently controlled using only control of the capacity of the usage-side compressor 62a, and the circulation of refrigeration machine oil in the usage-side compressor 62a may be compromised and bring about insufficient lubrication.

In view of the above, usage-side low-load operation control (see FIG. 3) is performed in the heat pump system 200 as well in the same manner as the heat pump system 1 (see FIG. 1) in the first embodiment.

It is thereby possible to respond to a request for a supply of an aqueous medium having a wide range of temperatures even in the case that the usage-side outlet/inlet pressure difference ΔP2 is very low, because the usage-side refrigerant circuit 40a can be readily operated even in low-load conditions by reducing the flow rate of the heat-source-side refrigerant that flows into the first usage-side heat exchanger 41a, inhibiting the heat exchange capability in the first usage-side heat exchanger 41a, and increasing the usage-side outlet/inlet pressure difference ΔP2.

(2) Modification 2

Figure 8:
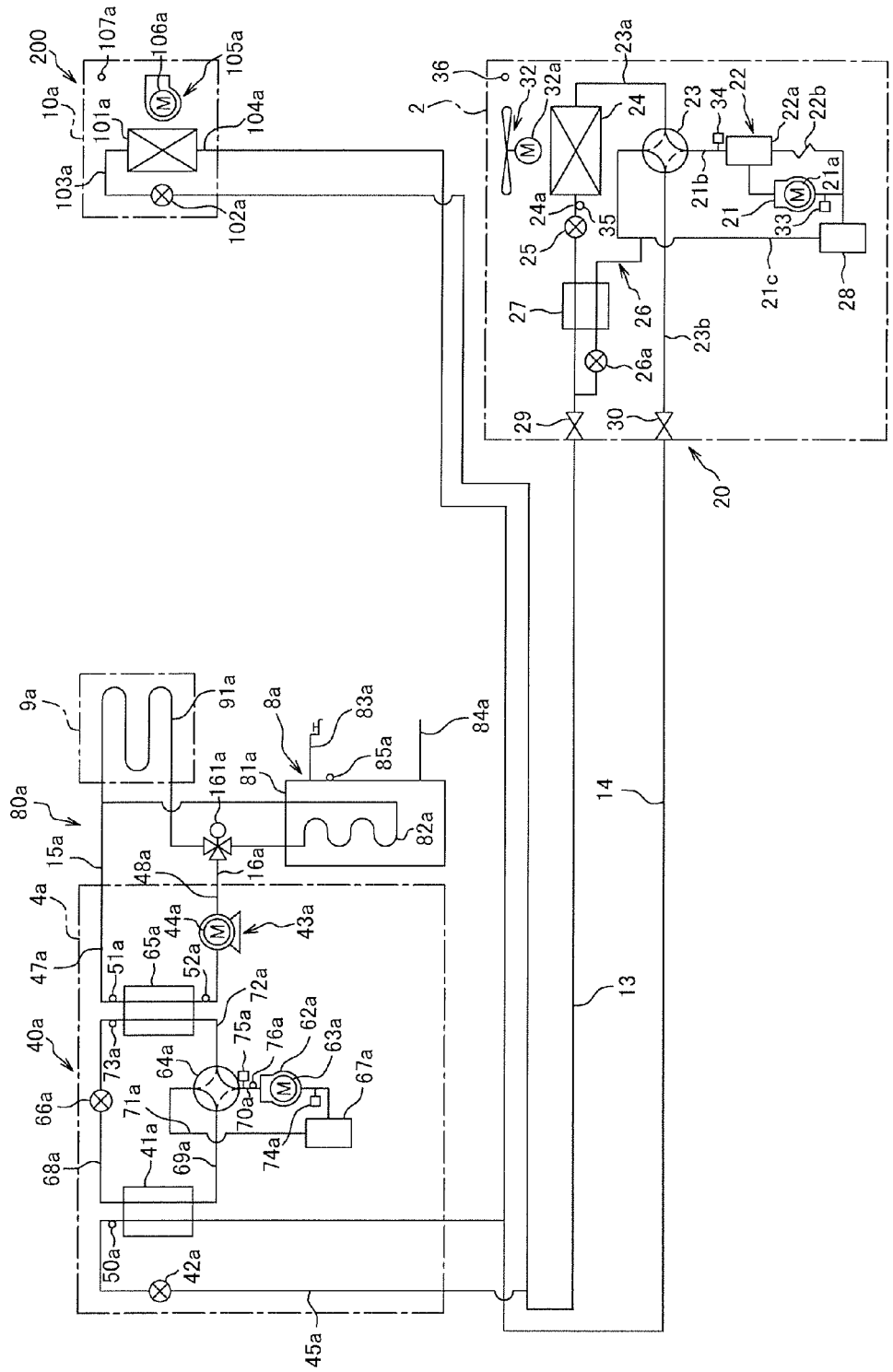
FIG. 8 is a view showing the general configuration of the heat pump system according to Modification 2 of the second embodiment.

In the heat pump system 200 described above (see FIG. 7), the usage-side refrigerant circuit 40a may be further provided with a first usage-side switching mechanism 64a capable of switching between a usage-side radiating operation state in which the refrigerant/water heat exchanger 65a is made to function as a radiator of the usage-side refrigerant and the first usage-side heat exchanger 41a is made to function as an evaporator of the usage-side refrigerant, and a usage-side evaporating operation state in which the refrigerant/water heat exchanger 65a is made to function as an evaporator of the usage-side refrigerant and the first usage-side heat exchanger 41a is made to function as a radiator of the usage-side refrigerant, as shown in FIG. 8, in the same manner as the heat pump system 1 in Modification 2 of the first embodiment (see FIG. 4), even in a configuration in which the first usage unit 4a for hot-water supply operation and the second usage unit 10a for air-warming and cooling operations are connected to the heat source unit 2.

In the heat pump system 200 having such a configuration, in the case that defrosting of the heat-source-side heat exchanger 24 has been determined to be required by operation of the hot-water supply operation mode, the air-warming operation mode, and/or the hot-water supply/air-warming operation mode, defrosting operation can be performed in which the heat-source-side switching mechanism 23 is set in the heat-source-side radiating operation state, whereby the heat-source-side heat exchanger 24 is made to function as a radiator of the heat-source-side refrigerant, and the second usage-side heat exchanger 101a is made to function as an evaporator of the heat-source-side refrigerant; and the first usage-side switching mechanism 64a is set in the usage-side evaporating operation state, whereby the refrigerant/water heat exchanger 65a is made to function as an evaporator of the usage-side refrigerant and the first usage-side heat exchanger 41a is made to function as a radiator of the usage-side refrigerant.

Operation in the defrosting operation is described below with reference to FIG. 5.

It is first determined whether predetermined defrosting operation start conditions have been satisfied (i.e., whether defrosting of the heat-source-side heat exchanger 24 is required; step S21). Here, it is determined whether defrosting operation start conditions have been satisfied based on whether a defrosting time interval Δtdf (i.e., the cumulative operation time from the end of the previous defrosting operation) has reached a predetermined defrosting time interval setting value Δtdfs.

In the case that it has been determined that the defrosting operation start conditions have been satisfied, the following defrosting operation is started (step S22).

When the defrosting operation is started, the heat-source-side switching mechanism 23 is switched to the heat-source-side radiating operation state (the state indicated by the solid line of heat-source-side switching mechanism 23 of FIG. 8) in the heat-source-side refrigerant circuit 20, and the first usage-side switching mechanism 64a is switched to the usage-side evaporating operation state (the state indicated by the broken line of the first usage-side switching mechanism 64a of FIG. 8) in the usage-side refrigerant circuit 40a, and the intake return expansion valve 26a is set in a closed state.

Here, when a procedure is performed to set the heat-source-side switching mechanism 23 in the heat-source-side radiating operation state and to switch the first usage-side switching mechanism 64a to the usage-side evaporating operation state, the refrigerant inside the refrigerant circuits 20, 40a undergoes pressure equalization, and noise is generated during pressure equalization (i.e., pressure equalization noise) inside the refrigerant circuits 20, 40a, but it is preferred that such pressure equalization noise does not become excessive.

In view of the above, in this heat pump system 200, when the defrosting operation is started, the first usage-side switching mechanism 64a is set in the usage-side evaporating operation state after the heat-source-side switching mechanism 23 has been set in the heat-source-side radiating operation state, and the refrigerant in the two refrigerant circuits 20, 40a do not undergo simultaneous pressure equalization. Excessive noise of pressure equalization in the case that the defrosting operation is performed can thereby be avoided.

In the heat pump system 200, when the first usage-side switching mechanism 64a is to be set in the usage-side evaporating operation state, the usage-side compressor 62a is set in a stopped state and the first usage-side switching mechanism 64a is set in the usage-side evaporating operation state. Therefore, the pressure equalization noise in the usage-side refrigerant circuit 40a can be prevented from increasing.

Furthermore, in this heat pump system 200, when the usage-side compressor 62a is to be set in a stopped state, the usage-side compressor 62a is stopped with the refrigerant/water heat-exchange-side flow rate adjustment valve 66a left in an open state (more specifically, a fully open state), and pressure equalization in the usage-side refrigerant circuit 40a can therefore be rapidly performed.

In the heat-source-side refrigerant circuit 20 in such a state, the low-pressure heat-source-side refrigerant in the refrigeration cycle is taken into the heat-source-side compressor 21 by way of the heat-source-side intake tube 21c, compressed to high pressure in the refrigeration cycle, and thereafter discharged to the heat-source-side discharge tube 21b. The high-pressure heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent to the heat-source-side heat exchanger 24 by way of the heat-source-side switching mechanism 23 and the first heat-source-side gas-refrigerant tube 23a. The high-pressure, heat-source-side refrigerant sent to the heat-source-side heat exchanger 24 undergoes heat exchange with ice deposited in the heat-source-side heat exchanger 24 and heat is released in the heat-source-side heat exchanger 24. The high-pressure, heat-source-side refrigerant having released heat in the heat-source-side heat exchanger is sent to the subcooler 27 by way of the heat-source-side expansion valve 25. The heat-source-side refrigerant sent to the subcooler 27 is sent from the heat source unit 2 to the liquid refrigerant communication tube 13 by way of the heat-source-side liquid-refrigerant tube 24a and the liquid-side shutoff valve 29 without undergoing heat exchange because the heat-source-side refrigerant does not flow in the intake return tube 26.

The heat-source-side refrigerant sent to the liquid refrigerant communication tube 13 branches in the liquid refrigerant communication tube 13 and is sent to the first usage unit 4a and the second usage unit 10a.

The heat-source-side refrigerant sent to the second usage unit 10a is sent to the second usage-side flow rate adjustment valve 102a. The heat-source-side refrigerant sent to the second usage-side flow rate adjustment valve 102a is depressurized in the second usage-side flow rate adjustment valve 102a to become a low-pressure gas-liquid two-phase state, and is then sent to the second usage-side heat exchanger 101a by way of the second usage-side liquid refrigerant tube 103a. The low-pressure, heat-source-side refrigerant sent to the second usage-side heat exchanger 101a undergoes heat exchange with an air medium fed by the usage-side fan 105a and evaporates in the second usage-side heat exchanger 101a. The low-pressure, heat-source-side refrigerant thus evaporated in the second usage-side heat exchanger 101a is sent from the second usage unit 10a to the gas refrigerant communication tube 14 by way of the second usage-side gas refrigerant tube 104a.

The heat-source-side refrigerant sent to the first usage unit 4a is sent to the first usage-side flow rate adjustment valve 42a. The heat-source-side refrigerant sent to the first usage-side flow rate adjustment valve 42a is depressurized in the first usage-side flow rate adjustment valve 42a to become a low-pressure gas-liquid two-phase state, and is then sent to the first usage-side heat exchanger 41a by way of the first usage-side liquid refrigerant tube 45a. The low-pressure, heat-source-side refrigerant sent to the first usage-side heat exchanger 41a undergoes heat exchange with the high-pressure usage-side refrigerant in the refrigeration cycle that is circulated through the usage-side refrigerant circuit 40a and evaporates in the first usage-side heat exchanger 41a. The low-pressure, heat-source-side refrigerant thus evaporated in the first usage-side heat exchanger 41a is sent from the first usage unit 4a to the gas refrigerant communication tube 14 by way of the first usage-side gas refrigerant tube 54a and the first usage-side gas on-off valve 56a constituting the first usage-side switching mechanism 53a.

The heat-source-side refrigerant sent from the second usage unit 10a and the first usage unit 4a to the gas refrigerant communication tube 14 merges in the gas refrigerant communication tube 14 and is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23b, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

The high-pressure, usage-side refrigerant in the refrigeration cycle that circulates through the usage-side refrigerant circuit 40a releases heat in the usage-side refrigerant circuit 40a by the evaporation of the heat-source-side refrigerant in the first usage-side heat exchanger 41a. The high-pressure, usage-side refrigerant having released heat in the first usage-side heat exchanger 41a is sent to the refrigerant/water heat exchange-side flow rate adjustment valve 66a. The high-pressure, usage-side refrigerant sent to the refrigerant/water heat exchange-side flow rate adjustment valve 66a is depressurized in the refrigerant/water heat exchange-side flow rate adjustment valve 66a to become a low-pressure gas-liquid two-phase state, and is then sent to the refrigerant/water heat exchanger 65a by way of the cascade-side liquid-refrigerant tube 68a. The low-pressure, usage-side refrigerant sent to the refrigerant/water heat exchanger 65a undergoes heat exchange with the aqueous medium circulated through the aqueous medium circuit 80a by the circulation pump 43a and evaporates in the refrigerant/water heat exchanger 65a. The low-pressure, usage-side refrigerant thus evaporated in the refrigerant/water heat exchanger 65a is sent to the usage-side accumulator 67a by way of the first cascade-side gas-refrigerant tube 72a and the second usage-side switching mechanism 64a. The low-pressure, usage-side refrigerant sent to the usage-side accumulator 67a is taken into the usage-side compressor 62a by way of the cascade-side intake tube 71a, compressed to high pressure in the refrigeration cycle, and thereafter discharged to the cascade-side discharge tube 70a. The high-pressure, usage-side refrigerant discharged to the cascade-side discharge tube 70a is again sent to the first usage-side heat exchanger 41a by way of the second usage-side switching mechanism 64a and the second cascade-side gas-refrigerant tube 69a.

In this manner, the defrosting operation is started in which the heat-source-side heat exchanger 24 is made to function as a radiator of the heat-source-side refrigerant by setting the heat-source-side switching mechanism 23 in the heat-source-side heat-release operation state; the second usage-side heat exchanger 101a is made to function as an evaporator of the heat-source-side refrigerant and the refrigerant/water heat exchanger 65a is made to function as an evaporator of the usage-side refrigerant by setting the second usage-side switching mechanism 64a in a usage-side evaporating operation state; and the first usage-side heat exchanger 41a is made to function as a radiator of the usage-side refrigerant (i.e., as an evaporator of the heat-source-side refrigerant).

It is determined whether predetermined defrosting operation end conditions have been satisfied (i.e., whether defrosting of the heat-source-side heat exchanger 24 has ended; step S23). Here, it is determined whether the defrosting operation end conditions have been satisfied depending on whether the heat-source-side heat exchanger temperature Thx has reached a predetermined defrosting completion temperature Thxs, or whether the defrosting operation time tdf, which is the time elapsed from the start of the defrosting operation, has reached a predetermined defrosting operation setting time tdfs.

In the case that it has been determined that the defrosting operation end conditions have been satisfied, the defrosting operation is ended and the process returns to the hot-water supply operation mode (step S24).

With the heat pump system 200, when the heat-source-side heat exchanger 24 is to be defrosted, not only is the heat-source-side heat exchanger 24 made to function as a radiator of the heat-source-side refrigerant by setting the heat-source-side switching mechanism 23 in the heat-source-side heat-release operation state, but also the refrigerant/water heat exchanger 65a is made to function as an evaporator of the usage-side refrigerant by setting the second usage-side switching mechanism 64a in the usage-side evaporating operation state because the first usage-side heat exchanger 41a is made to function as a radiator of the usage-side refrigerant, the heat-source-side refrigerant cooled by heat release in the heat-source-side heat exchanger 24 is heated by the radiation of the usage-side refrigerant in the first usage-side heat exchanger 41a, and the usage-side refrigerant cooled by heat release in the first usage-side heat exchanger 41a can be heated by evaporation in the refrigerant/water heat exchanger 65a. The defrosting of the heat-source-side heat exchanger 24 can thereby be reliably performed. The defrosting operation time tdf can be shortened, and it is possible to prevent the air medium cooled in the second usage unit 10a from reaching a low temperature because the second usage-side heat exchanger 101a is also made to function as an evaporator of the heat-source-side refrigerant.

(3) Modification 3

Figure 9:
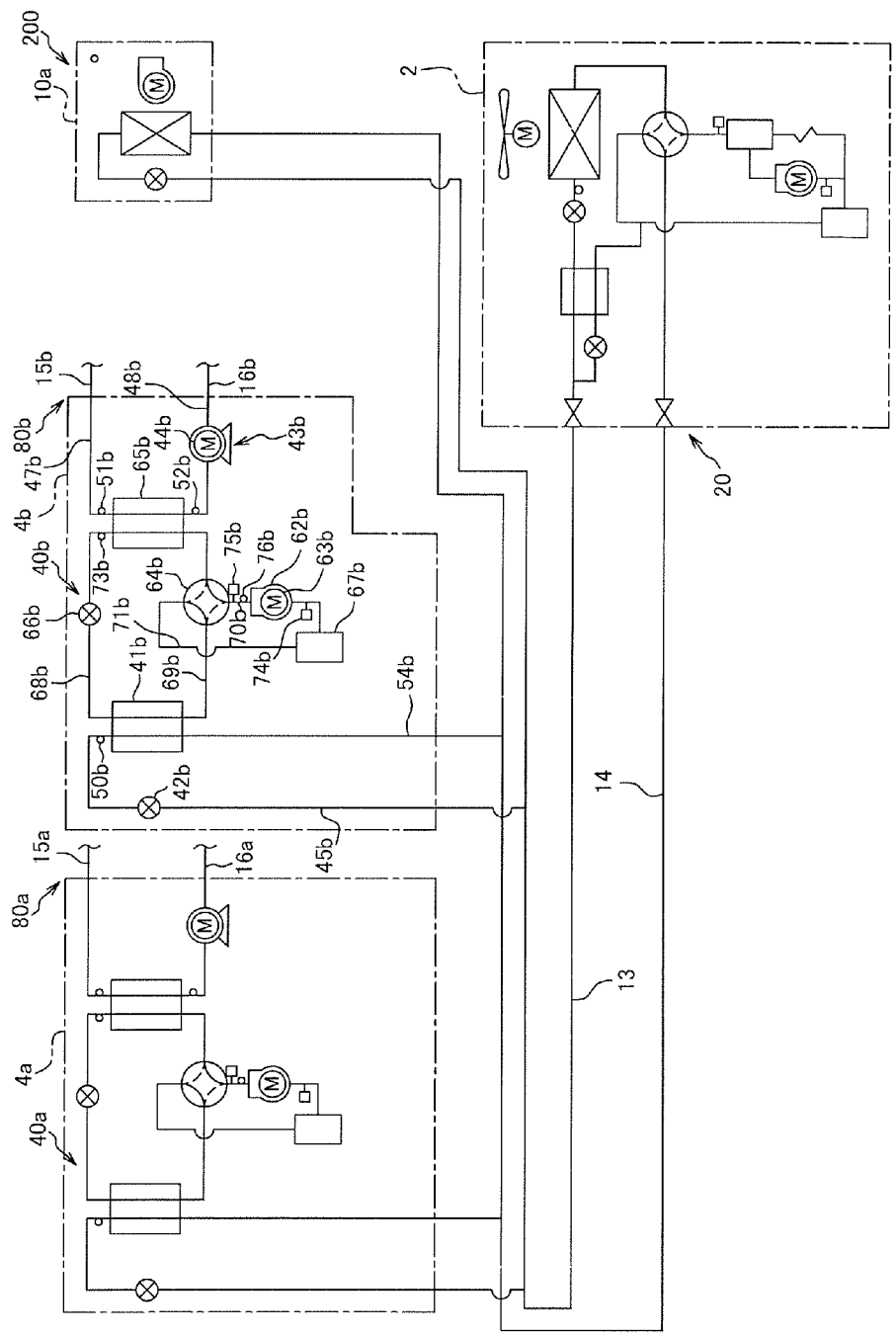
FIG. 9 is a view showing the general configuration of the heat pump system according to Modification 3 of the second embodiment.
Figure 10:
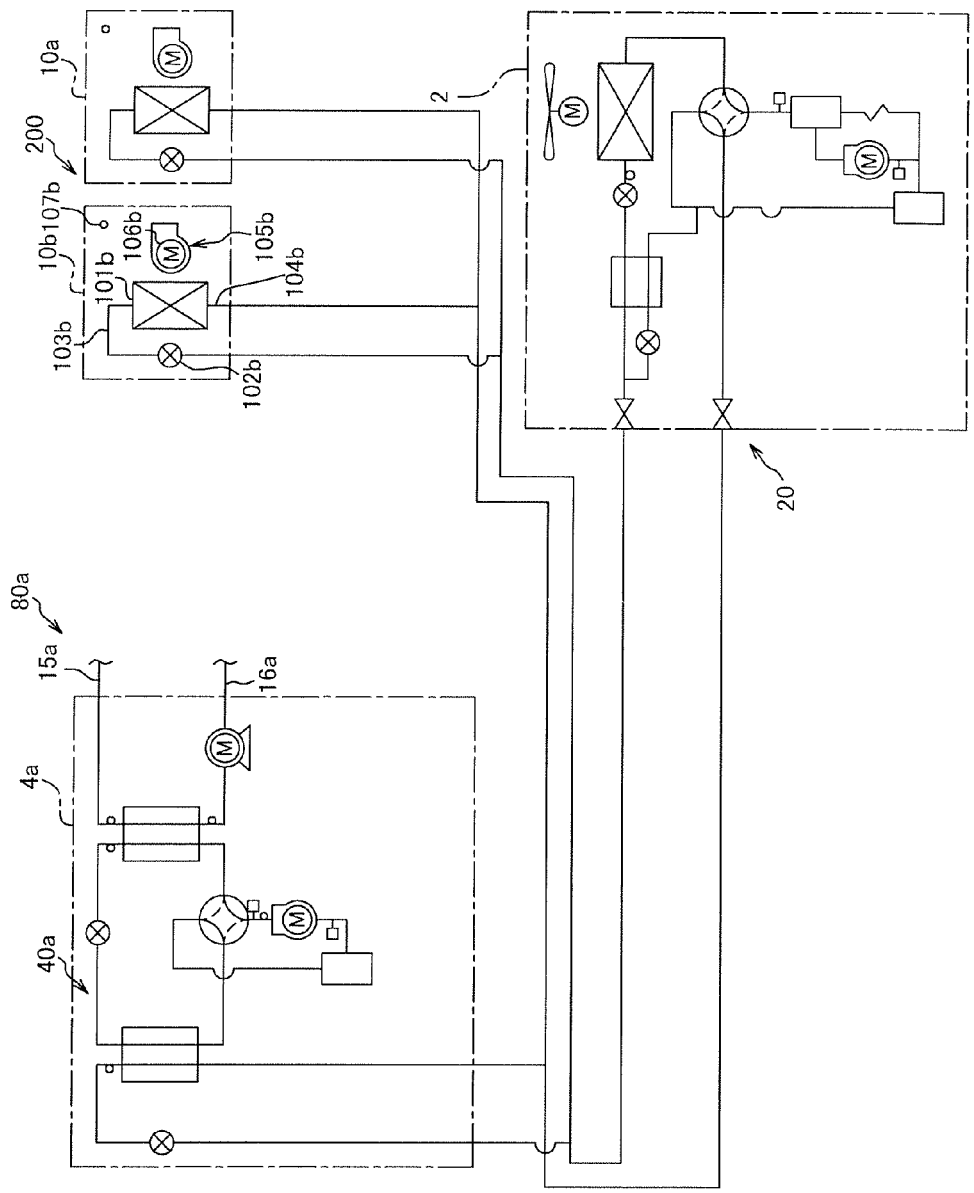
FIG. 10 is a view showing the general configuration of the heat pump system according to Modification 3 of the second embodiment.
Figure 11:
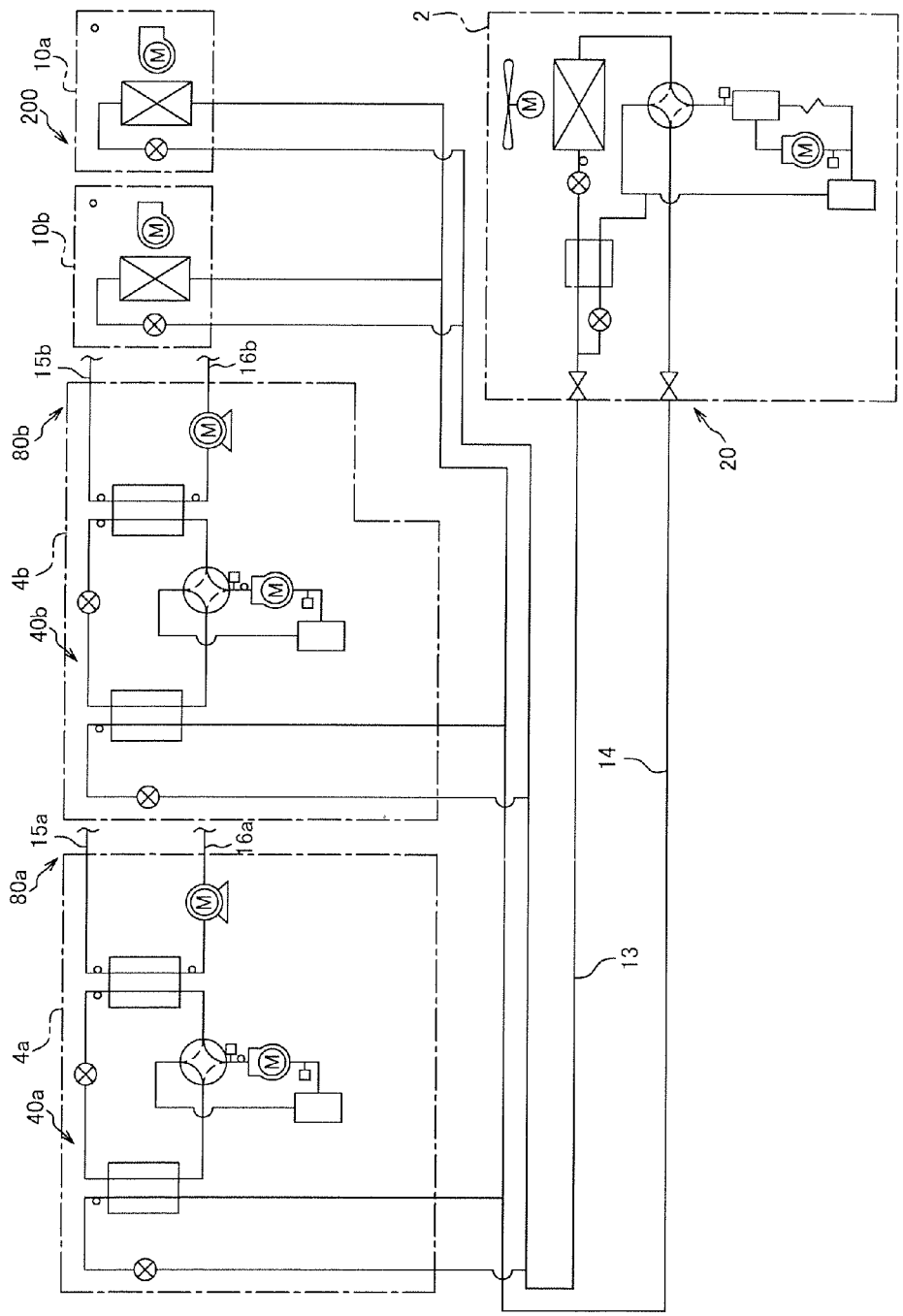
FIG. 11 is a view showing the general configuration of the heat pump system according to Modification 3 of the second embodiment.

In the heat pump systems 200 described above (see FIGS. 7 and 8), a single first usage unit 4a and a single second usage unit 10a are connected to the heat source unit 2 via the refrigerant communication tubes 13, 14, but a plurality of first usage units 4a, 4b (two, in this case) may be connected in parallel to each other via the refrigerant communication tubes 13, 14, and/or a plurality of second usage units 10a, 10b (two, in this case) may be connected in parallel to each other via the refrigerant communication tubes 13, 14, as shown in FIGS. 9 to 11 (in this case, the hot-water/air-warming unit, the hot-water storage unit, the aqueous medium circuits 80a, 80b, and the like are not shown). The configuration of the first usage unit 4b is the same as the configuration of the first usage unit 4a with the subscript "b" used in place of the subscript "a" of the reference numerals indicating each part of the first usage unit 4a, and a description of each part of the first usage unit 4b is therefore omitted. Also, the configuration of the second usage unit 10b is the same as the configuration of the second usage unit 10a with the subscript "b" used in place of the subscript "a" of the reference numerals indicating each part of the second usage unit 10b, and a description of each part is therefore omitted.

In these heat pump systems 200, it is possible to accommodate a plurality of locations and/or applications that require heating of the aqueous medium, and it is possible to accommodate a plurality of locations and/or applications that require cooling of the air medium.

(4) Modification 4

Figure 12:
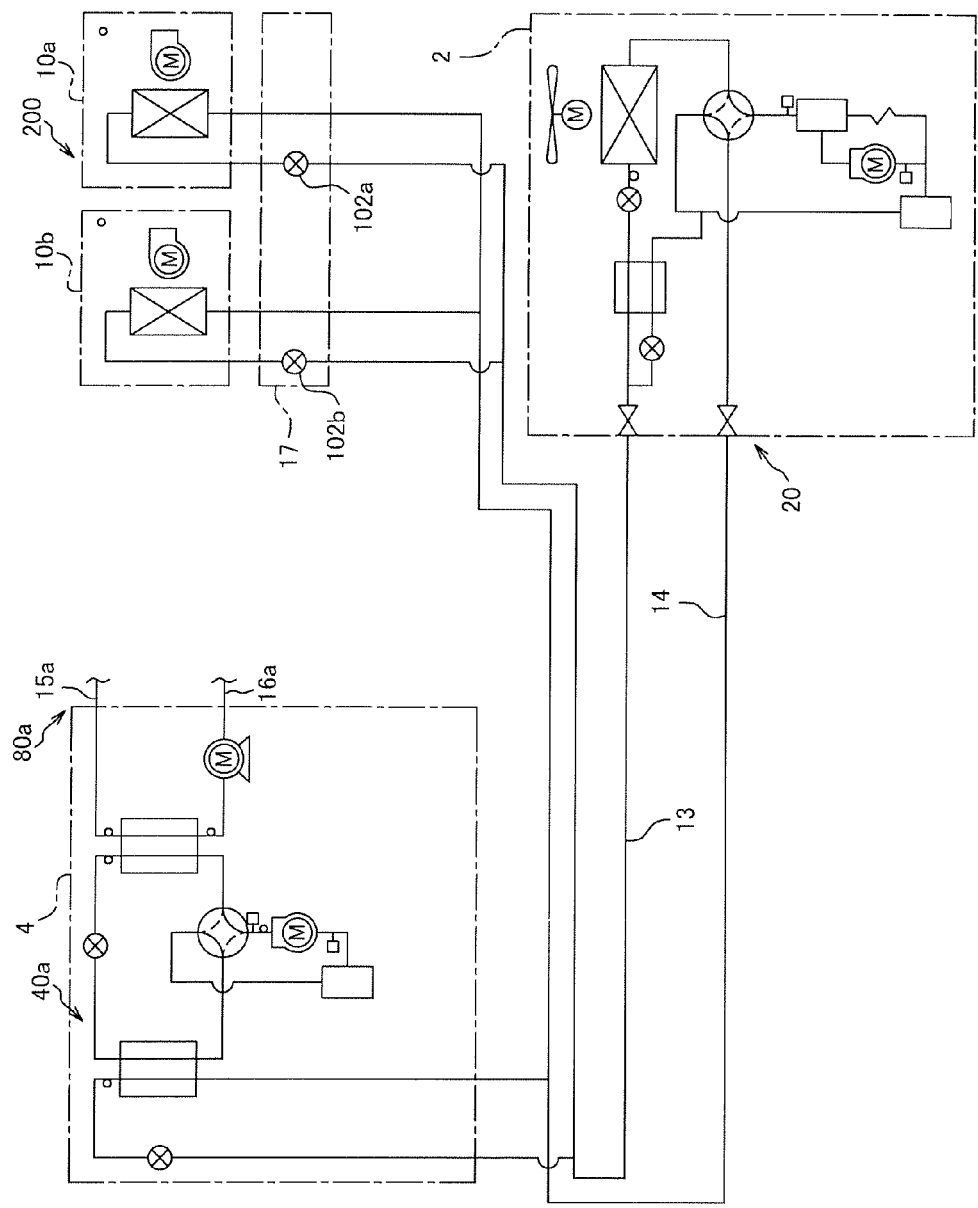
FIG. 12 is a view showing the general configuration of the heat pump system according to Modification 4 of the second embodiment.

In the heat pump systems 200 described above (see FIGS. 7 to 11), the second usage-side flow rate adjustment valves 102a, 102b are provided inside the second usage units 10a, 10b, but it is possible to omit the second usage-side flow rate adjustment valves 102a, 102b from the second usage units 10a, 10b and to provide an expansion valve unit 17 having the second usage-side flow rate adjustment valves 102a, 102b, as shown in FIG. 12 (in this case, the hot-water/air-warming unit, the hot-water storage unit, the aqueous medium circuit 80a, and the like are not shown).

Third Embodiment

In the heat pump systems 200 in the second embodiment and modifications thereof described above (see FIGS. 7 to 12), the air-cooling operation of the second usage unit 10a cannot be performed together with the hot-water supply operation of the first usage unit 4a. It is therefore preferred that such hot-water supply/air-cooling operation be possible because hot-water supply operation can be performed in an operation state in which the air-cooling operation is being performed during the summer season or the like.

Figure 13:
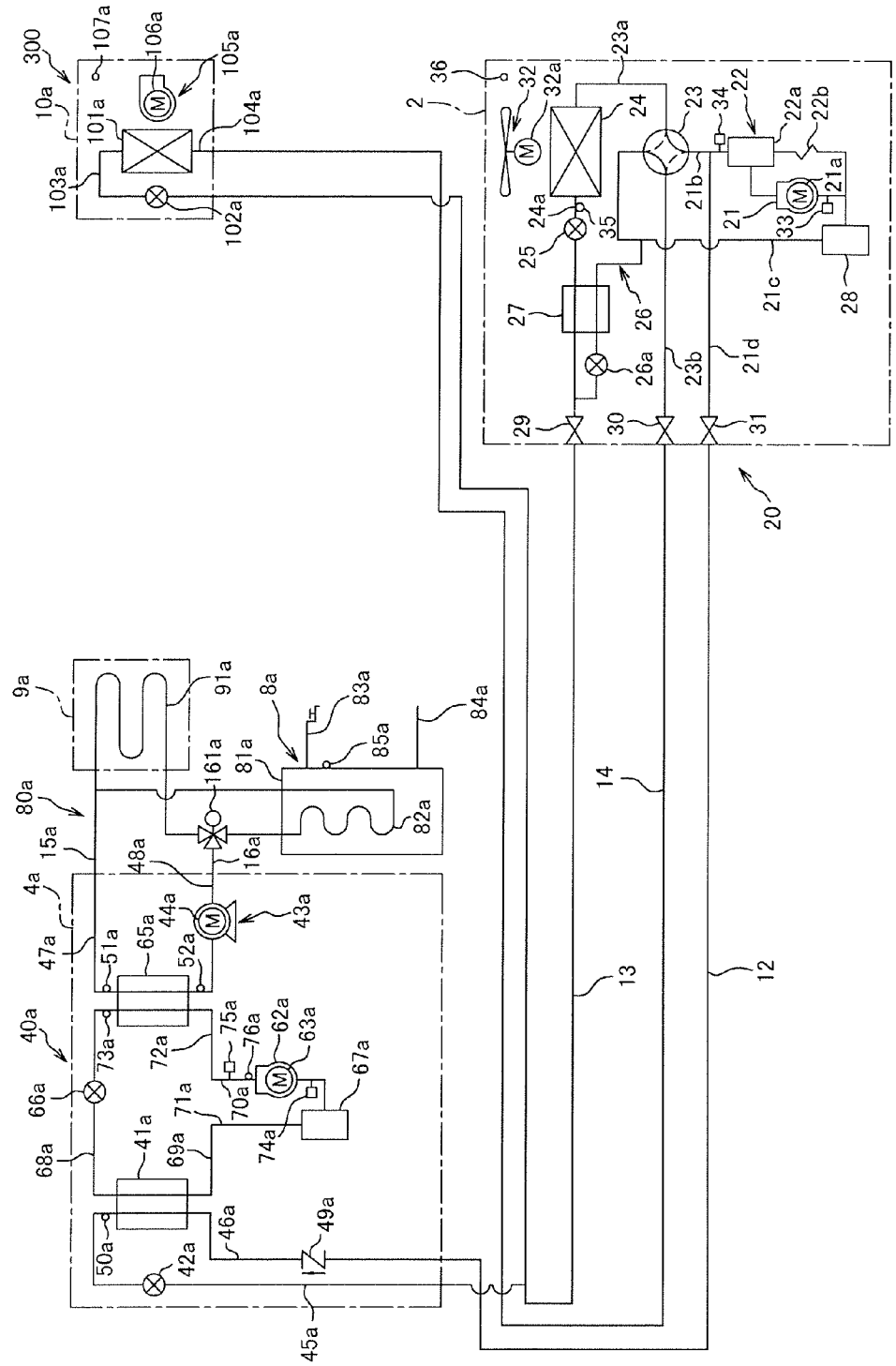
FIG. 13 is a view showing the general configuration of the heat pump system according to a third embodiment and Modification 1 of the third embodiment.

In view of the above, with a heat pump system 300, it is possible to perform hot-water supply and air-cooling operation in which the second usage-side heat exchanger 101a is made to function as an evaporator of the heat-source-side refrigerant to thereby cool an air medium, and the first usage-side heat exchanger 41a is made to function as a radiator of the heat-source-side refrigerant to thereby heat an aqueous medium, as shown in FIG. 13, in the configuration of the heat pump system 200 of the second embodiment described above (see FIG. 7). The configuration of the heat pump system 300 is described below.

<Configuration>
—Overall Configuration—

FIG. 13 is a view showing the general configuration of the heat pump system 300 according to a third embodiment of the present invention. The heat pump system 300 is an apparatus capable of performing operation for heating an aqueous medium and performing other operations using a vapor compression heat pump cycle.

The heat pump system 300 mainly has a heat source unit 2, a first usage unit 4a, a second usage unit 10a, a discharge refrigerant communication tube 12, a liquid-refrigerant communication tube 13, a gas-refrigerant communication tube 14, a hot-water storage unit 8a, a hot-water air-warming unit 9a, an aqueous medium communication tube 15a, and an aqueous medium communication tube 16a. The heat source unit 2, the first usage unit 4a, and the second usage unit 10a are connected via the refrigerant communication tubes 12, 13, 14 to thereby constitute a heat-source-side refrigerant circuit 20. The first usage unit 4a constitutes a usage-side refrigerant circuit 40a. The first usage unit 4a, the hot-water storage unit 8a, and the hot-water air-warming unit 9a are connected via the aqueous medium communication tubes 15a, 16a to thereby constitute an aqueous medium circuit 80a. HFC-410A, which is a type of HFC-based refrigerant, is enclosed inside the heat-source-side refrigerant circuit 20 as a heat-source-side refrigerant, and an ester-based or ether-based refrigeration machine oil having compatibility in relation to the HFC-based refrigerant is enclosed for lubrication of the heat-source-side compressor 21. HFC-134a, which is a type of HFC-based refrigerant, is enclosed inside the usage-side refrigerant circuit 40a as a usage-side refrigerant, and an ester-based or ether-based refrigeration machine oil having compatibility in relation to the HFC-based refrigerant is enclosed for lubrication of the usage-side compressor 62a. The usage-side refrigerant is preferably one in which the pressure that corresponds to a saturated gas temperature of 65° C. is a maximum gauge pressure of 2.8 MPa or less, and more preferably 2.0 MPa or less from the viewpoint of using a refrigerant that is advantageous for a high-temperature refrigeration cycle. HFC-134a is a type of refrigerant having such saturation pressure characteristics. Water constituting the aqueous medium circulates in the aqueous medium circuit 80a.

In the description related to the configurations below, the same reference numerals will be used and a description omitted for the configuration of the second usage unit 10a, the hot-water storage unit 8a, the hot-water air-warming unit 9a, the liquid refrigerant communication tube 13, the gas-refrigerant communication tube 14, and the aqueous medium communication tubes 15a, 16a, all of which have the same configuration as those of heat pump system 200 in the second embodiment (see FIG. 7). Only the configuration of the heat source unit 2, the discharge refrigerant communication tube 12, and the first usage unit 4a will be described.

—Heat Source Unit—

The heat source unit 2 is disposed outdoors, and is connected to the usage units 4a, 10a via the refrigerant communication tubes 12, 13, 14 and constitutes a portion of the heat-source-side refrigerant circuit 20.

The heat source unit 2 has primarily a heat-source-side compressor 21, an oil separation mechanism 22, a heat-source-side switching mechanism 23, a heat-source-side heat exchanger 24, a heat-source-side expansion valve 25, an intake return tube 26, a subcooler 27, a heat-source-side accumulator 28, a liquid-side shutoff valve 29, a gas-side shutoff valve 30, and a discharge-side shutoff valve 31.

The discharge-side shutoff valve 31 is a valve provided at the connection between the discharge refrigerant communication tube 12 and a heat-source-side discharge branch tube 21d which is diverted from the heat-source-side discharge tube 21b, which connects the heat-source-side switching mechanism 23 and the discharge of the heat-source-side compressor 21.

The heat source unit 2 is the same as in the heat pump system 200 in the second embodiment (see FIG. 7), except for the configuration related to the discharge-side shutoff valve 31 and the heat-source-side discharge branching tube 21d, and the same reference numerals will be used and a description omitted.

—Discharge Refrigerant Communication Tube—

The discharge refrigerant communication tube 12 is connected to the heat-source-side discharge branch tube 21d via the discharge-side shutoff valve 31, and is a refrigerant tube capable of directing the heat-source-side refrigerant to the outside of the heat source unit 2 from the discharge of the heat-source-side compressor 21 in any of the heat-source-side radiating operation state and the heat-source-side evaporating operation state of the heat-source-side switching mechanism 23.

—First Usage Unit—

The first usage unit 4a is arranged indoors, is connected to the heat source unit 2 and the second usage unit 10a via the refrigerant communication tubes 12, 13, and constitutes a portion of the heat-source-side refrigerant circuit 20. The first usage unit 4a constitutes the usage-side refrigerant circuit 40a. The first usage unit 4a is connected to the hot-water storage unit 8a and the hot-water air-warming unit 9a via the aqueous medium communication tubes 15a, 16a and constitutes a portion of aqueous medium circuit 80a.

The first usage unit 4a mainly has the first usage-side heat exchanger 41a, the first usage-side flow rate adjustment valve 42a, the usage-side compressor 62a, the refrigerant/water heat exchanger 65a, a refrigerant/water heat exchange-side flow rate adjustment valve 66a, a usage-side accumulator 67a, and a circulation pump 43a.

A first usage-side discharge refrigerant tube 46a, to which the discharge refrigerant communication tube 12 is connected, is connected to the first usage-side heat exchanger 41a on the gas side of the channel through which the heat-source-side refrigerant flows in lieu of the first usage-side gas refrigerant tube 54a connected to the gas-refrigerant communication tube 14 as in the heat pump system 200 (see FIG. 7) in the second embodiment. The first usage-side discharge refrigerant tube 46a is provided with a first usage-side discharge non-return valve 49a for allowing the heat-source-side refrigerant to flow toward the first usage-side heat exchanger 41a from the discharge refrigerant communication tube 12 and preventing the heat-source-side refrigerant from flowing toward the discharge refrigerant communication tube 12 from the first usage-side heat exchanger 41a.

The usage unit 4a is the same as in the heat pump system 200 (FIG. 7) in the second embodiment, except for the configuration related to the first usage-side discharge refrigerant tube 46a connected in place of the first usage-side gas refrigerant tube 54a, and the same reference numerals will be used and a description omitted.

The heat pump system 300 is provided with a controller (not shown) for performing the operations and/or various types of control described below.

<Operation>

Next, the operation of the heat pump system 300 will be described.

The operation modes of the heat pump system 300 include a hot-water supply operation mode in which only the hot-water supply operation of the first usage unit 4a is performed (i.e., operation of the hot-water storage unit 8a and/or the hot-water air-warming unit 9a), an air-cooling operation mode in which only air-cooling operation of the second usage unit 10a is performed, an air-warming operation mode in which only air-warming operation of the second usage unit 10a is performed, a hot-water supply/air-warming operation mode in which hot-water supply operation of the first usage unit 4a is performed together with the air-warming operation of the second usage unit 10a, and a hot-water supply/air-cooling operation mode for performing the hot-water supply operation of the first usage unit 4a as well as the air-cooling operation of the second usage unit 10a.

The operation in the five operating modes of the heat pump system 300 will next be described.

—Hot-Water Supply Operation Mode—

In the case of performing only the hot-water supply operation of the first usage unit 4a, the heat-source-side switching mechanism 23 is switched to the heat-source-side evaporating operation state (indicated by broken line in the heat-source-side switching mechanism 23 in FIG. 13), and the intake return expansion valve 26a and the second usage-side flow rate adjustment valve 102a are closed in the heat-source-side refrigerant circuit 20. In the aqueous medium circuit 80a, the aqueous-medium-side switching mechanism 161a is switched to the state of feeding the aqueous medium to the hot-water storage unit 8a and/or the hot-water air-warming unit 9a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, and is discharged to a heat-source-side discharge tube 21b after having been compressed to a high pressure in the refrigeration cycle. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a via the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 via the first usage-side flow rate adjustment valve 42a and the first usage-side liquid refrigerant tube 45a.

The heat-source-side refrigerant sent to the liquid refrigerant communication tube 13 is sent to the heat source unit 2. The heat-source-side refrigerant sent to the heat source unit 2 is sent to the subcooler 27 via a liquid-side shutoff valve 29. The heat-source-side refrigerant sent to the subcooler 27 does not undergo heat exchange and is sent to the heat-source-side expansion valve 25 because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 by way of a heat-source-side liquid-refrigerant tube 24a. The low-pressure refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 via the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 via the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a via the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a via the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48a and pressurized, and is then sent from the first usage unit 4a to the aqueous medium communication tube 16a. The aqueous medium sent to the aqueous medium communication tube 16a is sent to the hot-water storage unit 8a and/or the hot-water air-warming unit 9a by way of the aqueous-medium-side switching mechanism 161a. The aqueous medium sent to the hot-water storage unit 8a undergoes heat exchange with the aqueous medium inside the hot-water storage tank 81a and releases heat in the heat exchange coil 82a, whereby the aqueous medium inside the hot-water storage tank 81a is heated. The aqueous medium sent to the hot-water air-warming unit 9a releases heat in the heat exchange panel 91a, whereby indoor walls or the like are heated and indoor floors are heated.

Operation in the hot-water supply operation mode for performing only hot-water supply operation of the first usage unit 4a is performed in this manner.

—Air-Cooling Operation Mode—

In the case of performing only the air-cooling operation of the second usage unit 10a, the heat-source-side switching mechanism 23 is switched to the heat-source-side radiating operation state (indicated by solid lines in the heat-source-side switching mechanism 23 in FIG. 13), and the first usage-side flow rate adjustment valve 42a is closed in the heat-source-side refrigerant circuit 20.

In the heat-source-side refrigerant circuit 20 in such a state, the low-pressure, heat-source-side refrigerant in the refrigeration cycle is taken into the heat-source-side compressor 21 via the heat-source-side intake tube 21c, and is discharged to the heat-source-side discharge tube 21b after having been compressed to high pressure in the refrigeration cycle. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent to the heat-source-side heat exchanger 24 by way of the heat-source-side switching mechanism 23 and a first heat-source-side gas-refrigerant tube 23a. The high-pressure, heat-source-side refrigerant sent to the heat-source-side heat exchanger 24 undergoes heat exchange with outdoor air fed by a heat-source-side fan 32 and releases heat in the heat-source-side heat exchanger 24. The high-pressure, heat-source-side refrigerant having released heat in the heat-source-side heat exchanger is sent to the subcooler 27 via the heat-source-side expansion valve 25. The heat-source-side refrigerant sent to the subcooler 27 undergoes heat exchange with the heat-source-side refrigerant branched from the heat-source-side liquid-refrigerant tube 24a to the intake return tube 26 and is cooled to a subcooled state. The heat-source-side refrigerant that flows through the intake return tube 26 is returned to the heat-source-side intake tube 21c. The heat-source-side refrigerant cooled in the subcooler 27 is sent from the heat source unit 2 to the liquid refrigerant communication tube 13 by way of the heat-source-side liquid-refrigerant tube 24a and the liquid-side shutoff valve 29.

The high-pressure, heat-source-side refrigerant sent to the liquid refrigerant communication tube 13 is sent to the second usage unit 10a. The high-pressure, heat-source-side refrigerant sent to the second usage unit 10a is sent to the second usage-side flow rate adjustment valve 102a. The high-pressure, heat-source-side refrigerant sent to the second usage-side flow rate adjustment valve 102a is depressurized in the second usage-side flow rate adjustment valve 102a to become a low-pressure gas-liquid two-phase state, and is then sent to the second usage-side heat exchanger 101a by way of the second usage-side liquid refrigerant tube 103a. The low-pressure, heat-source-side refrigerant sent to the second usage-side heat exchanger 101a undergoes heat exchange with an air medium fed by the usage-side fan 105a and evaporates in the second usage-side heat exchanger 101a to thereby perform indoor air cooling. The low-pressure, heat-source-side refrigerant thus evaporated in the second usage-side heat exchanger 101a is sent from the second usage unit 10a to the gas refrigerant communication tube 14 by way of the second usage-side gas refrigerant tube 104a.

The low-pressure, heat-source-side refrigerant sent to the gas-refrigerant communication tube 14 is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23b, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

Operation in the air-cooling operation mode for performing only air-cooling operation of the second usage unit 10a is performed in this manner.

—Air-Warming Operation Mode—

In the case of performing only the air-warming operation of the second usage unit 10a, the heat-source-side switching mechanism 23 is switched to the heat-source-side radiating operation state (indicated by broken lines in the heat-source-side switching mechanism 23 in FIG. 13), and the intake return expansion valve 26a and the first usage-side flow rate adjustment valve 42a are closed in the heat-source-side refrigerant circuit 20.

In the heat-source-side refrigerant circuit 20 in such a state, low-pressure, heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil of the high-pressure, heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent from the heat source unit 2 to the gas-refrigerant communication tube 14 by way of the heat-source-side switching mechanism 23, the second heat-source-side gas refrigerant tube 23b, and the gas-side shutoff valve 30.

The high-pressure, heat-source-side refrigerant sent to the gas-refrigerant communication tube 14 is sent to the second usage unit 10a. The high-pressure, heat-source-side refrigerant sent to the second usage unit 10a is sent to the second usage-side heat exchanger 101a by way of the second usage-side gas refrigerant tube 104a. The high-pressure, heat-source-side refrigerant sent to the second usage-side heat exchanger 101a undergoes heat exchange with an air medium fed by the usage-side fan 105a and releases heat in the second usage-side heat exchanger 101a to thereby perform indoor air warming. The high-pressure, heat-source-side refrigerant thus having released heat in the second usage-side heat exchanger 101a is sent from the second usage unit 10a to the liquid refrigerant communication tube 13 by way of the second usage-side flow rate adjustment valve 102a and the second usage-side liquid refrigerant tube 103a.

The heat-source-side refrigerant sent to the liquid-refrigerant communication tube 13 is sent to the heat source unit 2. The heat-source-side refrigerant sent to the heat source unit 2 is sent to the subcooler 27 by way of the liquid-side shutoff valve 29. The heat-source-side refrigerant sent to the subcooler 27 is sent to the heat-source-side expansion valve 25 without undergoing heat exchange because the heat-source-side refrigerant does not flow in the intake return tube 26. The heat-source-side refrigerant sent to the heat-source-side expansion valve 25 is depressurized in the heat-source-side expansion valve 25 to form a low-pressure, gas-liquid two-phase state, and is then sent to the heat-source-side heat exchanger 24 by way of the heat-source-side liquid-refrigerant tube 24a. The low-pressure, heat-source-side refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 by way of the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 by way of the heat-source-side intake tube 21c.

Operation in the air-warming operation mode for performing only air-warming operation of the second usage unit 10a is performed in this manner.

—Hot-Water Supply/Air-Warming Operation Mode—

In the case of performing the hot-water supply operation of the first usage unit 4a as well as the air-warming operation of the second usage unit 10a, the heat-source-side switching mechanism 23 is switched to the heat-source-side evaporating operation state (indicated by broken lines in the heat-source-side switching mechanism 23 in FIG. 13), and the intake return expansion valve 26a is closed in the heat-source-side refrigerant circuit 20. In the aqueous medium circuit 80a, the aqueous-medium-side switching mechanism 161a is switched to a state in which the aqueous medium is fed to the hot-water storage unit 8a and/or the hot-water air-warming unit 9a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, is compressed to high pressure in the refrigeration cycle, and is thereafter discharged to the heat-source-side discharge tube 21b. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. A portion of the high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31, and the remainder is sent from the heat source unit 2 to the gas-refrigerant communication tube 14 by way of the heat-source-side switching mechanism 23, the second heat-source-side gas refrigerant tube 23b and the gas-side shutoff valve 30.

The high-pressure, heat-source-side refrigerant sent to the gas-refrigerant communication tube 14 is sent to the second usage unit 10a. The high-pressure, heat-source-side refrigerant sent to the second usage unit 10a is sent to the second usage-side heat exchanger 101a by way of the second usage-side gas refrigerant tube 104a. The high-pressure, heat-source-side refrigerant sent to the second usage-side heat exchanger 101a undergoes heat exchange with the air medium fed by the usage-side fan 105a to release heat in the second usage-side heat exchanger 101a and thereby perform indoor air warming. The high-pressure, heat-source-side refrigerant having released heat in the second usage-side heat exchanger 101a is sent from the second usage unit 10a to the liquid refrigerant communication tube 13 by way of the second usage-side flow rate adjustment valve 102a and the second usage-side liquid refrigerant tube 103a.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a by way of the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 by way of the first usage-side flow rate adjustment valve 42a and the first usage-side liquid refrigerant tube 45a.

The heat-source-side refrigerant sent from the second usage unit 10a and the first usage unit 4a to the liquid refrigerant communication tube 13 merges in the liquid refrigerant communication tube 13 and is sent to the heat source unit 2. The heat-source-side refrigerant sent to the heat source unit 2 is sent to the subcooler 27 by way of the liquid-side shutoff valve 29. The heat-source-side refrigerant sent to the subcooler 27 is sent to the heat-source-side expansion valve 25 without undergoing heat exchange because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 by way of the heat-source-side liquid-refrigerant tube 24a. The low-pressure refrigerant sent to the heat-source-side heat exchanger 24 undergoes heat exchange with outdoor air fed by the heat-source-side fan 32 and evaporates in the heat-source-side heat exchanger 24. The low-pressure, heat-source-side refrigerant evaporated in the heat-source-side heat exchanger 24 is sent to the heat-source-side accumulator 28 by way of the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 by way of the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a by way of the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a by way of the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48*a* and pressurized, and is then sent from the first usage unit 4*a* to the aqueous medium communication tube 16*a*. The aqueous medium sent to the aqueous medium communication tube 16*a* is sent to the hot-water storage unit 8*a* and/or the hot-water air-warming unit 9*a* by way of the aqueous-medium-side switching mechanism 161*a*. The aqueous medium sent to the hot-water storage unit 8*a* undergoes heat exchange with the aqueous medium inside the hot-water storage tank 81*a* and releases heat in the heat exchange coil 82*a*, whereby the aqueous medium inside the hot-water storage tank 81*a* is heated. The aqueous medium sent to the hot-water air-warming unit 9*a* releases heat in the heat exchange panel 91*a*, whereby indoor walls or the like are heated and indoor floors are heated.

Operation in the hot-water supply/air-warming operation mode for performing hot-water supply operation of the first usage unit 4*a* and air-warming operation of the second usage unit 10*a* are performed in this manner.

—Hot-Water Supply/Air-Cooling Operation Mode—

In the case of performing the hot-water supply operation of the first usage unit 4*a* as well as the air-cooling operation of the second usage unit 10*a*, the heat-source-side switching mechanism 23 is switched to the heat-source-side radiating operation state (indicated by solid lines in the heat-source-side switching mechanism 23 in FIG. 13) in the heat-source-side refrigerant circuit 20. In the aqueous medium circuit 80*a*, the aqueous-medium-side switching mechanism 161*a* is switched to a state in which the aqueous medium is fed to the hot-water storage unit 8*a*.

In the heat-source-side refrigerant circuit 20 in such a state, the low-pressure, heat-source-side refrigerant in the refrigeration cycle is taken into the heat-source-side compressor 21 by way of the heat-source-side intake tube 21*c*, is compressed to high pressure in the refrigeration cycle, and is thereafter discharged to the heat-source-side discharge tube 21*b*. The high-pressure, heat-source-side refrigerant discharged to the heat-source-side discharge tube 21*b* has the refrigeration machine oil separated out in the oil separator 22*a*. The refrigeration machine oil separated out from the heat-source-side refrigerant in the oil separator 22*a* is returned to the heat-source-side intake tube 21*c* by way of the oil return tube 22*b*. A portion of the high-pressure, heat-source-side refrigerant from which the refrigeration machine oil has been separated out is sent from the heat source unit 2 to the discharge refrigerant communication tube 12 by way of the heat-source-side discharge branching tube 21*d* and a discharge-side shutoff valve 31, and the remainder is sent to the heat-source-side heat exchanger 24 by way of the heat-source-side switching mechanism 23 and the first heat-source-side gas-refrigerant tube 23*a*. The high-pressure, heat-source-side refrigerant sent to the heat-source-side heat exchanger 24 undergoes heat exchange with outdoor air fed by the heat-source-side fan 32 and releases heat in the heat-source-side heat exchanger 24. The high-pressure, heat-source-side refrigerant having released heat in the heat-source-side heat exchanger is sent to the subcooler 27 by way of the heat-source-side expansion valve 25. The heat-source-side refrigerant sent to the subcooler 27 undergoes heat exchange with the heat-source-side refrigerant branched from the heat-source-side liquid-refrigerant tube 24*a* to the intake return tube 26 and is cooled to a subcooled state. The heat-source-side refrigerant that flows through the intake return tube 26 is returned to the heat-source-side intake tube 21*c*. The heat-source-side refrigerant cooled in the subcooler 27 is sent from the heat source unit 2 to the liquid refrigerant communication tube 13 by way of the heat-source-side liquid-refrigerant tube 24*a* and the liquid-side shutoff valve 29.

The high-pressure, heat-source-side refrigerant sent to the discharge refrigerant communication tube 12 is sent to the first usage unit 4*a*. The high-pressure, heat-source-side refrigerant sent to the first usage unit 4*a* is sent to the first usage-side heat exchanger 41*a* by way of the first usage-side discharge refrigerant tube 46*a* and the first usage-side discharge non-return valve 49*a*. The high-pressure, heat-source-side refrigerant sent to the first usage-side heat exchanger 41*a* undergoes heat exchange with the low-pressure, usage-side refrigerant in the refrigeration cycle that circulates through the usage-side refrigerant circuit 40*a* and releases heat in the first usage-side heat exchanger 41*a*. The high-pressure, heat-source-side refrigerant having released heat in the first usage-side heat exchanger 41*a* is sent from the first usage unit 4*a* to the liquid refrigerant communication tube 13 by way of the first usage-side flow rate adjustment valve 42*a* and the first usage-side liquid refrigerant tube 45*a*.

The heat-source-side refrigerant sent from the heat source unit 2 and the first usage unit 4*a* to the liquid refrigerant communication tube 13 merges in the liquid refrigerant communication tube 13 and is sent to the second usage unit 10*a*. The heat-source-side refrigerant sent to the second usage unit 10*a* is sent to the second usage-side flow rate adjustment valve 102*a*. The heat-source-side refrigerant sent to the second usage-side flow rate adjustment valve 102*a* is depressurized in the second usage-side flow rate adjustment valve 102*a* to become a low-pressure gas-liquid two-phase state, and is then sent to the second usage-side heat exchanger 101*a* by way of the second usage-side liquid refrigerant tube 103*a*. The low-pressure heat-source-side refrigerant sent to the second usage-side heat exchanger 101*a* undergoes heat exchange with the air medium fed by the usage-side fan 105*a* and evaporates in the second usage-side heat exchanger 101*a* to thereby perform indoor air cooling. The low-pressure, heat-source-side refrigerant evaporated in the second usage-side heat exchanger 101*a* is sent from the second usage unit 10*a* to the gas-refrigerant communication tube 14 by way of the second usage-side gas refrigerant tube 104*a*.

The low-pressure, heat-source-side refrigerant sent to the gas-refrigerant communication tube 14 is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23*b*, and the heat-source-side switching mechanism 23. The low-pressure, heat-source-side refrigerant sent to the heat-source-side accumulator 28 is again taken into the heat-source-side compressor 21 by way of the heat-source-side intake tube 21*c*.

In the usage-side refrigerant circuit 40*a*, the low-pressure, usage-side refrigerant in the refrigeration cycle that is circulating through the usage-side refrigerant circuit 40*a* is heated and evaporated by the radiation of the heat-source-side refrigerant in the first usage-side heat exchanger 41*a*. The low-pressure, usage-side refrigerant evaporated in the first usage-side heat exchanger 41*a* is sent to the usage-side accumulator 67*a* by way of the second cascade-side gas-refrigerant tube 69*a*. The low-pressure, usage-side refrigerant sent to the usage-side accumulator 67*a* is taken into the usage-side compressor 62*a* by way of the cascade-side intake tube 71*a*, is compressed to high pressure in the refrigeration cycle, and is thereafter discharged to the cascade-side discharge tube 70*a*. The high-pressure, usage-side refrigerant discharged to the cascade-side discharge tube 70*a* is sent to the refrigerant/water heat exchanger 65*a* by way of the first cascade-side gas-refrigerant tube 72*a*. The high-pressure, usage-side refrigerant sent to the refrigerant/water heat exchanger 65*a* undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48a and pressurized, and is then sent from the first usage unit 4a to the aqueous medium communication tube 16a. The aqueous medium sent to the aqueous medium communication tube 16a is sent to the hot-water storage unit 8a by way of the aqueous-medium-side switching mechanism 161a. The aqueous medium sent to the hot-water storage unit 8a undergoes heat exchange with the aqueous medium inside the hot-water storage tank 81a and releases heat in the heat exchange coil 82a, whereby the aqueous medium inside the hot-water storage tank 81a is heated.

Operation in the hot-water supply/air-cooling operation mode for performing hot-water supply operation of the first usage unit 4a and air-cooling operation of the second usage unit 10a are performed in this manner.

Here, the discharge saturation temperature control of the refrigerant circuits 20, 40a, the degree-of-subcooling control of the outlets of the heat exchangers 41a, 65a, the control of the flow rate of the aqueous medium circulating through the aqueous medium circuit 80a, and the startup control of the circuits 20, 40a, 80a are performed in the same manner as the heat pump system 200 (see FIG. 7) in the second embodiment, even in a configuration of the heat pump system 300 in which the first usage unit 4a for hot-water supply operation and the second usage unit 10a for air-cooling/air-warming operation are connected to the heat source unit 2 so as to allow hot-water supply/air-cooling operation.

In this heat pump system 300, not only is it thereby possible to obtain the same effects as those of the heat pump system 200 in the second embodiment, but it is also possible to perform operation in which the aqueous medium is heated in the first usage-side heat exchanger 41a and the usage-side refrigerant circuit 40a, and to use the heat of cooling, which is obtained by the heat-source-side refrigerant by heating of the aqueous medium, in the operation for cooling the air medium by evaporation of the heat-source-side refrigerant in the second usage-side heat exchanger 101a. Therefore, for example, the aqueous medium heated by the first usage-side heat exchanger 41a and the usage-side refrigerant circuit 40a is used for hot-water supply, the air medium cooled in the second usage-side heat exchanger 101a is used for indoor air cooling, and it is otherwise possible to effectively use the heat of cooling obtained by the heat-source-side refrigerant by the heating of the aqueous medium, whereby energy savings can be ensured.

(1) Modification 1

In the above-described heat pump system 300 (see FIG. 13), the first usage unit 4a for hot-water supply operation and the second usage unit 10a for air-cooling/air-warming operation are connected to the heat source unit 2 so as to allow hot-water supply and air-cooling operation. In this configuration as well, when a supply of aqueous medium with a wide range of temperatures is requested, the usage-side outlet/inlet pressure difference ΔP2 becomes very small (the usage-side outlet/inlet pressure difference ΔP2 being the pressure difference between the usage-side discharge pressure Pd2 and the usage-side intake pressure Ps2, the usage-side discharge pressure Pd2 being the pressure of the usage-side refrigerant in the discharge of the usage-side compressor 62a, and the usage-side intake pressure Ps2 being the pressure of the usage-side refrigerant in the intake of the usage-side compressor 62a) and low-load operation is requested of the usage-side refrigerant circuit 40a in the same manner as the heat pump system 200 (see FIG. 7) in Modification 1 of the second embodiment. Therefore, it is possible that the refrigeration cycle of the usage-side refrigerant circuit 40a cannot be sufficiently controlled using only control of the capacity of the usage-side compressor 62a, and the circulation of refrigeration machine oil in the usage-side compressor 62a may be compromised and bring about insufficient lubrication.

In view of the above, usage-side low-load operation control (see FIG. 3) is performed in the heat pump system 300 as well in the same manner as the heat pump system 200 (see FIG. 7) in the second embodiment.

It is thereby possible to respond to a request for a supply of an aqueous medium having a wide range of temperatures even in the case that the usage-side outlet/inlet pressure difference ΔP2 is very low, because the usage-side refrigerant circuit 40a can be readily operated even in low-load conditions by reducing the flow rate of the heat-source-side refrigerant that flows into the first usage-side heat exchanger 41a, inhibiting the heat exchange capability in the first usage-side heat exchanger 41a, and increasing the usage-side outlet/inlet pressure difference ΔP2.

(2) Modification 2

In the heat pump system 300 (see FIG. 13) described above, as shown in FIG. 14, it is possible to furthermore provide the usage-side refrigerant circuit 40a with a first usage-side switching mechanism 64a (the same as the first usage-side switching mechanism 64a provided to the heat pump system 200 in the second embodiment) capable of switching between a usage-side radiating operation state in which the refrigerant/water heat exchanger 65a is made to function as a radiator of the usage-side refrigerant and the first usage-side heat exchanger 41a is made to function as an evaporator of the usage-side refrigerant, and a usage-side evaporating operation state in which the refrigerant/water heat exchanger 65a is made to function as an evaporator of the usage-side refrigerant and the first usage-side heat exchanger 41a is made to function as a radiator of the usage-side refrigerant; and it is possible to further connect the first usage unit 4a to the gas-refrigerant communication tube 14 and to further provide a second usage-side switching mechanism 53a capable of switching between an aqueous medium-heating operation state in which the first usage-side heat exchanger 41a is made to function as a radiator of the heat-source-side refrigerant introduced from the discharge refrigerant communication tube 12, and an aqueous medium-cooling operation state in which the first usage-side heat exchanger 41a is made to function as an evaporator of the heat-source-side refrigerant introduced from the liquid refrigerant communication tube 13.

Here, the first usage-side gas refrigerant tube 54a is connected together with the first usage-side discharge refrigerant tube 46a to the gas side of the channel through which the heat-source-side refrigerant of the first usage-side heat exchanger 41a flows. The gas-refrigerant communication tube 14 is connected to the first usage-side gas refrigerant tube 54a. The second usage-side switching mechanism 53a has a first usage-side discharge on-off valve 55a (in this case, the first usage-side discharge non-return valve 49*a* is omitted) provided to the first usage-side discharge refrigerant tube 46*a*, and a first usage-side gas on-off valve 56*a* provided to the first usage-side gas refrigerant tube 54*a*; and is used for setting an aqueous medium-heating operation state by opening the first usage-side discharge on-off valve 55*a* and closing the first usage-side gas on-off valve 56*a*, and setting an aqueous medium-cooling operation state by closing the first usage-side discharge on-off valve 55*a* and opening the first usage-side gas on-off valve 56*a*. The first usage-side discharge on-off valve 55*a* and the first usage-side gas on-off valve 56*a* are composed of solenoid valves, both being capable of on-off control. The second usage-side switching mechanism 53*a* may be configured using a three-way valve or the like.

With the heat pump system 300 having such a configuration, in the case that defrosting of the heat-source-side heat exchanger 24 has been determined to be required, depending on operation in the hot-water supply operation mode, the air-warming operation mode, and the hot-water supply/air-warming operation mode, it is possible to perform a defrosting operation in which the heat-source-side heat exchanger 24 is made to function as a radiator of the heat-source-side refrigerant by setting the heat-source-side switching mechanism 23 in a heat-source-side radiating operation state; the second usage-side heat exchanger 101*a* is made to function as an evaporator of the heat-source-side refrigerant and the refrigerant/water heat exchanger 65*a* is made to function as an evaporator of the usage-side refrigerant by setting the first usage-side switching mechanism 64*a* in a usage-side evaporating operation state; and the first usage-side heat exchanger 41*a* is made to function as a radiator of the usage-side refrigerant.

Operation in the defrosting operation is described below with reference to FIG. 5.

First, it is determined whether predetermined defrosting operation start conditions have been satisfied (i.e., whether defrosting of the heat-source-side heat exchanger 24 is required) (step S21). Here, it is determined whether the defrosting operation start conditions have been satisfied on the basis of whether the defrosting time interval Δtdf (i.e., the cumulative operation time from the end of the previous defrosting operation) has reached the predetermined defrosting time interval setting value Δtdfs.

The process starts the defrosting operation below in the case that it has been determined that the defrosting operation start conditions have been satisfied (step S22).

Figure 14:
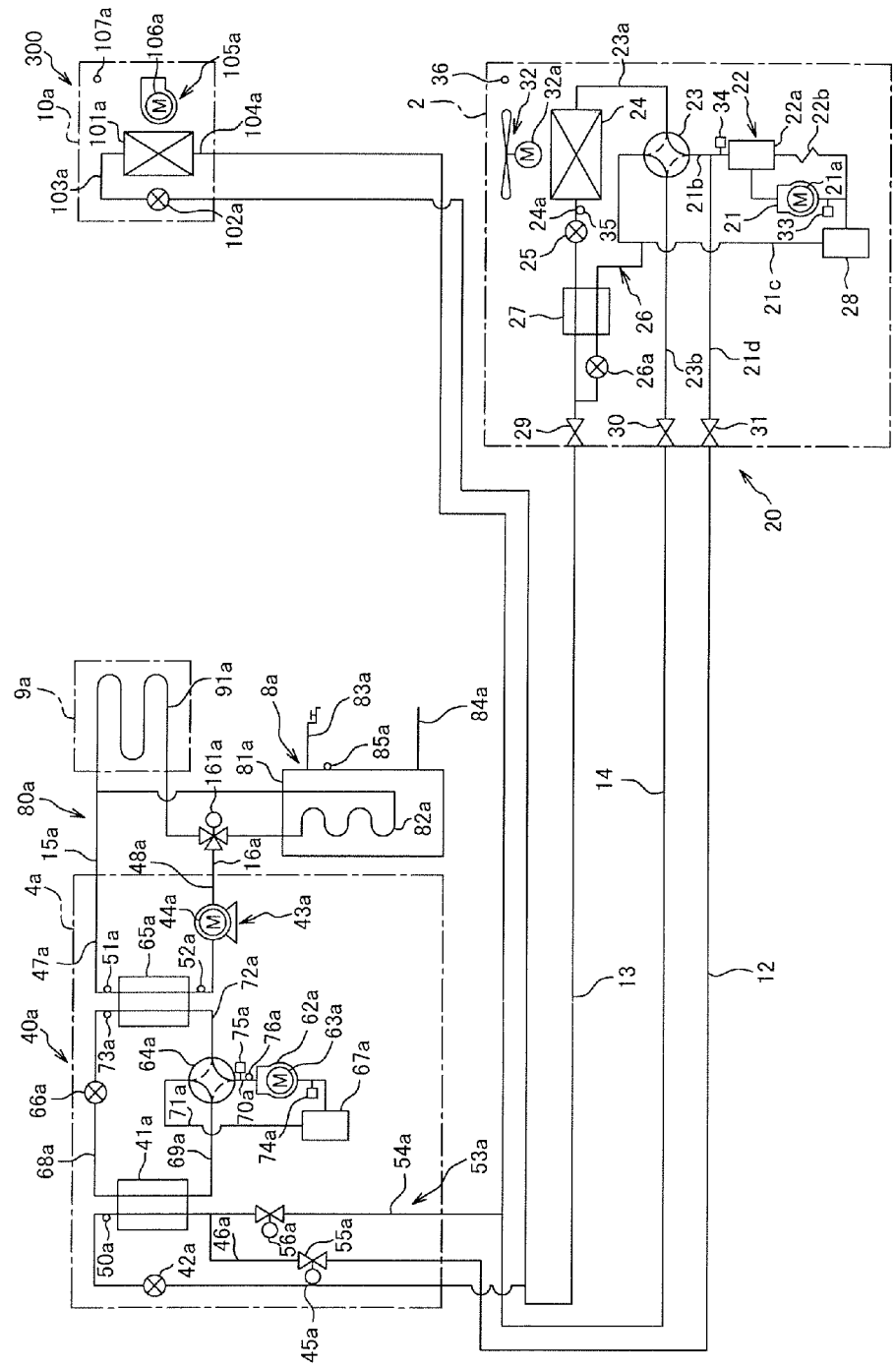
FIG. 14 is a view showing the general configuration of the heat pump system according to Modification 2 of the third embodiment.

When the defrosting operation is started, a switch is made in the heat-source-side refrigerant circuit 20 to switch the heat-source-side switching mechanism 23 to the heat-source-side radiating operation state (the state indicated by the solid lines of heat-source-side switching mechanism 23 of FIG. 14), a switch is made in the usage-side refrigerant circuit 40*a* to switch the first usage-side switching mechanism 64*a* to the usage-side evaporating operation state (the state indicated by the broken lines of first usage-side switching mechanism 64*a* in FIG. 14), the second usage-side switching mechanism 53*a* is switched to the aqueous medium-cooling operation state (i.e., the state in which the first usage-side discharge on-off value 55*a* is closed and the first usage-side gas on-off valve 56*a* is open), and the intake-return expansion valve 26*a* is set in a closed state.

Here, the refrigerant inside the refrigerant circuits 20, 40*a* undergoes pressure equalization when the heat-source-side switching mechanism 23 is set in a heat-source-side radiating operation state and the first usage-side switching mechanism 64*a* is switched to a usage-side evaporating operation state. Although noise is generated during such pressure equalization of the refrigerant (i.e., the noise of pressure equalization) inside the refrigerant circuits 20, 40*a*, it is preferred that such noise of pressure equalization does not become excessive.

In view of the above, in this heat pump system 300, in the case that the defrosting operation is to be started, the first usage-side switching mechanism 64*a* is set in the usage-side evaporating operation state after the heat-source-side switching mechanism 23 has been set in the heat-source-side radiating operation state, and the refrigerant inside the two refrigerant circuits 20, 40*a* does not simultaneously undergo pressure equalization. It is thereby possible to prevent the noise of pressure equalization from becoming excessive in the case that the defrosting operation is performed.

With this heat pump system 300, when the first usage-side switching mechanism 64*a* is to be set in the usage-side evaporating operation state, the usage-side compressor 62*a* is stopped and the first usage-side switching mechanism 64*a* is set in a usage-side evaporating operation state. Therefore, the pressure equalization noise in the usage-side refrigerant circuit 40*a* can be prevented from increasing.

Furthermore, with this heat pump system 300, when the usage-side compressor 62*a* is to be set in a stopped state, the usage-side compressor 62*a* is stopped with the refrigerant/water heat-exchange-side flow rate adjustment valve 66*a* left in an open state (more specifically, a fully open state), and pressure equalization in the usage-side refrigerant circuit 40*a* can therefore be rapidly performed.

In the heat-source-side refrigerant circuit 20 in such a state, the low-pressure heat-source-side refrigerant in the refrigeration cycle is taken into the heat-source-side compressor 21 by way of the heat-source-side intake tube 21*c*, compressed to high pressure in the refrigeration cycle, and thereafter discharged to the heat-source-side discharge tube 21*b*. The high-pressure heat-source-side refrigerant discharged to the heat-source-side discharge tube 21*b* has the refrigeration machine oil separated out in the oil separator 22*a*. The refrigeration machine oil separated out from the heat-source-side refrigerant in the oil separator 22*a* is returned to the heat-source-side intake tube 21*c* by way of the oil return tube 22*b*. The high-pressure, heat-source-side refrigerant from which the refrigeration machine oil has been separated out is sent to the heat-source-side heat exchanger 24 by way of the heat-source-side switching mechanism 23 and the first heat-source-side gas-refrigerant tube 23*a*. The high-pressure, heat-source-side refrigerant sent to the heat-source-side heat exchanger 24 undergoes heat exchange with ice deposited in the heat-source-side heat exchanger 24 and heat is released in the heat-source-side heat exchanger 24. The high-pressure, heat-source-side refrigerant having released heat in the heat-source-side heat exchanger is sent to the subcooler 27 by way of the heat-source-side expansion valve 25. The heat-source-side refrigerant sent to the subcooler 27 is sent from the heat source unit 2 to the liquid refrigerant communication tube 13 by way of the heat-source-side liquid-refrigerant tube 24*a* and the liquid-side shutoff valve 29 without undergoing heat exchange because the heat-source-side refrigerant does not flow in the intake return tube 26.

The heat-source-side refrigerant sent to the liquid refrigerant communication tube 13 branches in the liquid refrigerant communication tube 13 and is sent to the first usage unit 4*a* and the second usage unit 10*a*.

The heat-source-side refrigerant sent to the second usage unit 10*a* is sent to the second usage-side flow rate adjustment valve 102*a*. The heat-source-side refrigerant sent to the second usage-side flow rate adjustment valve 102*a* is depressurized in the second usage-side flow rate adjustment valve 102*a* to become a low-pressure gas-liquid two-phase state, and is then sent to the second usage-side heat exchanger 101a by way of the second usage-side liquid refrigerant tube 103a. The low-pressure, heat-source-side refrigerant sent to the second usage-side heat exchanger 101a undergoes heat exchange with an air medium fed by the usage-side fan 105a and evaporates in the second usage-side heat exchanger 101a. The low-pressure, heat-source-side refrigerant thus evaporated in the second usage-side heat exchanger 101a is sent from the second usage unit 10a to the gas refrigerant communication tube 14 by way of the second usage-side gas refrigerant tube 104a.

The heat-source-side refrigerant sent to the first usage unit 4a is sent to the first usage-side flow rate adjustment valve 42a. The heat-source-side refrigerant sent to the first usage-side flow rate adjustment valve 42a is depressurized in the first usage-side flow rate adjustment valve 42a to become a low-pressure gas-liquid two-phase state, and is then sent to the first usage-side heat exchanger 41a by way of the first usage-side liquid refrigerant tube 45a. The low-pressure, heat-source-side refrigerant sent to the first usage-side heat exchanger 41a undergoes heat exchange with the high-pressure usage-side refrigerant in the refrigeration cycle that is circulated through the usage-side refrigerant circuit 40a and evaporates in the first usage-side heat exchanger 41a. The low-pressure, heat-source-side refrigerant thus evaporated in the first usage-side heat exchanger 41a is sent from the first usage unit 4a to the gas refrigerant communication tube 14 by way of the first usage-side gas refrigerant tube 54a and the first usage-side gas on-off valve 56a constituting the first usage-side switching mechanism 53a.

The heat-source-side refrigerant sent from the second usage unit 10a and the first usage unit 4a to the gas refrigerant communication tube 14 merges in the gas refrigerant communication tube 14 and is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23b, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

The high-pressure, usage-side refrigerant in the refrigeration cycle that circulates through the usage-side refrigerant circuit 40a releases heat in the usage-side refrigerant circuit 40a by the evaporation of the heat-source-side refrigerant in the first usage-side heat exchanger 41a. The high-pressure, usage-side refrigerant having released heat in the first usage-side heat exchanger 41a is sent to the refrigerant/water heat exchange-side flow rate adjustment valve 66a. The high-pressure, usage-side refrigerant sent to the refrigerant/water heat exchange-side flow rate adjustment valve 66a is depressurized in the refrigerant/water heat exchange-side flow rate adjustment valve 66a to become a low-pressure gas-liquid two-phase state, and is then sent to the refrigerant/water heat exchanger 65a by way of the cascade-side liquid-refrigerant tube 68a. The low-pressure, usage-side refrigerant sent to the refrigerant/water heat exchanger 65a undergoes heat exchange with the aqueous medium circulated through the aqueous medium circuit 80a by the circulation pump 43a and evaporates in the refrigerant/water heat exchanger 65a. The low-pressure, usage-side refrigerant thus evaporated in the refrigerant/water heat exchanger 65a is sent to the usage-side accumulator 67a by way of the first cascade-side gas-refrigerant tube 72a and the second usage-side switching mechanism 64a. The low-pressure, usage-side refrigerant sent to the usage-side accumulator 67a is taken into the usage-side compressor 62a by way of the cascade-side intake tube 71a, compressed to high pressure in the refrigeration cycle, and thereafter discharged to the cascade-side discharge tube 70a. The high-pressure, usage-side refrigerant discharged to the cascade-side discharge tube 70a is again sent to the first usage-side heat exchanger 41a by way of the second usage-side switching mechanism 64a and the second cascade-side gas-refrigerant tube 69a.

In this manner, the defrosting operation is started in which the heat-source-side heat exchanger 24 is made to function as a radiator of the heat-source-side refrigerant by setting the heat-source-side switching mechanism 23 in the heat-source-side heat-release operation state; the second usage-side heat exchanger 101a is made to function as an evaporator of the heat-source-side refrigerant and the refrigerant/water heat exchanger 65a is made to function as an evaporator of the usage-side refrigerant by setting the second usage-side switching mechanism 64a in a usage-side evaporating operation state; and the first usage-side heat exchanger 41a is made to function as a radiator of the usage-side refrigerant (i.e., as an evaporator of the heat-source-side refrigerant).

It is first determined whether predetermined defrosting operation end conditions have been satisfied (i.e., whether defrosting of the heat-source-side heat exchanger 24 has ended; step S23). Here, it is determined whether defrosting operation end conditions have been satisfied based on whether the heat-source-side heat exchanger temperature Thx has reached a predetermined defrosting completion temperature Thxs, or whether the defrosting operation time tdf, which is the time elapsed from the start of the defrosting operation, has reached a predetermined defrosting operation setting time tdfs.

In the case that it has been determined that the defrosting operation end conditions have been satisfied, the defrosting operation is ended and the process returns to the hot-water supply operation mode (step S24).

With the heat pump system 300, when the heat-source-side heat exchanger 24 is to be defrosted, not only is the heat-source-side switching mechanism 23 set in the heat-source-side radiating operation state to thereby cause the heat-source-side heat exchanger 24 to function as a radiator of the heat-source-side refrigerant, but also the first usage-side switching mechanism 64a is set in the usage-side evaporating operation state to thereby cause the refrigerant/water heat exchanger 65a to function as an evaporator of the usage-side refrigerant and cause the first usage-side heat exchanger 41a to function as a radiator of the usage-side refrigerant. Therefore, the heat-source-side refrigerant cooled by releasing heat in the heat-source-side heat exchanger 24 is heated by the heat released by the usage-side refrigerant in the first usage-side heat exchanger 41a, and the usage-side refrigerant cooled by releasing heat in the first usage-side heat exchanger 41a can be heated by evaporation in the refrigerant/water heat exchanger 65a, whereby the defrosting of the heat-source-side heat exchanger 24 can be reliably performed. Also, since the second usage-side heat exchanger 101a is also made to function as an evaporator of the heat-source-side refrigerant, the defrosting operation time tdf can be reduced and it is possible to inhibit a reduction in the temperature of the air medium cooled in the second usage unit 10a.

(3) Modification 3

A configuration such as that of the heat pump system 300 (see FIG. 14) in Modification 2 is provided with the second usage-side switching mechanism 53a, which is capable of switching between an aqueous medium-heating operation state in which the first usage-side heat exchanger 41a is made to function as a radiator of the heat-source-side refrigerant introduced from the discharge refrigerant communication tube 12 and an aqueous medium-cooling operation state in which the first usage-side heat exchanger 41a is made to function as an evaporator of the heat-source-side refrigerant introduced from the liquid refrigerant communication tube 13. In such a configuration, the heat-source-side refrigerant discharged from the heat-source-side compressor 21 stagnates in the discharge refrigerant communication tube 12 and the flow rate of the heat-source-side refrigerant taken into the heat-source-side compressor 21 is liable to be insufficient (i.e., an insufficient refrigerant-circulation rate) in the case that operation of the first usage unit 4a is stopped and the second usage unit 10a (air-cooling operation or air-warming operation) is operated (the case in which the discharge refrigerant communication tube 12 is not used).

Figure 15:
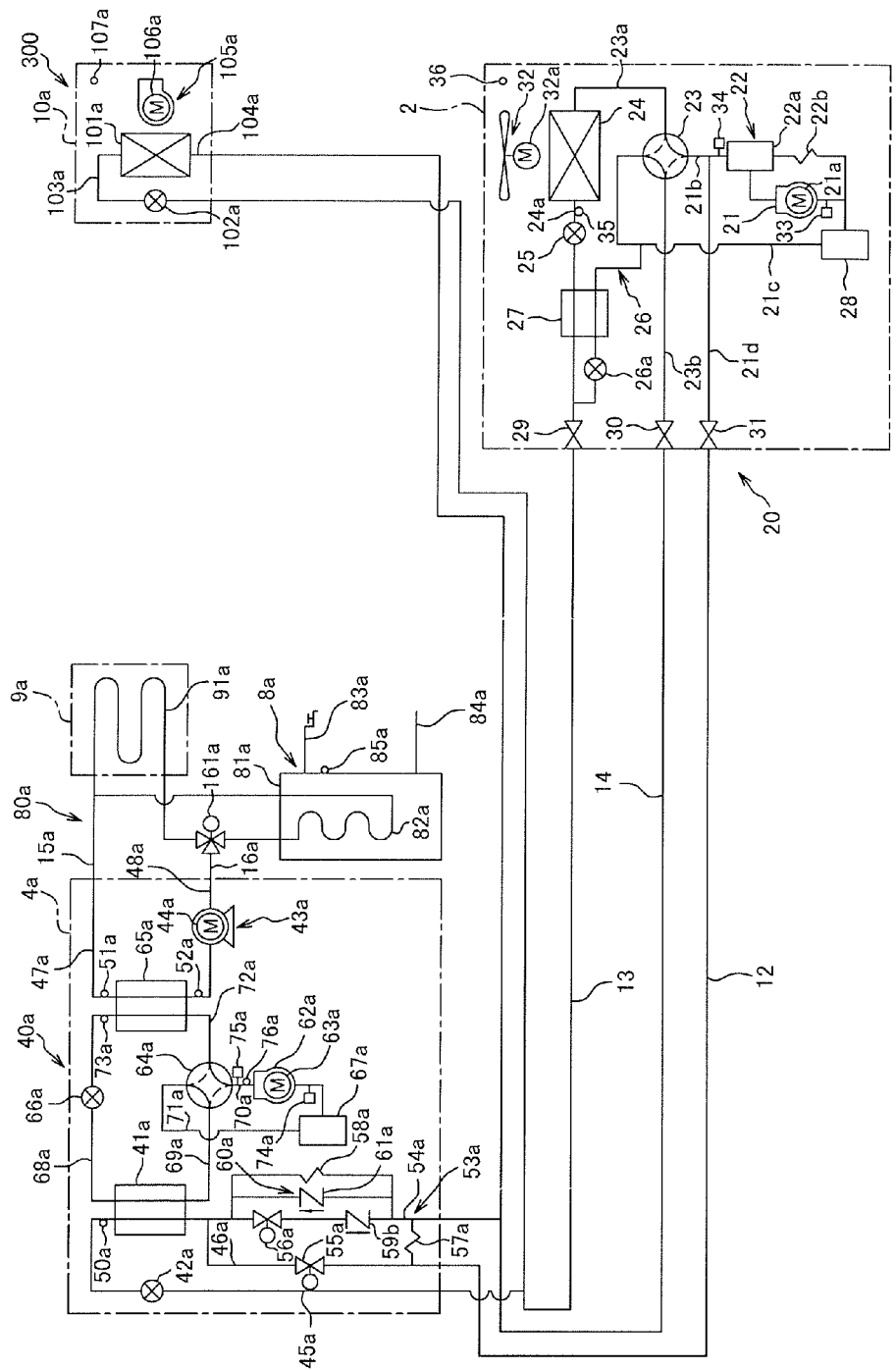
FIG. 15 is a view showing the general configuration of the heat pump system according to Modification 3 of the third embodiment.

In view of the above, the heat pump system 300 is provided with a first refrigerant recovery mechanism 57a for placing the discharge refrigerant communication tube 12 and the gas refrigerant communication tube 14 in communication when the second usage-side switching mechanism 53a is in the aqueous medium-heating operation state or the aqueous medium-cooling operation state, as shown in FIG. 15. Here, the first refrigerant recovery mechanism 57a is a refrigerant tube having a capillary tube in which one end is connected to the portion of the first usage-side discharge refrigerant tube 46a that connects the first usage-side discharge on-off valve 55a and the discharge refrigerant communication tube 12, and the other end is connected to the portion of the first usage-side gas refrigerant tube 54a that connects the first usage-side gas on-off valve 56a and the gas refrigerant communication tube 14; and the discharge refrigerant communication tube 12 and the gas refrigerant communication tube 14 are in communication regardless of the on-off state of the first usage-side discharge on-off valve 55a and/or the first usage-side gas on-off valve 56a.

In the heat pump system 300, the heat-source-side refrigerant is thereby made less likely to stagnate in the discharge refrigerant communication tube 12, and it is therefore possible to minimize the occurrence of an insufficient refrigerant-circulation rate in the heat-source-side refrigerant circuit 20.

A configuration such as that of the heat pump system 300 (see FIG. 14) in Modification 2 is provided with the second usage-side switching mechanism 53a, which is capable of switching between an aqueous medium-heating operation state in which the first usage-side heat exchanger 41a is made to function as a radiator of the heat-source-side refrigerant introduced from the discharge refrigerant communication tube 12 and an aqueous medium-cooling operation state in which the first usage-side heat exchanger 41a is made to function as an evaporator of the heat-source-side refrigerant introduced from the liquid refrigerant communication tube 13. In such a configuration, the heat-source-side refrigerant stagnates in the first usage-side heat exchanger 41a and the flow rate of the heat-source-side refrigerant taken into the heat-source-side compressor 21 is liable to be insufficient (i.e., an insufficient refrigerant-circulation rate) in the case that operation of the first usage unit 4a is stopped and the second usage unit 10a (air-cooling operation or air-warming operation) is operated.

In view of the above, in this heat pump system 300, there is provided a second refrigerant recovery mechanism 58a for placing the first usage-side heat exchanger 41a and the gas refrigerant communication tube 14 in communication when the second usage-side switching mechanism 53a is in an aqueous medium-heating operation state or in an aqueous medium-cooling operation state, as shown in FIG. 15. Here, the second refrigerant recovery mechanism 58a has a refrigerant tube having a capillary tube in which one end is connected to the portion of the first usage-side gas refrigerant tube 54a that connects the gas side of the first usage-side heat exchanger 41a and the first usage-side gas on-off valve 56a, and the other end is connected to the portion of the first usage-side gas refrigerant tube 54a that connects the first usage-side gas on-off valve 56a and the gas refrigerant communication tube 14; and the first usage-side gas on-off valve 56a is bypassed to place the gas side of the first usage-side heat exchanger 41a and the gas refrigerant communication tube 14 in communication even in the case that the operation of the first usage unit 4a is stopped.

In this heat pump system 300, the heat-source-side refrigerant is thereby made less likely to stagnate in the first usage-side heat exchanger 41a, and it is therefore possible to minimize the occurrence of an insufficient refrigerant-circulation rate in the heat-source-side refrigerant circuit 20.

Furthermore, in the heat pump system 300 (see FIG. 14) in the modifications, the second usage-side switching mechanism 53a is composed of the first usage-side discharge on-off valve 55a and the first usage-side gas on-off valve 56a, and the heat-source-side refrigerant is therefore fed from only the discharge refrigerant communication tube 12 to the first usage unit 4a in any operation mode that accompanies a hot-water supply operation.

However, the heat-source-side refrigerant is at the high pressure of the refrigeration cycle not only in the discharge refrigerant communication tube 12, but also in the gas refrigerant communication tube 14 in the hot-water supply operation mode and/or the hot-water supply/air-warming operation mode among the operation modes that accompany hot-water supply operation. Therefore, it is also possible to allow high-pressure, heat-source-side refrigerant to be sent from not only the discharge refrigerant communication tube 12, but also from the gas refrigerant communication tube 14 to the first usage unit 4a in the hot-water supply operation mode and/or the hot-water supply/air-warming operation mode.

In view of the above, in this heat pump system 300, a first usage-side gas non-return valve 59a and a first usage-side bypass refrigerant tube 60a are furthermore provided to the first usage-side gas refrigerant tube 54a; and, together with the first usage-side discharge on-off valve 55a and the first usage-side gas on-off valve 56a, constitute the second usage-side switching mechanism 53a, as shown in FIG. 15. Here, the first usage-side gas non-return valve 59a is provided to the portion of the first usage-side gas refrigerant tube 54a that connects the first usage-side gas on-off valve 56a and the gas refrigerant communication tube 14. The first usage-side gas non-return valve 59a is a non-return valve that allows the flow of heat-source-side refrigerant from the first usage-side heat exchanger 41a toward the gas refrigerant communication tube 14, and prohibits the flow of the heat-source-side refrigerant from the gas refrigerant communication tube 14 toward the first usage-side heat exchanger 41a; and the flow of heat-source-side refrigerant from the gas refrigerant communication tube 14 toward the first usage-side heat exchanger 41a via the first usage-side gas on-off valve 56a is thereby prohibited. The first usage-side bypass refrigerant tube 60a is connected to the first usage-side gas refrigerant tube 54a so as to bypass the first usage-side gas on-off valve 56a and the first usage-side gas non-return valve 59a, and constitutes a portion of the first usage-side gas refrigerant tube 54a. The first usage-side bypass refrigerant tube 60a is provided with a first usage-side bypass non-return valve 61a for allowing the flow of heat-source-side refrigerant from the gas refrigerant communication tube 14 to the first usage-side heat exchanger 41a and prohibiting the flow of heat-source-side refrigerant from the first usage-side heat exchanger 41a to the gas refrigerant communication tube 14, whereby the flow of heat-source-side refrigerant from the gas refrigerant communication tube 14 to the first usage-side heat exchanger 41a is allowed via the first usage-side bypass refrigerant tube 60a.

In this heat pump system 300, high-pressure, heat-source-side refrigerant can thereby be sent from not only the discharge refrigerant communication tube 12, but also from the gas refrigerant communication tube 14 to the first usage unit 4a in the hot-water supply operation mode and the hot-water supply/air-warming operation mode. Therefore, the loss of pressure of the heat-source-side refrigerant fed from the heat source unit 2 to the first usage unit 4a is reduced, which can contribute to an improvement in the hot-water supply capacity and/or operation efficiency.

(4) Modification 4

Figure 16:
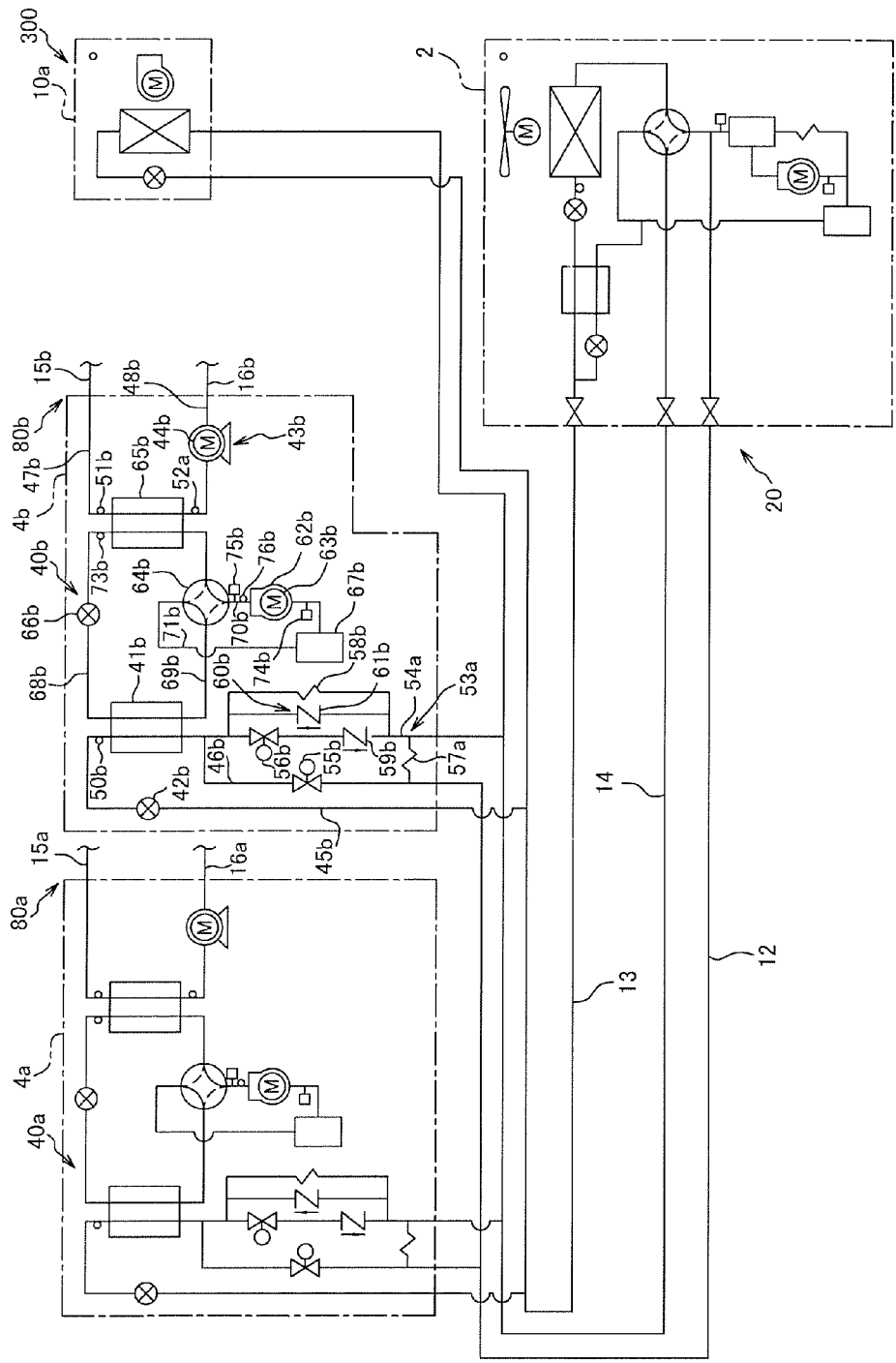
FIG. 16 is a view showing the general configuration of the heat pump system according to Modification 4 of the third embodiment.
Figure 17:
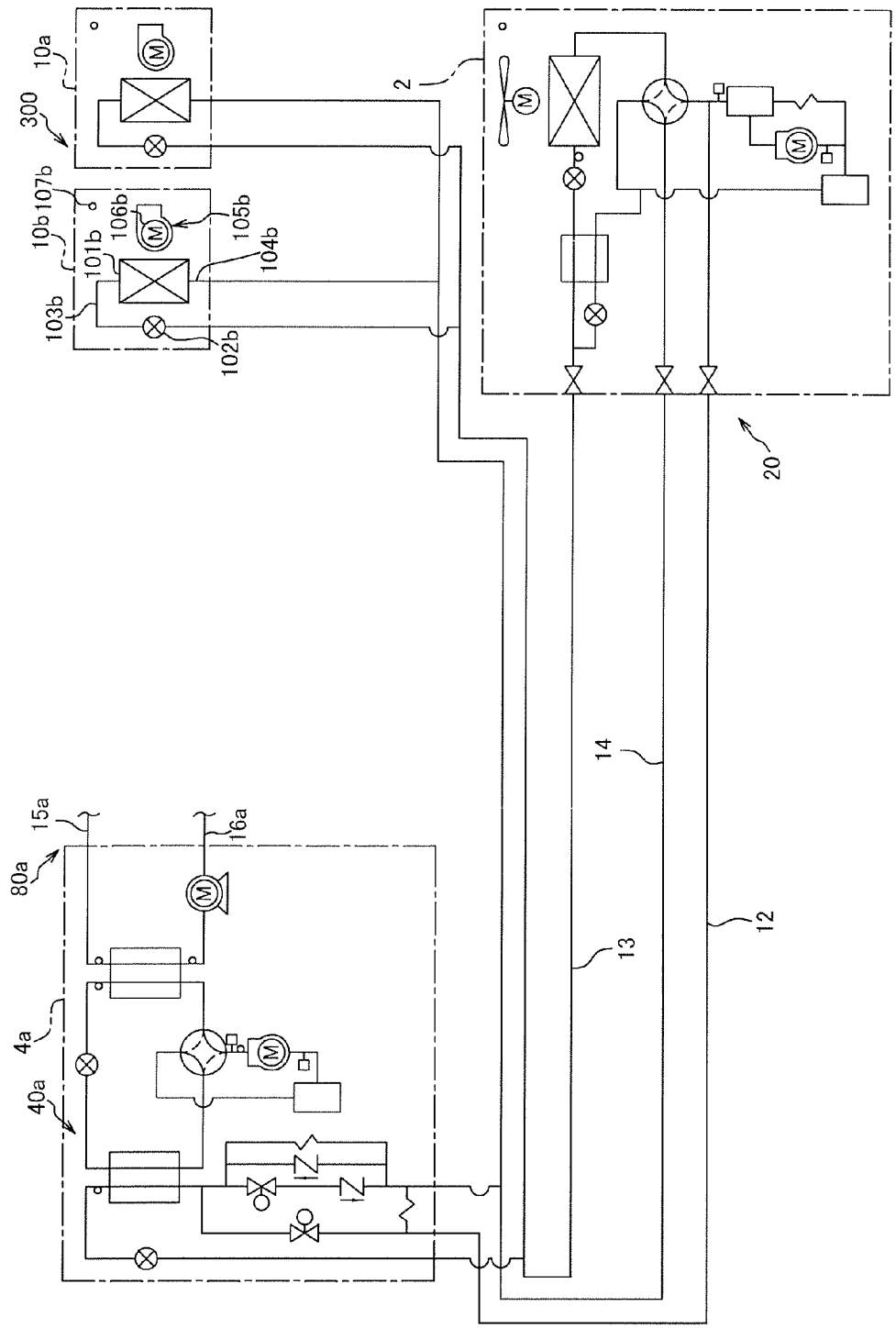
FIG. 17 is a view showing the general configuration of the heat pump system according to Modification 4 of the third embodiment.
Figure 18:
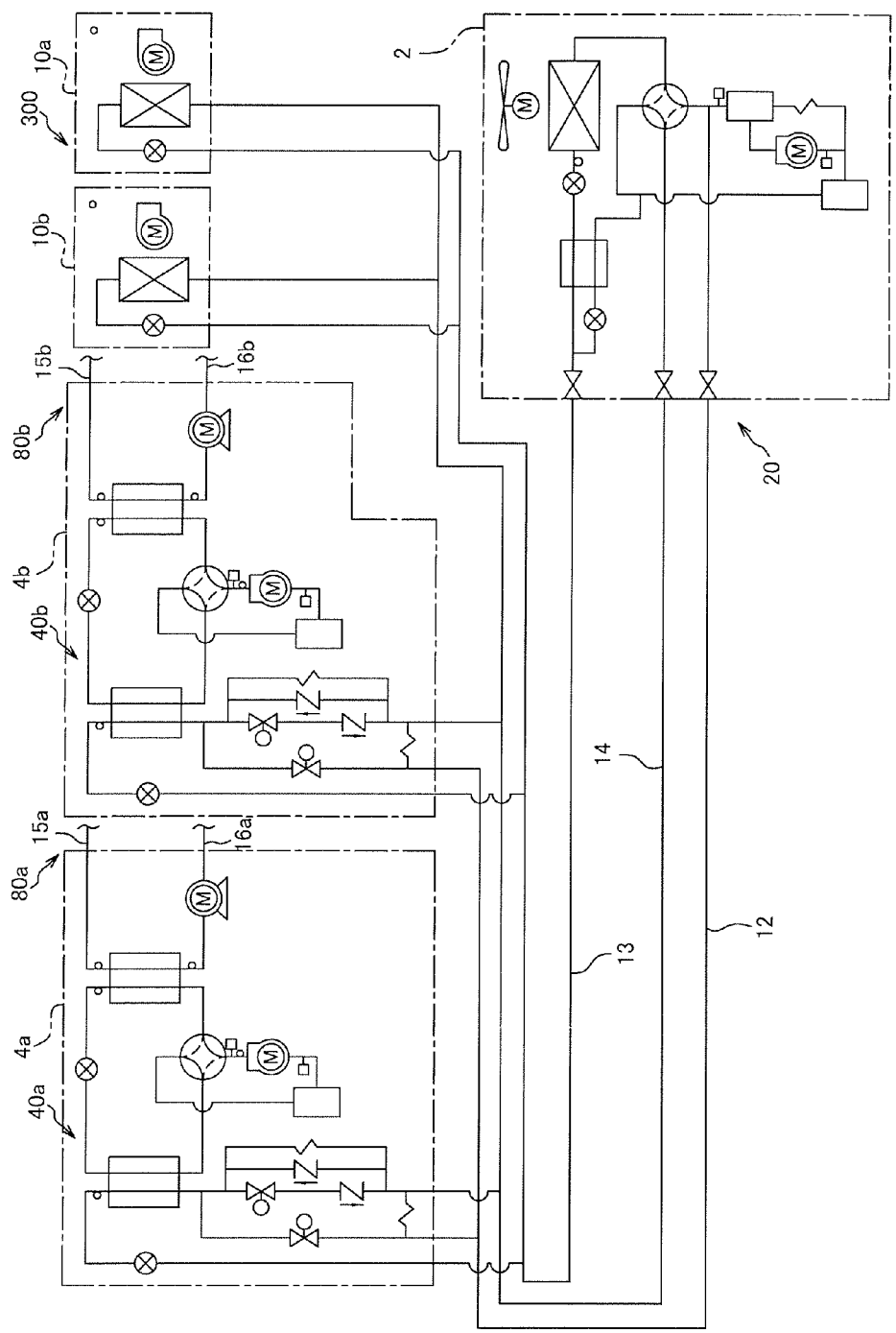
FIG. 18 is a view showing the general configuration of the heat pump system according to Modification 4 of the third embodiment.

In the heat pump systems 300 described above (see FIGS. 13 to 15), a single first usage unit 4a and a single second usage unit 10a are connected to the heat source unit 2 via the refrigerant communication tubes 12, 13, 14, but a plurality of first usage units 4a, 4b (two, in this case) may be connected in parallel to each other via the refrigerant communication tubes 13, 14, and/or a plurality of second usage units 10a, 10b (two, in this case) may be connected in parallel to each other via the refrigerant communication tubes 12, 13, 14, as shown in FIGS. 16 to 18 (in this case, the hot-water/air-warming unit, the hot-water storage unit, the aqueous medium circuits 80a, 80b, and the like are not shown). The configuration of the first usage unit 4b is the same as the configuration of the first usage unit 4a with the subscript "b" used in place of the subscript "a" of the reference numerals indicating each part of the first usage unit 4a, and a description of each part of the first usage unit 4b is therefore omitted. Also, the configuration of the second usage unit 10b is the same as the configuration of the second usage unit 10a with the subscript "b" used in place of the subscript "a" of the reference numerals indicating each part of the second usage unit 10b, and a description of each part is therefore omitted.

In these heat pump systems 300, it is possible to accommodate a plurality of locations and/or applications that require heating of the aqueous medium, and it is possible to accommodate a plurality of locations and/or applications that require cooling of the air medium.

(5) Modification 5

Figure 19:
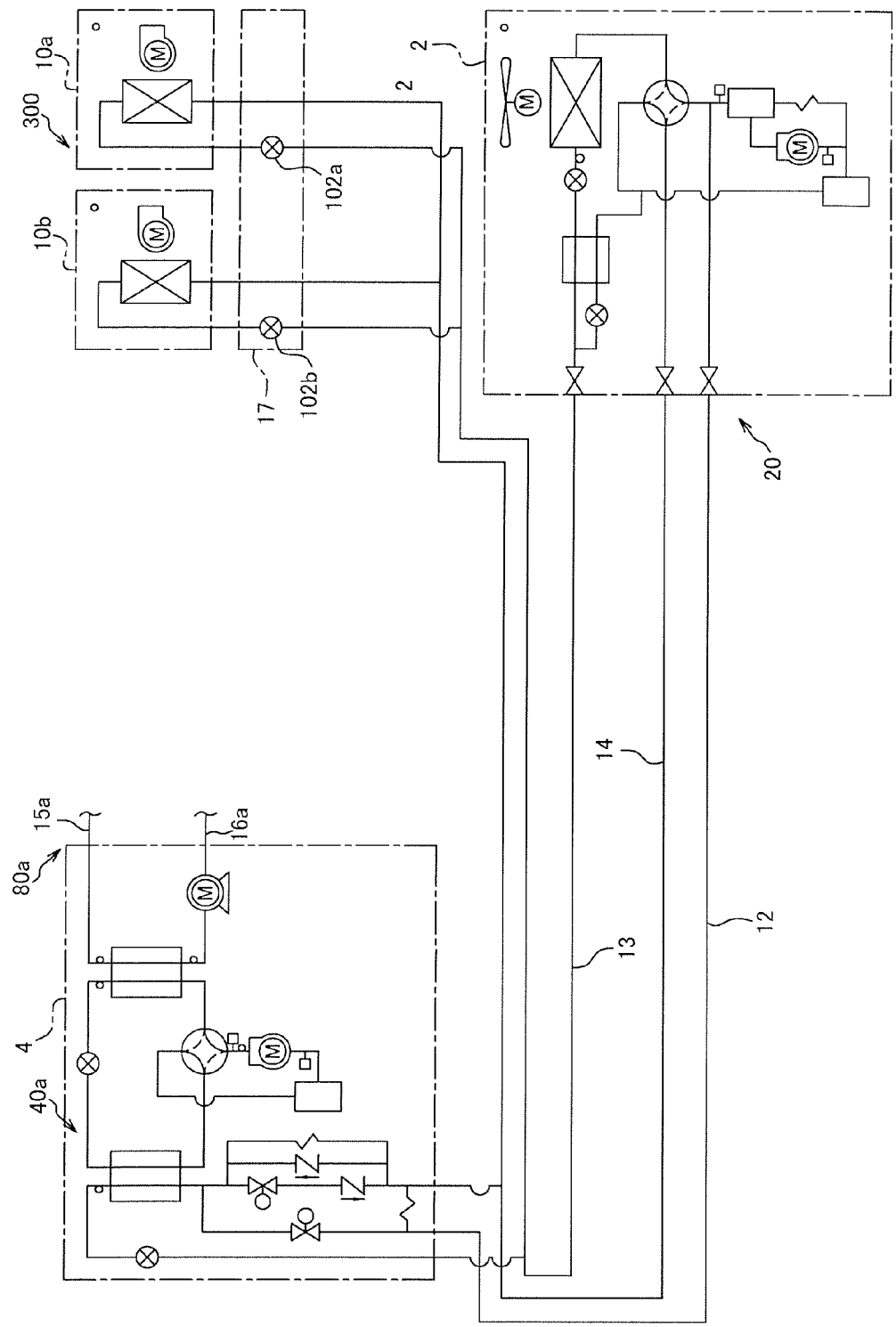
FIG. 19 is a view showing the general configuration of the heat pump system according to Modification 5 of the third embodiment.

In the heat pump systems 300 described above (see FIGS. 13 to 18), the second usage-side flow rate adjustment valves 102a, 102b are provided inside the second usage units 10a, 10b, but it is possible to omit the second usage-side flow rate adjustment valves 102a, 102b from the second usage units 10a, 10b and to provide an expansion valve unit 17 having the second usage-side flow rate adjustment valves 102a, 102b, as shown in FIG. 19 (in this case, the hot-water/air-warming unit, the hot-water storage unit, the aqueous medium circuit 80a, and the like are not shown).

Other Embodiments

Embodiments of the present invention and modifications thereof were described above with reference to the drawings, but specific configurations are not limited to these embodiments and modifications thereof, and it is possible to make modifications within a range that does not depart from the spirit of the invention.

<A>

In the heat pump systems 200, 300 of the second and third embodiments and modifications thereof, the second usage units 10a, 10b may be used for refrigeration and/or freezing, and purposes other than air cooling and air warming, rather than as usage units used for indoor air cooling and air warming.

<B>

In the heat pump system 300 of the third embodiment and modifications thereof, the gas-refrigerant communication tube 14 may be used as a refrigerant tube in which low-pressure, heat-source-side refrigerant flows in the refrigeration cycle by, e.g., placing the second heat-source-side gas refrigerant tube 23b and the heat-source-side intake tube 21c in communication, whereby the second usage-side heat exchangers 101a, 101b are made to function only as evaporators of the heat-source-side refrigerant, and the second usage units 10a, 10b are used as cooling-dedicated usage units. In this case as well, operation in the hot-water supply/air-cooling operation mode is possible and energy savings can be ensured.

<C>

In the heat pump systems 1, 200, 300 of the first through third embodiments and modifications thereof, HFC-134a is used as the usage-side refrigerant, but no limitation is imposed thereby, and it is also possible to use, e.g., HFO-1234yf (2,3,3,3-tetrafluoro-1-propene) or another refrigerant in which the pressure that corresponds to a saturated gas temperature of 65° C. is a maximum gauge pressure of 2.8 MPa or less, preferably 2.0 MPa or less.

INDUSTRIAL APPLICABILITY

The use of the present invention makes it possible to obtain a high-temperature aqueous medium in a heat pump system that can heat an aqueous medium using a heat pump cycle.

What is claimed is:
1. A heat pump system comprising:
a heat-source-side refrigerant circuit having
   a variable-capacity heat-source-side compressor arranged to compress heat-source-side refrigerant,
   a first usage-side heat exchanger operable as a radiator of the heat-source-side refrigerant, and
   a heat-source-side heat exchanger operable as an evaporator of the heat-source-side refrigerant;
a usage-side refrigerant circuit having
   a variable-capacity usage-side compressor arranged to compress usage-side refrigerant,
   a refrigerant/water heat exchanger operable as a radiator of the usage-side refrigerant to heat an aqueous medium, and
   the first usage-side heat exchanger operable as an evaporator of the usage-side refrigerant by radiation of the heat-source-side refrigerant, and
a controller configured to control
   a capacity of the heat-source-side compressor so that a heat-source-side discharge saturation temperature becomes a predetermined target heat-source-side discharge saturation temperature, the heat-source-side discharge saturation temperature corresponding to pressure of the heat-source-side refrigerant in a discharge of the heat-source-side compressor, and
   a capacity of the usage-side compressor so that a usage-side discharge saturation temperature becomes a predetermined target usage-side discharge saturation temperature, the usage-side discharge saturation tem- perature corresponding to pressure of the usage-side refrigerant in a discharge of the usage-side compressor, the controller being further configured to vary the target usage-side discharge saturation temperature according to a predetermined target aqueous medium outlet temperature, the predetermined target aqueous medium outlet temperature being a target value of temperature of the aqueous medium in an outlet of the refrigerant/water heat exchanger.

2. The heat pump system according to claim 1, wherein the controller is further configured to vary, the target heat-source-side discharge saturation temperature according to the target usage-side discharge saturation temperature or the target aqueous medium outlet temperature.

3. The heat pump system according to claim 1, wherein the heat-source-side refrigerant circuit includes a first usage-side flow rate adjustment valve configured to vary a flow rate of heat-source-side refrigerant that flows through the first usage-side heat exchanger; and an opening degree of the first usage-side flow rate adjustment valve is controlled to be reduced in a case in which usage-side outlet/inlet pressure difference is equal to or less than a predetermined usage-side low-load control-pressure difference, the usage-side outlet/inlet pressure difference is a pressure difference between pressure of the usage-side refrigerant in a discharge of the usage-side compressor and pressure of the usage-side refrigerant in an intake of the usage-side compressor.

4. The heat pump system according to claim 3, wherein the opening degree of the first usage-side flow rate adjustment valve is controlled so that a heat-source-side refrigerant degree-of-subcooling becomes a predetermined target heat-source-side refrigerant degree-of-subcooling in a case in which the usage-side outlet/inlet pressure difference is greater than the usage-side low-load control-pressure difference, and the heat-source-side refrigerant degree-of-subcooling is a degree of subcooling of the heat-source-side refrigerant in an outlet of the first usage-side heat exchanger.

5. The heat pump system according to claim 4, wherein the target heat-source-side refrigerant degree-of-subcooling is increased in a case in which the usage-side outlet/inlet pressure difference is equal to or less than the usage-side low-load control-pressure difference.

6. The heat pump system according to claim 1, wherein the heat-source-side refrigerant circuit includes a heat-source-side switching mechanism switchable between a heat-source-side radiating operation state in which the heat-source-side heat exchanger functions as a radiator of the heat-source-side refrigerant and a heat-source-side evaporating operation state in which the heat-source-side heat exchanger functions as an evaporator of the heat-source-side refrigerant; and the usage-side refrigerant circuit includes a usage-side switching mechanism switchable between a usage-side radiating operation state in which the refrigerant/water heat exchanger functions as a radiator of the usage-side refrigerant and the first usage-side heat exchanger functions as an evaporator of the usage-side refrigerant, and a usage-side evaporating operation state in which the refrigerant/water heat exchanger functions as an evaporator of the usage-side refrigerant and the first usage-side heat exchanger functions as a radiator of the usage-side refrigerant.

7. The heat pump system according to claim 6, wherein in a case in which defrosting of the heat-source-side heat exchanger is determined to be required, a defrosting operation is performed in which the heat-source-side switching mechanism is set in the heat-source-side radiating operation state whereby the heat-source-side heat exchanger functions as a radiator of the heat-source-side refrigerant, and the usage-side switching mechanism is set in the usage-side evaporating operation state whereby the refrigerant/water heat exchanger functions as an evaporator of the usage-side refrigerant and the first usage-side heat exchanger functions as a radiator of the usage-side refrigerant.

8. The heat pump system according to claim 7, wherein in the case in which the defrosting operation is to be performed, the usage-side switching mechanism is set in the usage-side evaporating operation state after the heat-source-side switching mechanism has been set in the heat-source-side radiating operation state.

9. The heat pump system according to claim 8, wherein in the case in which the defrosting operation is to be performed, the usage-side compressor is set in a stopped state and the usage-side switching mechanism is set in the usage-side evaporating operation state.

10. The heat pump system according to claim 9, wherein the usage-side refrigerant circuit further includes a refrigerant/water heat-exchange-side flow rate adjustment valve configured to vary a flow rate of the usage-side refrigerant flowing through the refrigerant/water heat exchanger; and the usage-side compressor is stopped with the refrigerant/water heat-exchange-side flow rate adjustment valve in an open state in the case in which the defrosting operation is performed.

11. The heat pump system according to claim 1, wherein the usage-side compressor is started up after the heat-source-side compressor has been started up in a case in which the heat-source-side compressor and the usage-side compressor are started up from a stopped state.

12. The heat pump system according to claim 11, wherein the usage-side compressor is started up after a pressure of the heat-source-side refrigerant in a discharge of the heat-source-side compressor has become equal to or greater than a predetermined heat-source-side startup discharge pressure.

13. The heat pump system according to claim 11, wherein the usage-side compressor is started up after a heat-source-side outlet/inlet pressure difference has become equal to or greater than a predetermined heat-source-side startup pressure difference, and the heat-source-side outlet/inlet pressure difference is a pressure difference between a pressure of the heat-source-side refrigerant in a discharge of the heat-source-side compressor and a pressure of the heat-source-side refrigerant in an intake of the heat-source-side compressor.

14. The heat pump system according to any of claim 1, further comprising:

an aqueous medium circuit configured to circulate an aqueous medium therethrough and to perform heat exchange with the usage-side refrigerant in the refrigerant/water heat exchanger, the aqueous medium circuit having a variable capacity-type circulation pump, the usage-side compressor being started up while the circulation pump is in a stopped state or a state of operation at a low flow rate.

15. The heat pump system according to claim 14, wherein a capacity of the circulation pump is controlled so that a flow rate of the aqueous medium circulating through the aqueous medium circuit is increased after a pressure of the usage-side refrigerant in a discharge of the usage-side compressor has become equal to or greater than a predetermined usage-side startup discharge pressure.

16. The heat pump system according to claim 14, wherein a capacity of the circulation pump is controlled so that a flow rate of the aqueous medium circulating through the aqueous medium circuit is increased after a usage-side outlet/inlet pressure difference has become equal to or greater than a predetermined usage-side startup pressure difference, and the usage-side outlet/inlet pressure difference is a pressure difference between a pressure of the usage-side refrigerant in a discharge of the usage-side compressor and a pressure of the usage-side refrigerant in an intake of the usage-side compressor.

17. The heat pump system according to claim 1, wherein the heat-source-side refrigerant circuit includes a second usage-side heat exchanger operable to heat an air medium by functioning as a radiator of the heat-source-side refrigerant.

18. The heat pump system according to claim 17, wherein in the case in which operation is performed so that the second usage-side heat exchanger functions as a radiator of the heat-source-side refrigerant, the target heat-source-side discharge saturation temperature is greater than a case in which operation is not performed so that the second usage-side heat exchanger functions as a radiator of the heat-source-side refrigerant.

19. The heat pump system according to claim 1, wherein the heat-source-side refrigerant circuit includes a second usage-side heat exchanger operable to cool an air medium by functioning as an evaporator of the heat-source-side refrigerant, and the heat-source-side refrigerant circuit being operable such that the first usage-side heat exchanger functions as a radiator of the heat-source-side refrigerant and the second usage-side heat exchanger functions as an evaporator of the heat-source-side refrigerant.

20. The heat pump system according to claim 1, wherein a plurality of the first usage-side heat exchangers are provided; and a plurality of the usage-side refrigerant circuits are provided so as to correspond to the first usage-side heat exchangers.

21. The heat pump system according to claim 1, wherein the heat-source-side refrigerant circuit has a heat-source-side sensor arranged to detect the pressure of the heat-source-side refrigerant, and the usage-side refrigerant circuit has a usage-side sensor arranged to detect the pressure of the usage-side refrigerant.

* * * * *